(12) United States Patent
Doyle et al.

(10) Patent No.: US 12,026,825 B2
(45) Date of Patent: Jul. 2, 2024

(54) APPARATUS AND METHOD FOR REDUCED PRECISION BOUNDING VOLUME HIERARCHY CONSTRUCTION

(71) Applicant: Intel Corporation, Santa Clara, CA (US)

(72) Inventors: Michael Doyle, San Jose, CA (US); Karthik Vaidyanathan, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/306,821

(22) Filed: Apr. 25, 2023

(65) Prior Publication Data

US 2023/0377247 A1 Nov. 23, 2023

Related U.S. Application Data

(63) Continuation of application No. 17/735,902, filed on May 3, 2022, now Pat. No. 11,670,037, which is a
(Continued)

(51) Int. Cl.
*G06T 15/10* (2011.01)
*G06T 1/60* (2006.01)
(Continued)

(52) U.S. Cl.
CPC ............... *G06T 15/10* (2013.01); *G06T 1/60* (2013.01); *G06T 9/00* (2013.01); *G06T 15/06* (2013.01); *G06T 2210/12* (2013.01)

(58) Field of Classification Search
CPC .................................................. G06T 15/10
See application file for complete search history.

(56) References Cited

U.S. PATENT DOCUMENTS

| 2013/0249915 A1* | 9/2013 | Stich | G06T 17/005 345/426 |
| 2016/0071312 A1* | 3/2016 | Laine | G06T 17/10 345/419 |

OTHER PUBLICATIONS

Bauszat et al., "The Minimal Bounding Volume Hierarchy", The Eurographics Association, 2010, 8 pages.
(Continued)

*Primary Examiner* — Shivang I Patel
(74) *Attorney, Agent, or Firm* — NICHOLSON DE VOS WEBSTER & ELLIOTT LLP

(57) ABSTRACT

Apparatus and method for efficient BVH construction. For example, one embodiment of an apparatus comprises: a memory to store graphics data for a scene including a plurality of primitives in a scene at a first precision; a geometry quantizer to read vertices of the primitives at the first precision and to adaptively quantize the vertices of the primitives to a second precision associated with a first local coordinate grid of a first BVH node positioned within a global coordinate grid, the second precision lower than the first precision; a BVH builder to determine coordinates of child nodes of the first BVH node by performing non-spatial-split binning or spatial-split binning for the first BVH node using primitives associated with the first BVH node, the BVH builder to determine final coordinates for the child nodes based, at least in part, on an evaluation of surface areas of different bounding boxes generated for each of the child node.

20 Claims, 49 Drawing Sheets

Related U.S. Application Data continuation of application No. 16/746,636, filed on Jan. 17, 2020, now Pat. No. 11,321,910.

(60) Provisional application No. 62/829,523, filed on Apr. 4, 2019.

(51) Int. Cl.
*G06T 9/00* (2006.01)
*G06T 15/06* (2011.01)

(56) References Cited

OTHER PUBLICATIONS

Bittner et al., "Incremental BVH Construction for Ray Tracing", Computers & Graphics, Dec. 8, 2014, 12 pages.
Cline et al., "Lightweight Bounding Volumes for Ray Tracing", Journal of Graphics, GPU, and Game Tools, Feb. 13, 2006, 10 pages.
Dammertz et al., "The Edge Volume Heuristic—Robust Triangle Subdivision for Improved BVH Performance", IEEE Symposium on Interactive Ray Tracing, 2008, 4 pages.
Doyle et al., "A Hardware Unit for Fast SAH-optimised BVH construction", ACM Transactions on Graphics, Jul. 21, 2013, 5 pages.
Eisemann et al., "Implicit Object Space Partitioning: The No-Memory BVH", Computer Graphics Lab, Technical Report, Dec. 23, 2011, 25 pages.
Ernst et al., "Early Split Clipping for Bounding Volume Hierarchies", In IEEE Symposium on Interactive Ray Tracing, Sep. 2007, 3 pages.
Fabianowski et al., "Compact BVH Storage for Ray Tracing and Photon Mapping", In Proceedings of Eurographics Ireland Workshop, 2009, pp. 1-8.
Final Office Action, U.S. Appl. No. 16/746,636, dated Sep. 24, 2021, 23 pages.
Ganestam et al., "Bonsai: Rapid Bounding Volume Hierarchy Generation using Mini Trees", Journal of Computer Graphics Techniques (JCGT), vol. 4, No. 3, Sep. 2015, pp. 23-42.
Ganestam et al., "SAH Guided Spatial Split Partitioning for Fast BVH Construction", The Eurographics Association and John Wiley & Sons Ltd., vol. 35, No. 2, 2016, 10 pages.
Gu et al., "Efficient BVH Construction via Approximate Agglomerative Clustering", HPG, Jul. 19-21, 2013, pp. 81-88.
Havran, Vlastimil, "Cache Sensitive Representation for BSP Trees", In Compugraphics, vol. 97, 1997, 8 pages.
Hendrich et al., "Parallel BVH Construction using Progressive Hierarchical Refinement", The Eurographics Association and John Wiley & Sons Ltd., vol. 36, No. 2, 2017, 9 pages.
IEEE Computer Society, "IEEE Standard for Floating-Point Arithmetic", Microprocessor Standards Committee, IEEE Std 75(trademark), Aug. 29, 2008, 70 pages.
Karras et al., "Fast Parallel Construction of High-Quality Bounding Volume Hierarchies", In High Performance Graphics, 2013, 11 pages.
Keely, Sean, "Reduced Precision for Hardware Ray Tracing in GPUs", In High-Performance Graphics, 2014, 12 pages.
Lauterbach et al., "Fast BVH Construction on GPUs", Euro Graphics, vol. 28, No. 2, 2009, 10 pages.
Liktor et al., "Bandwidth-Efficient BVH Layout for Incremental Hardware Traversal", High Performance Graphics, 2016, 11 pages.
Liu et al., "FastTree: A Hardware KD-Tree Construction Acceleration Engine for Real-Time Ray Tracing", EDAA, 2015, pp. 1595-1598.
Macdonald et al., "Heuristics for Ray Tracing Using Space Subdivision", The Visual Computer, Springer, 1990, pp. 153-166.
Mahovsky et al., "Memory-Conserving Bounding Volume Hierarchies with Coherent Ray Tracing", IEEE Transactions On Visualization And Computer Graphics, 2006, pp. 1-8.
Meister et al., "Parallel Locally-Ordered Clustering for Bounding Volume Hierarchy Construction", DCGI, Mar. 2018, 89 pages.
Nah et al., "HART: A Hybrid Architecture for Ray Tracing Animated Scenes", IEEE Transactions On Visualization And Computer Graphics, 2014, pp. 1-14.
Nah et al., "RayCore: A Ray-Tracing Hardware Architecture for Mobile Devices", ACM Transactions on Graphics, vol. 33, No. 5, Article 162, pp. 162:1-162:15.
Non-Final Office Action, U.S. Appl. No. 16/746,636, dated Apr. 14, 2021, 24 pages.
Notice of Allowance, U.S. Appl. No. 16/746,636, dated Jan. 7, 2022, 10 pages.
Notice of Allowance, U.S. Appl. No. 17/735,902, dated Jan. 31, 2023, 12 pages.
Pantaleoni et al., HLBVH: Hierarchical LBVH Construction for Real Time Ray Tracing of Dynamic Geometry, NVIDIA, High-Performance Graphics, 2010, 49 pages.
Popov et al., "Object Partitioning Considered Harmful: Space Subdivision for BVHs", Proceedings of the 1st ACM conference on High Performance Graphics, 2009, pp. 1-8.
Rasmusson, Jim, "Lossy and Lossless Compression Techniques for Graphics Processors", Department of Computer Science, Lund University, 2012, 120 pages.
Sander et al., "Fast Hardware Construction and Refitting of Quantized Bounding Volume Hierarchies", Eurographics Symposium on Rendering 2017, vol. 36, No. 4, paper1037, 2017, pp. 1-12.
Stich et al., "Spatial Splits in Bounding Volume Hierarchies", Available Online at <https://www.nvidia.in/docs/IO/77714/sbvh.pdf>, 2009, 7 pages.
Vaidyanathan et al., "Watertight Ray Traversal with Reduced Precision", High Performance Graphics, Eurographics Proceedings, 2016, 8 pages.
Viitanen et al., "MergeTree: A Fast Hardware HLBVH Constructor for Animated Ray Tracing", ACM Transactions on Graphics, vol. 36, No. 5, Article 169, Oct. 2017, pp. 169:1-169:14.
Viitanen et al., "PLOCTree: A Fast, High-Quality Hardware BVH Builder", Proc. ACM Comput. Graph. Interact. Tech., vol. 1, No. 2, Article 35, Aug. 2018, pp. 35:1-35:19.
Wald et al., "Embree: A Kernel Framework for Efficient CPU Ray Tracing", Available Online at <https://www.embree.org/papers/2014-Siggraph-Embree.pdf>, ACM Transactions on Graphics, 2014, 8 pages.
Wald, Ingo, "Fast Construction of SAH BVHs on the Intel Many Integrated Core (MIC) Architecture", IEEE Transactions on Visualization and Computer Graphics, vol. 18, No. 1, Dec. 2010, 9 pages.
Woop, Sven, "A Ray Tracing Hardware Architecture for Dynamic Scenes", A thesis submitted in partial fulfillment of the requirements for the Diploma in Computer Science, Universitat des Saarlandes, Mar. 15, 2004, 100 pages.
Woop, Sven, "DRPU: A Programmable Hardware Architecture for Real-time Ray Tracing of Coherent Dynamic Scenes", PhD Thesis, Saarland University, Jun. 29, 2007, 207 pages.
Ylitie et al., "Efficient Incoherent Ray Traversal on GPUs Through Compressed Wide BVHs", HPG '17, ACM, Jul. 28-30, 2017, 13 pages.

\* cited by examiner

GRAPHICS PROCESSOR INSTRUCTION FORMATS
700

128-BIT INSTRUCTION
710

| OPCODE 712 | CONTROL 714 | EXEC-SIZE 716 | DEST 718 | SRC0 720 | SRC1 722 | SRC2 724 | ACCESS/ADDRESS MODE 726 |

64-BIT COMPACT INSTRUCTION
730

| OPCODE 712 | INDEX 713 | CONTROL 714 | DEST 718 | SRC0 720 | SRC1 722 |

OPCODE DECODE
740 opcode=000xxxxxb ← Move/Logic - 742
opcode=0010xxxxb ← Miscellaneous - 746
opcode=0011xxxxb ← Flow Control - 744
opcode=0100xxxxb ← Parallel Math - 748
opcode=0101xxxxb ← Vector Math - 750

GRAPHICS PROCESSOR COMMAND FORMAT
900

GRAPHICS PROCESSOR COMMAND SEQUENCE
910

APPARATUS AND METHOD FOR REDUCED PRECISION BOUNDING VOLUME HIERARCHY CONSTRUCTION

BACKGROUND

Field of the Invention

This invention relates generally to the field of graphics processors. More particularly, the invention relates to an apparatus and method for reduced precision bounding volume hierarchy construction.

Description of the Related Art

Ray tracing is a technique in which a light transport is simulated through physically-based rendering. Widely used in cinematic rendering, it was considered too resource-intensive for real-time performance until just a few years ago. One of the key operations in ray tracing is processing a visibility query for ray-scene intersections known as "ray traversal" which computes ray-scene intersections by traversing and intersecting nodes in a bounding volume hierarchy (BVH).

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
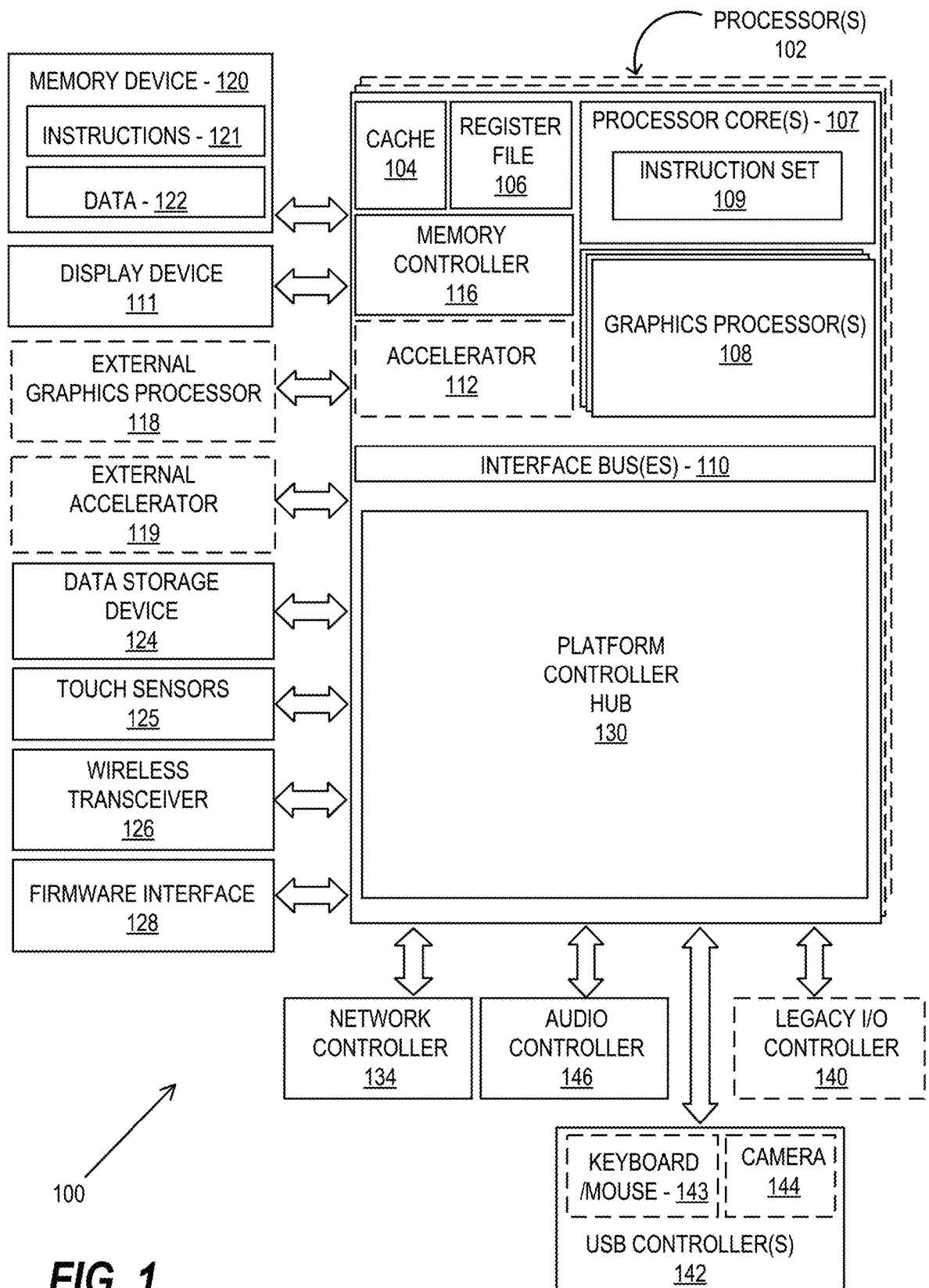
FIG. 1 is a block diagram of an embodiment of a computer system with a processor having one or more processor cores and graphics processors.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
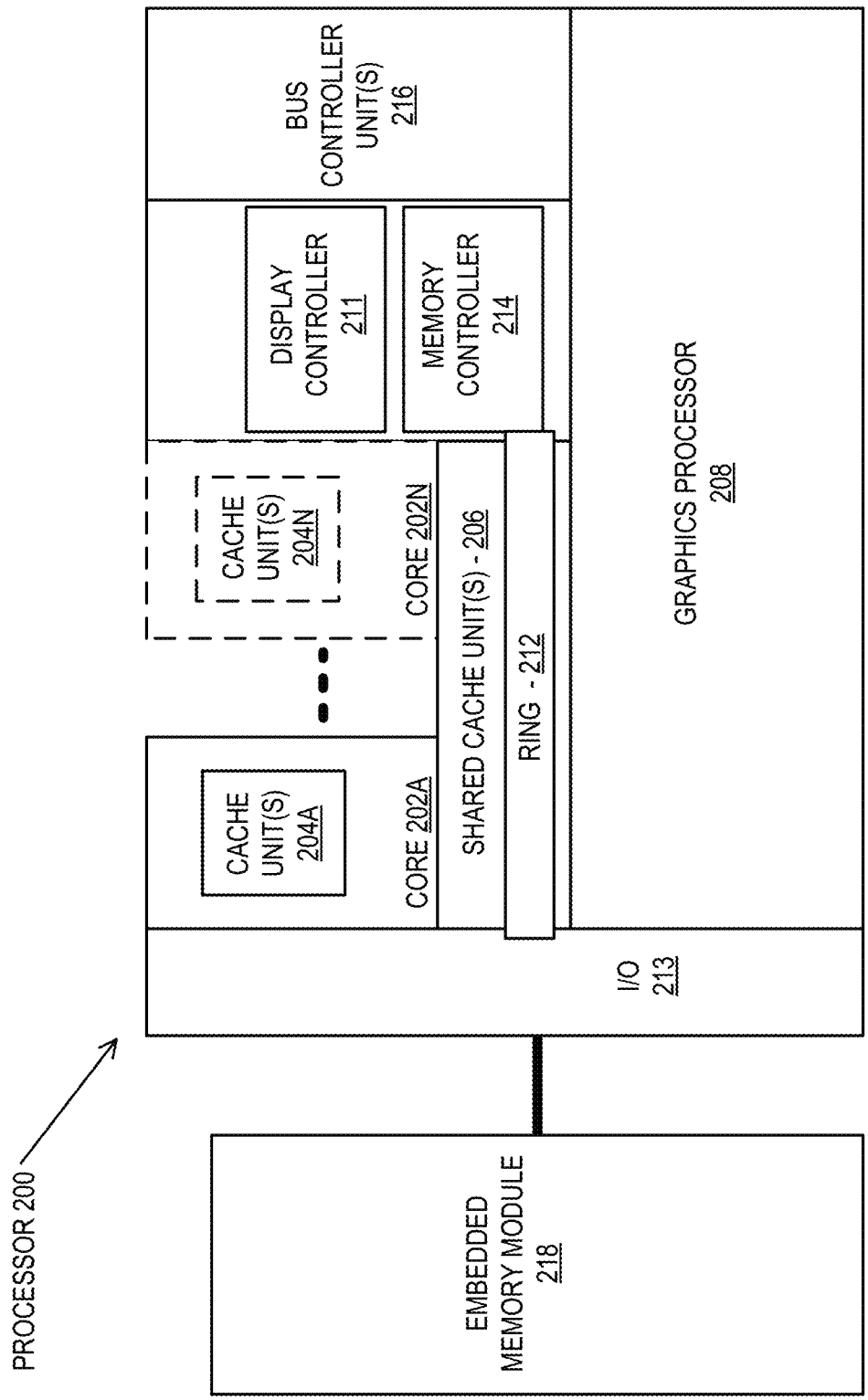
FIGS. 2A-D are a block diagrams of one embodiment of a processor having one or more processor cores, an integrated memory controller, and an integrated graphics processor.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
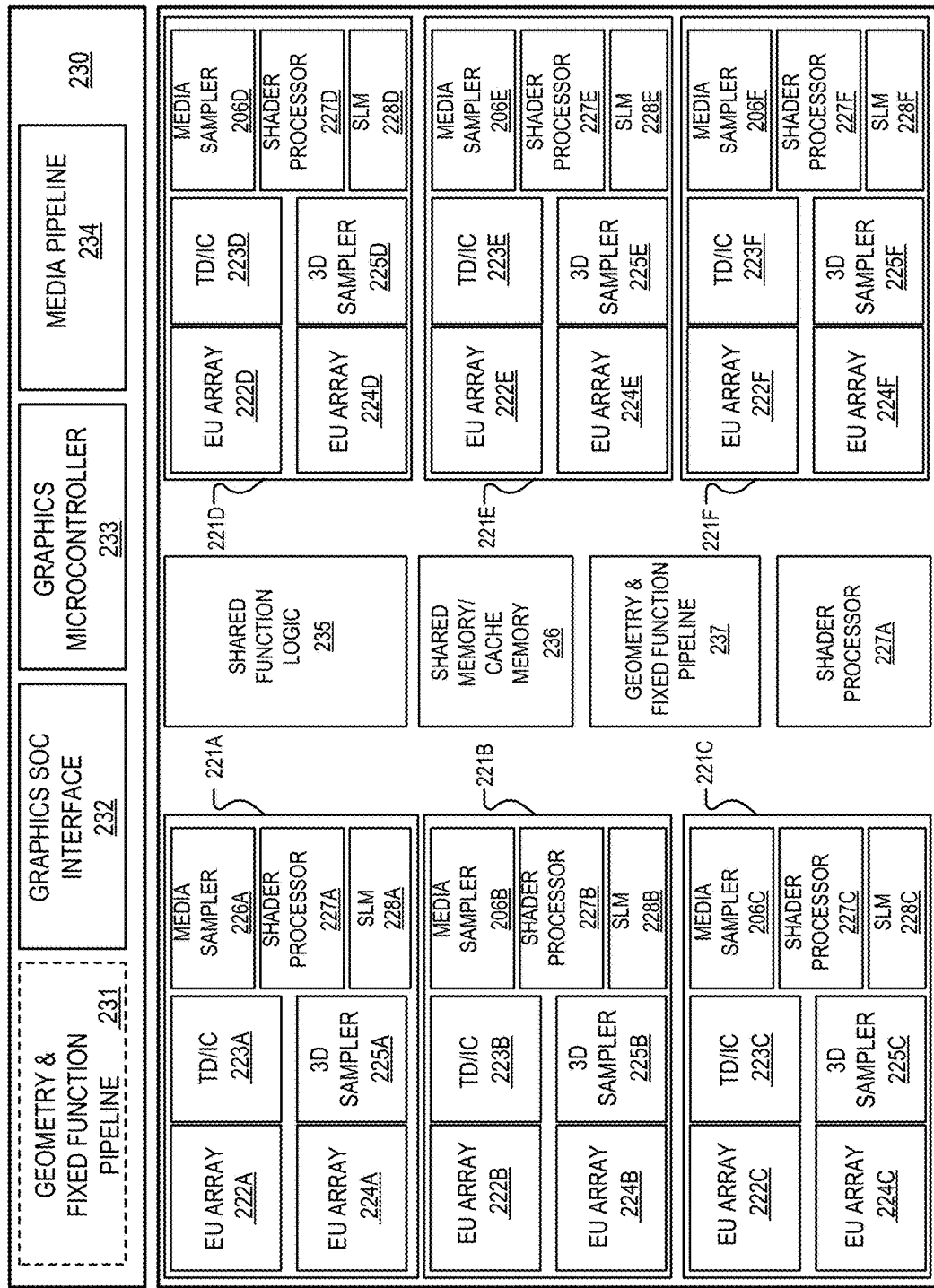

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
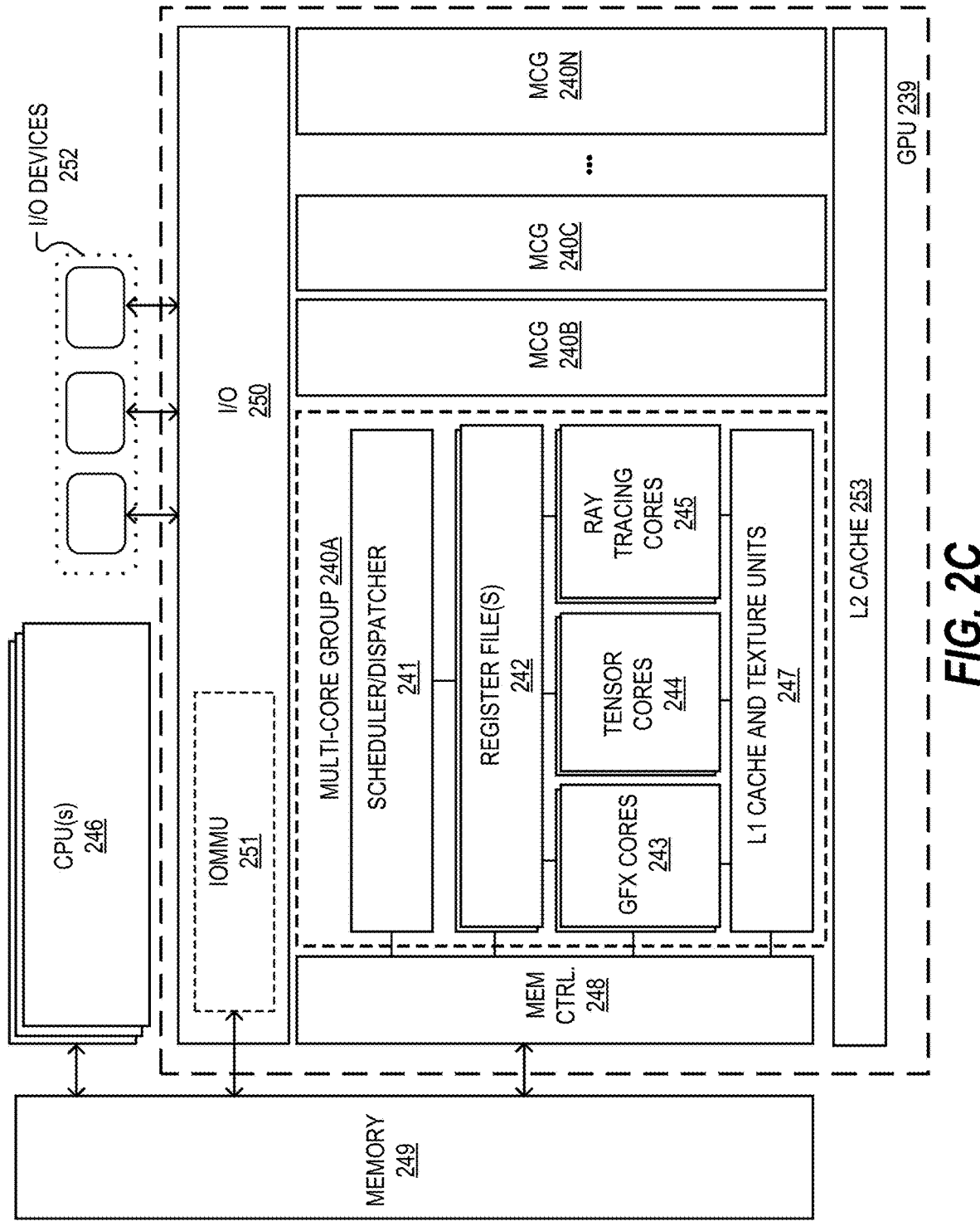

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
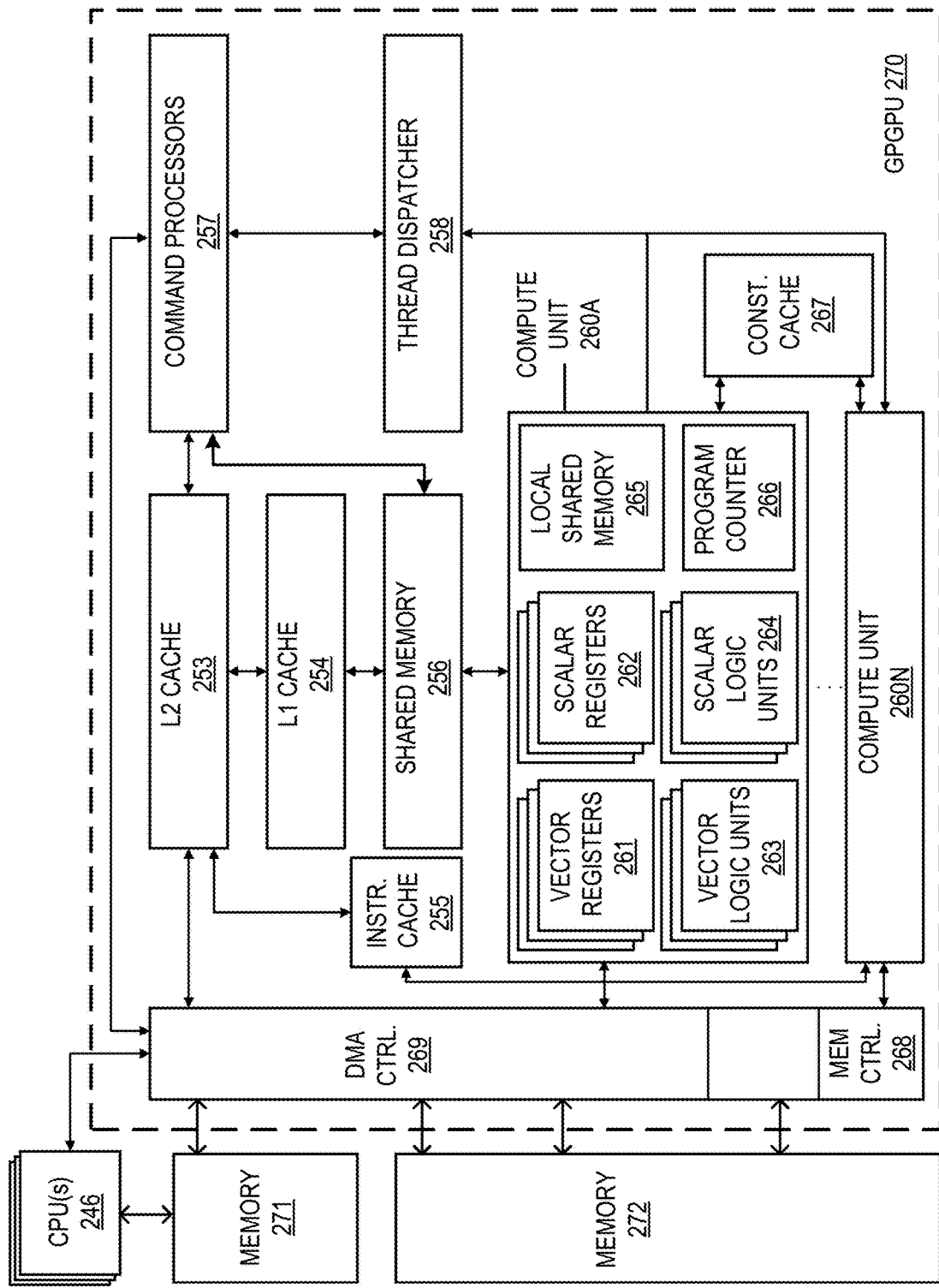

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 3A:
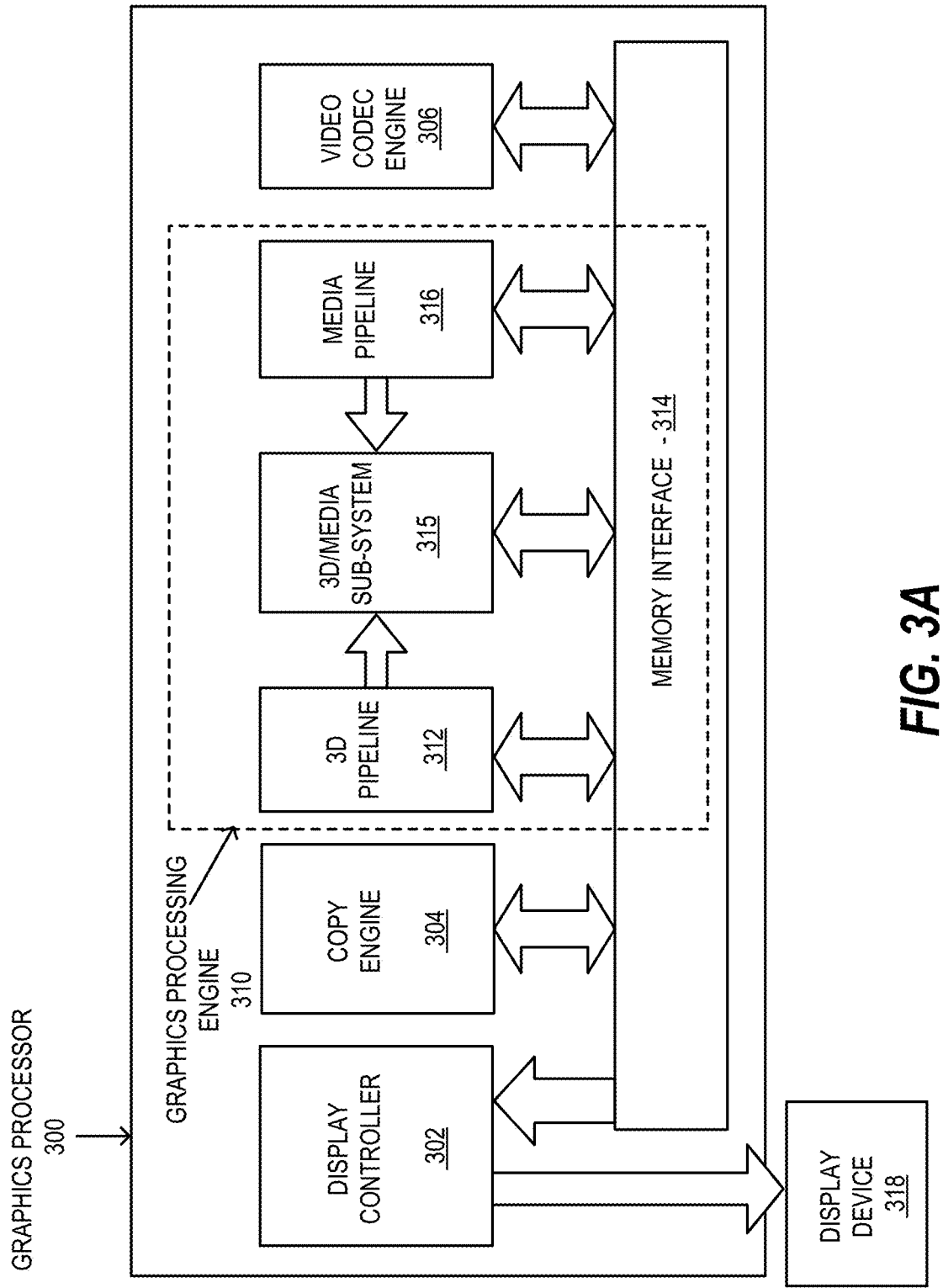
FIGS. 3A-C are a block diagrams of one embodiment of a graphics processor which may be a discreet graphics processing unit, or may be graphics processor integrated with a plurality of processing cores.
Figure 3B:
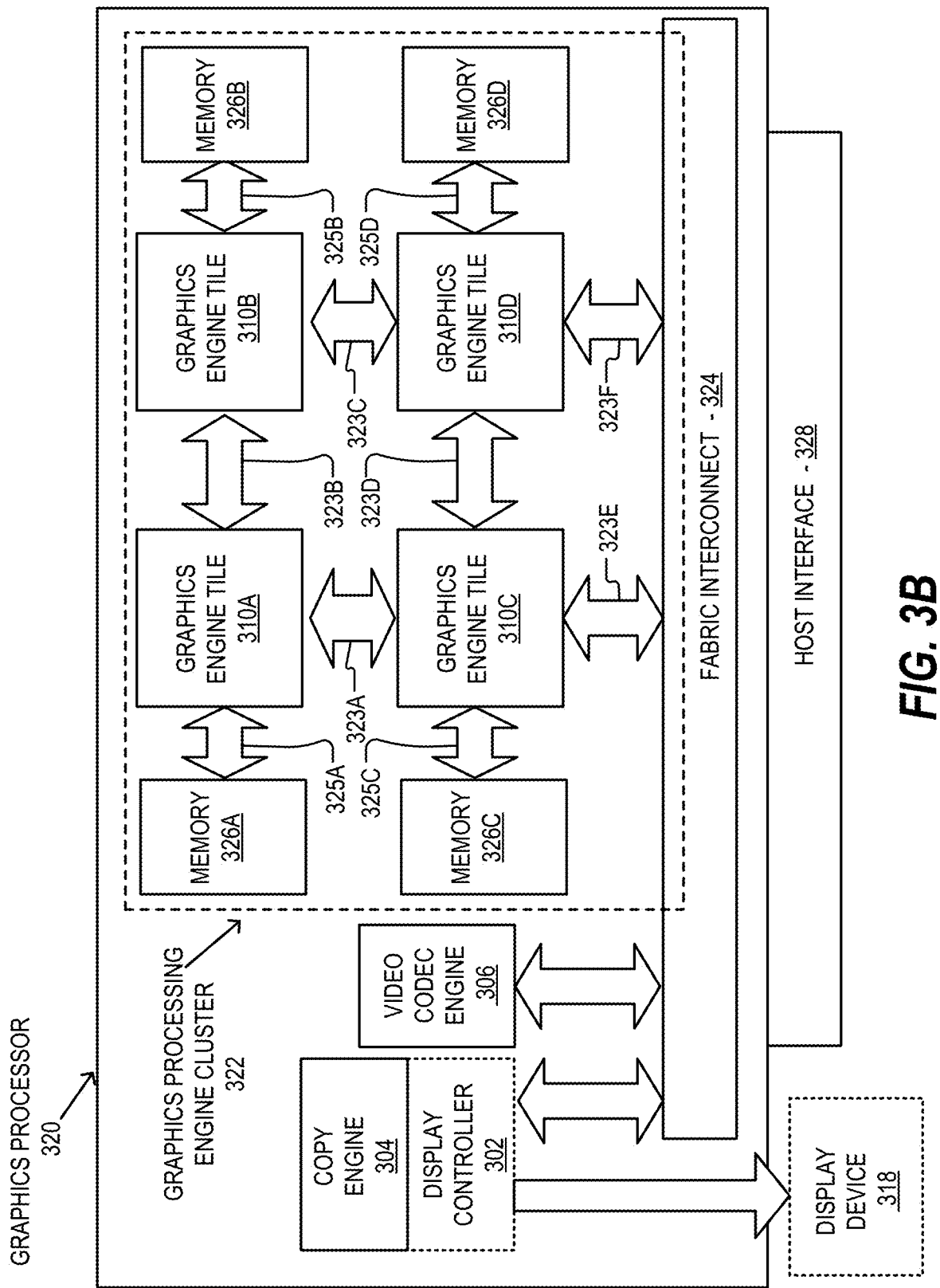
Figure 3C:
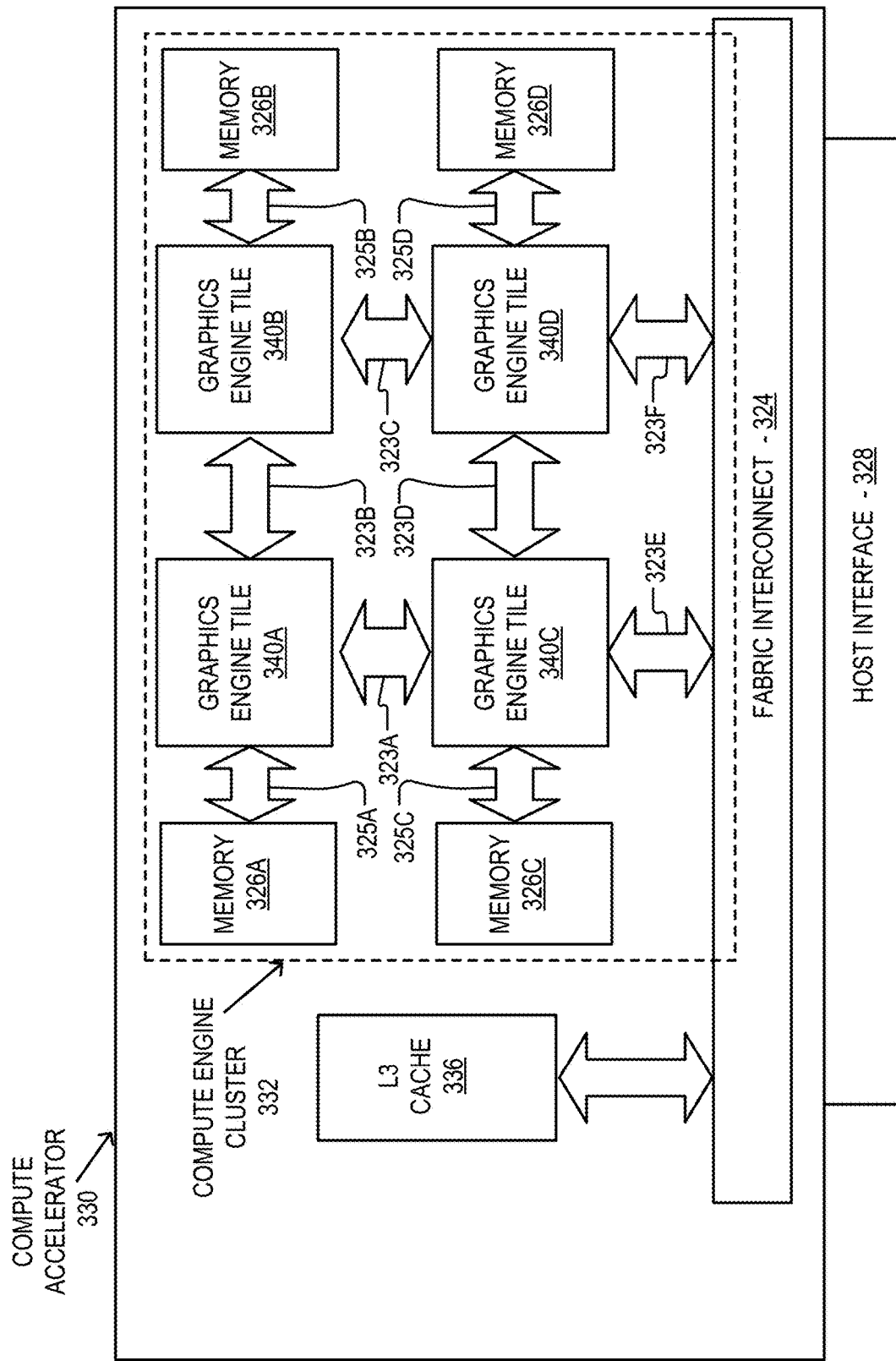

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
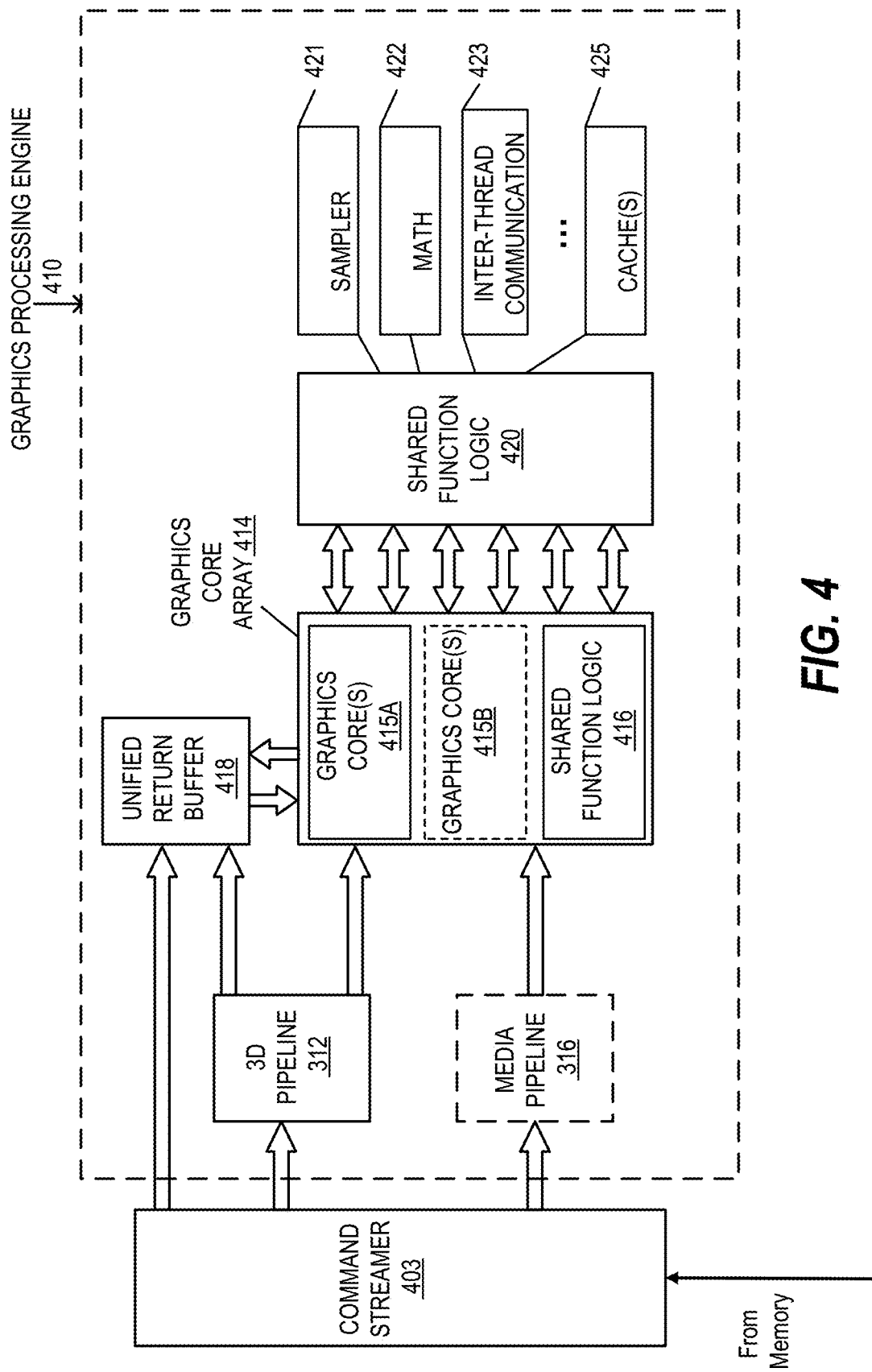
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
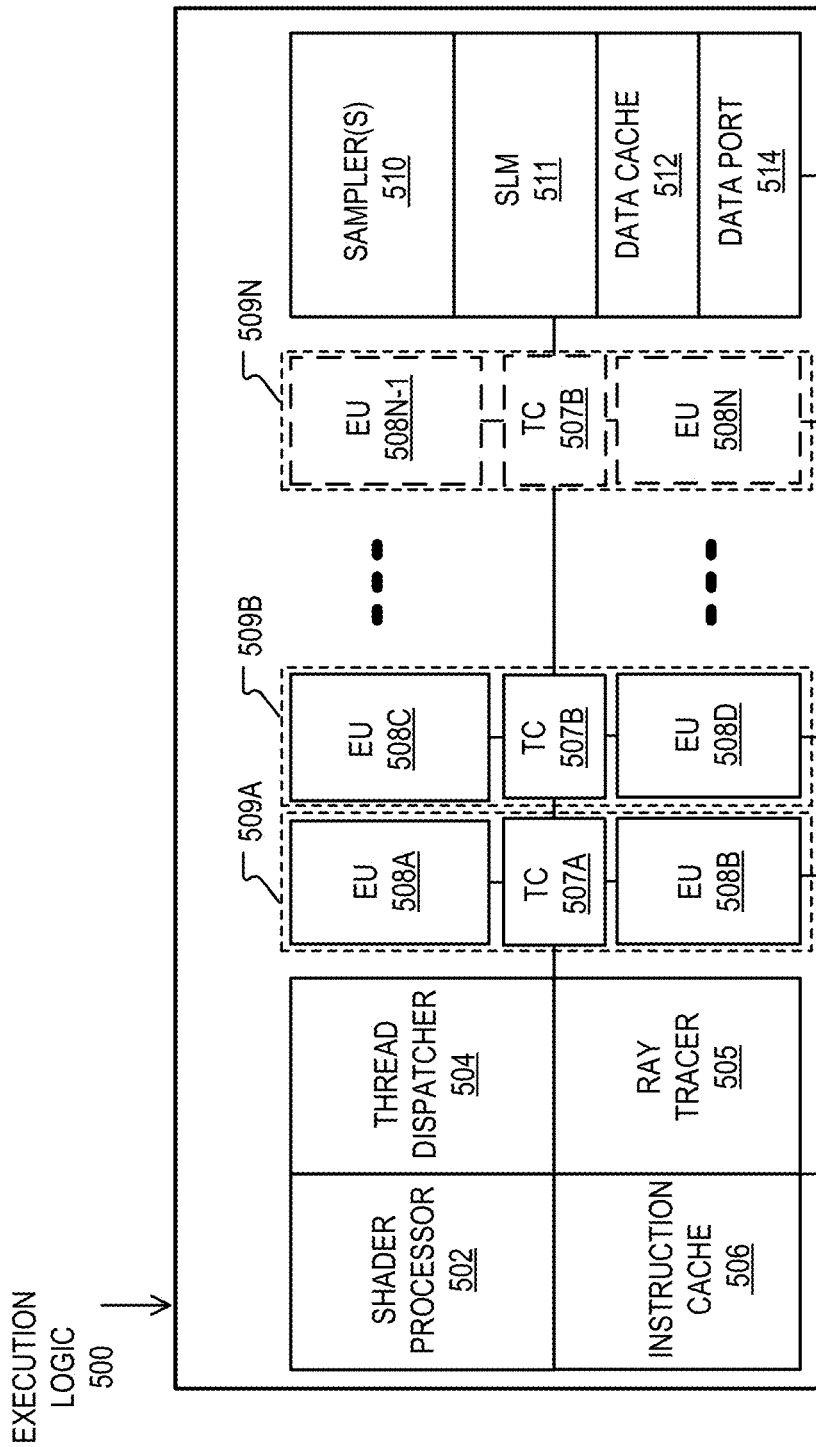
FIGS. 5A-B are a block diagrams of another embodiment of a graphics processor.
Figure 5B:
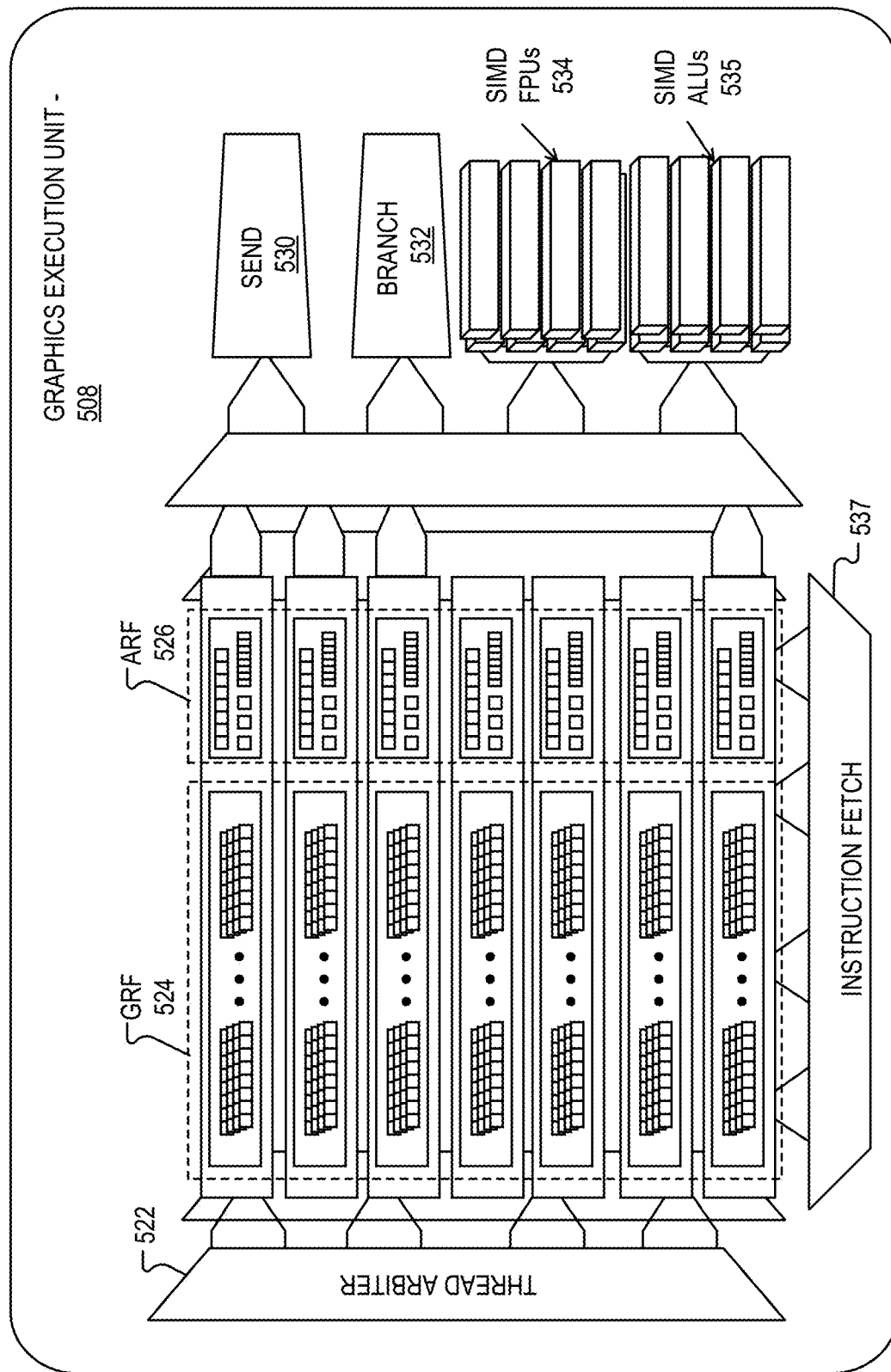

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
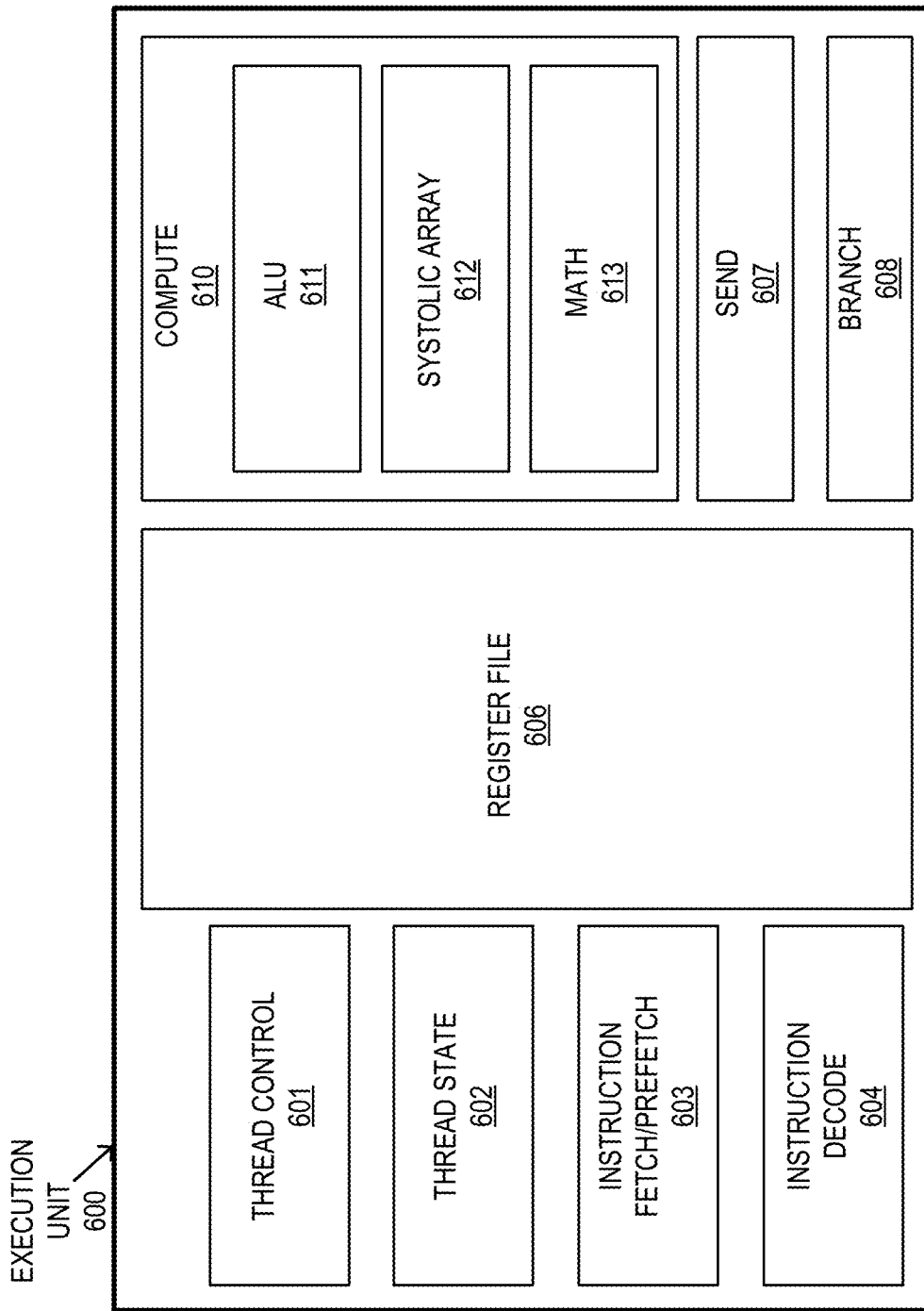
FIG. 6 illustrates examples of execution circuitry and logic.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

Figure 7:
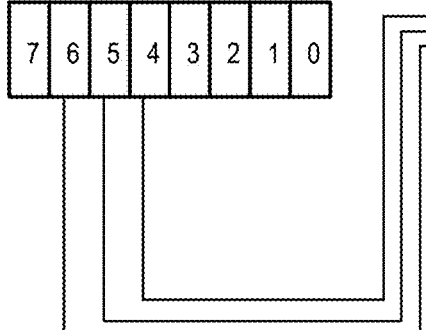
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
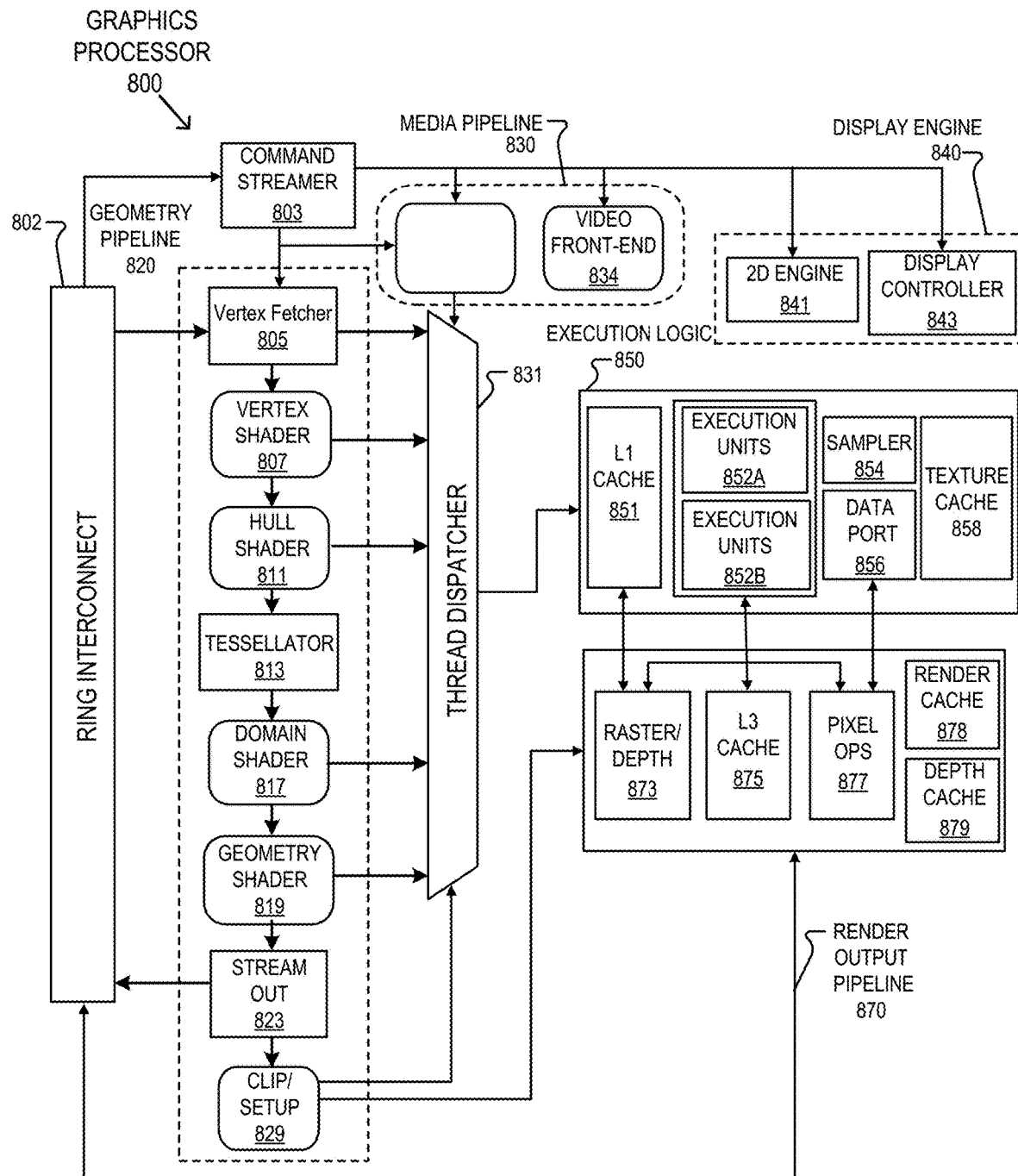
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800.

Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
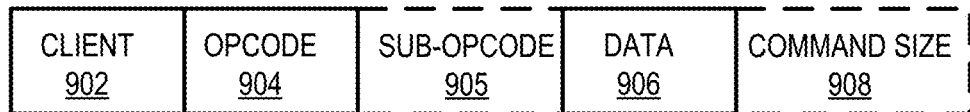
FIG. 9A is a block diagram illustrating a graphics processor command format according to an embodiment.
Figure 9B:
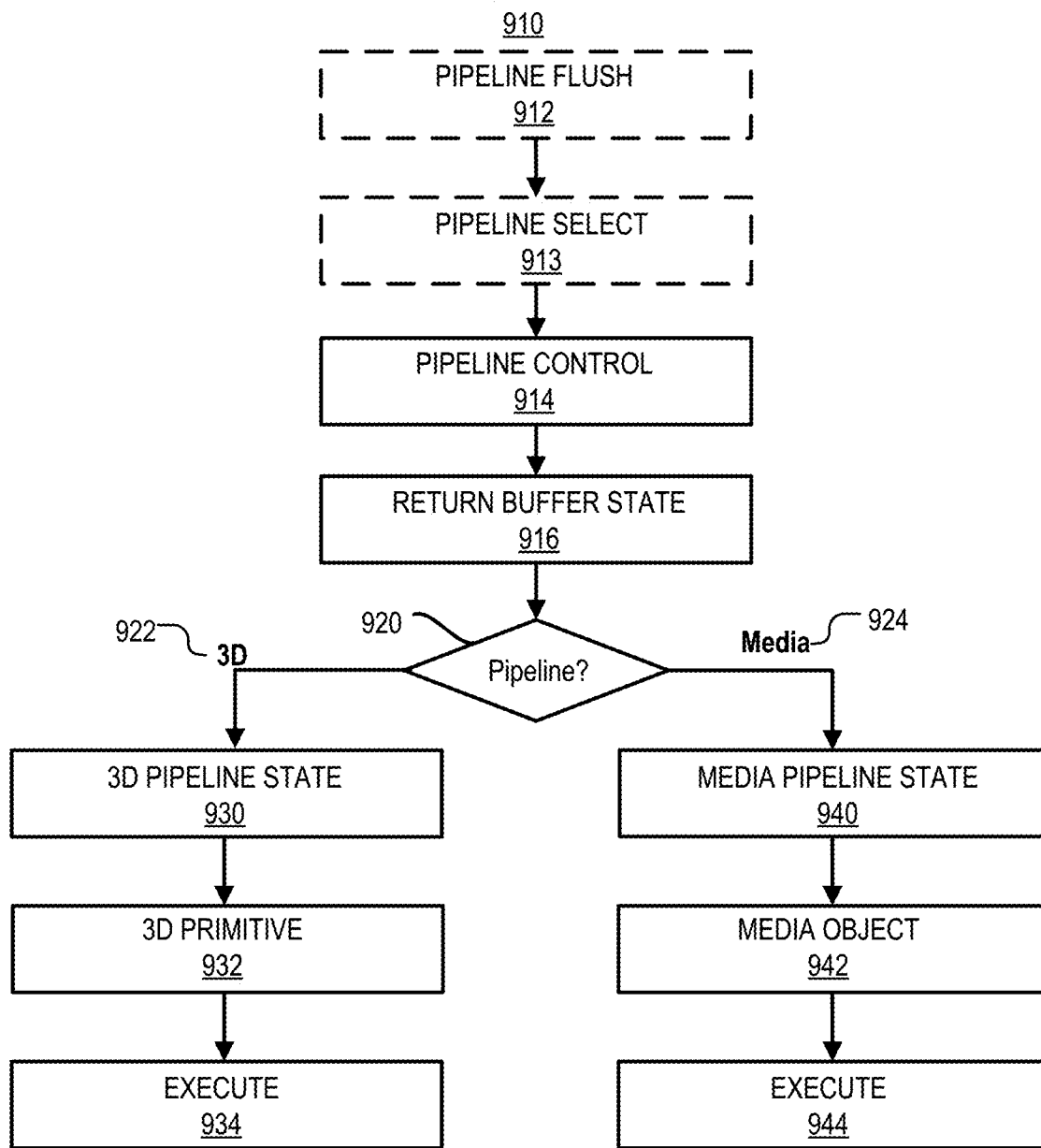
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
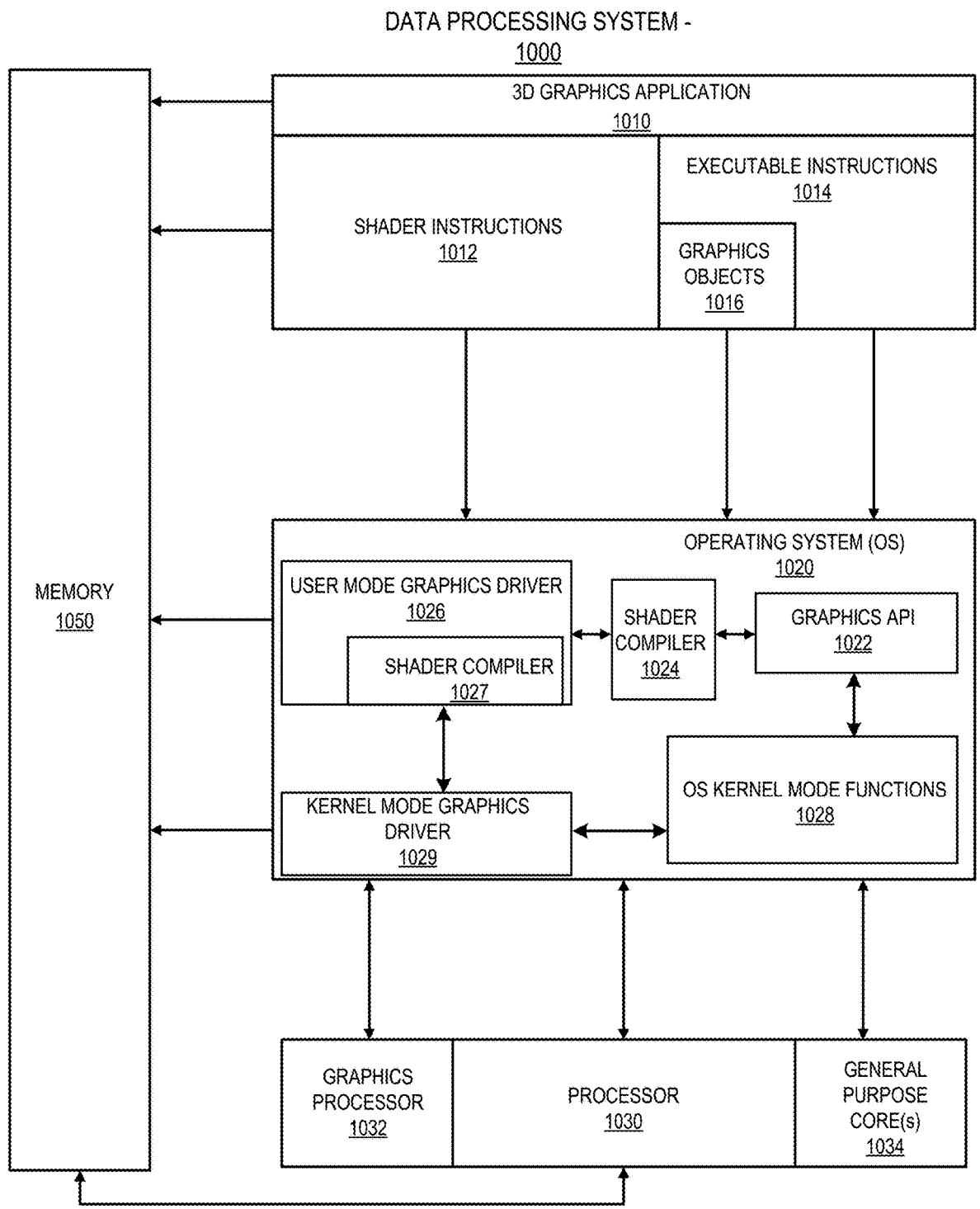
FIG. 10 illustrates exemplary graphics software architecture for a data processing system according to an embodiment.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
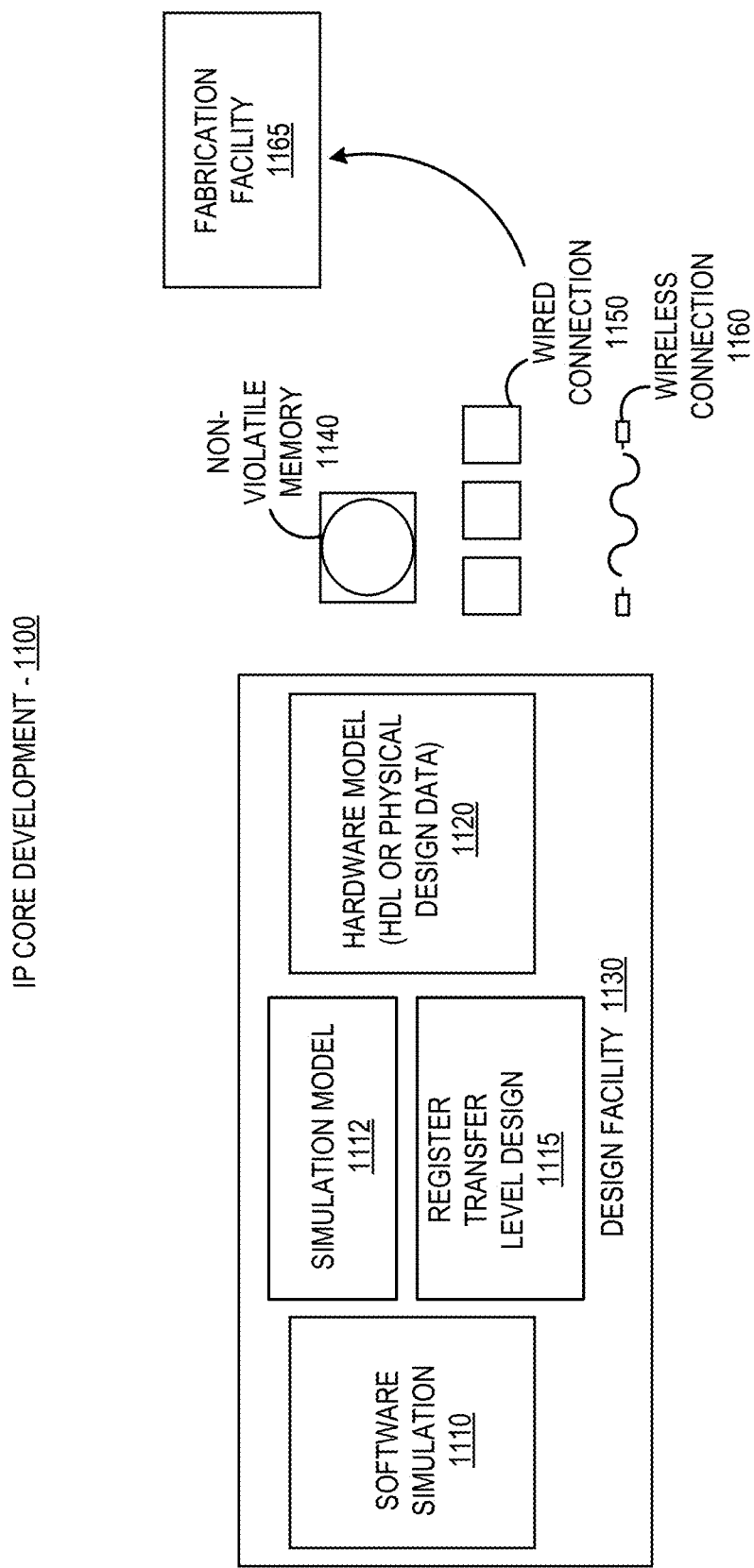
FIGS. 11A-D illustrates an exemplary IP core development system that may be used to manufacture an integrated circuit and an exemplary package assembly.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data.

The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
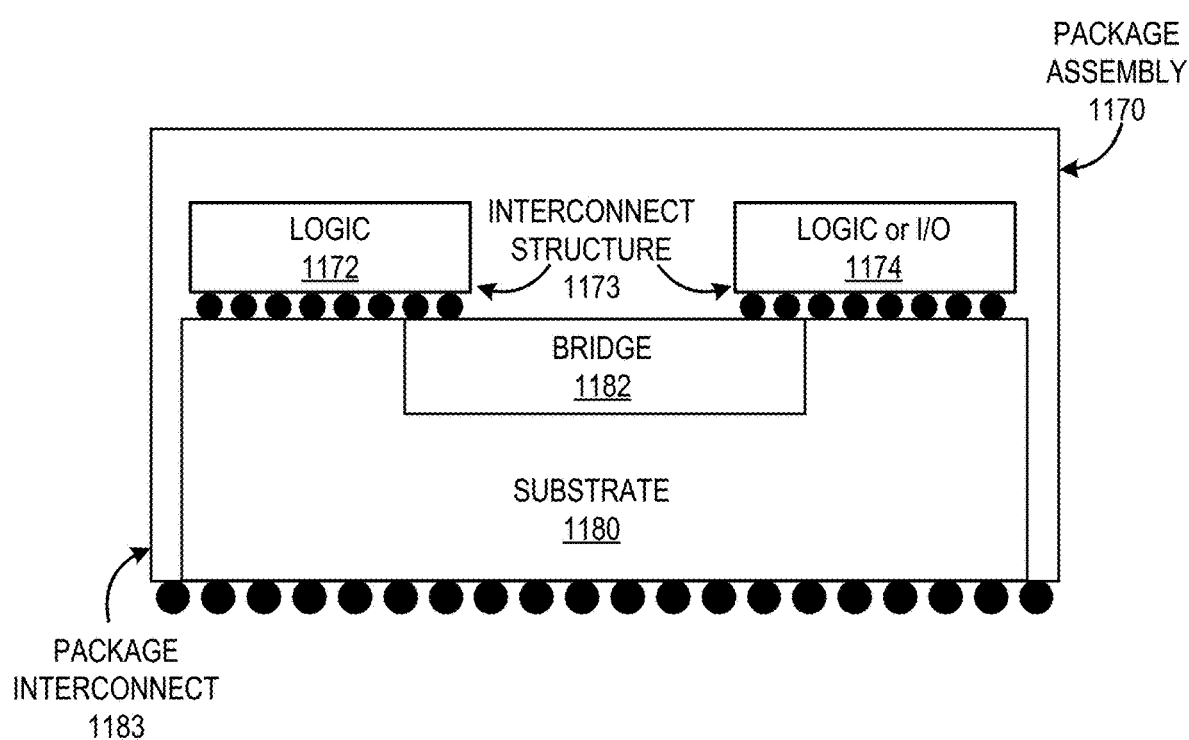

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
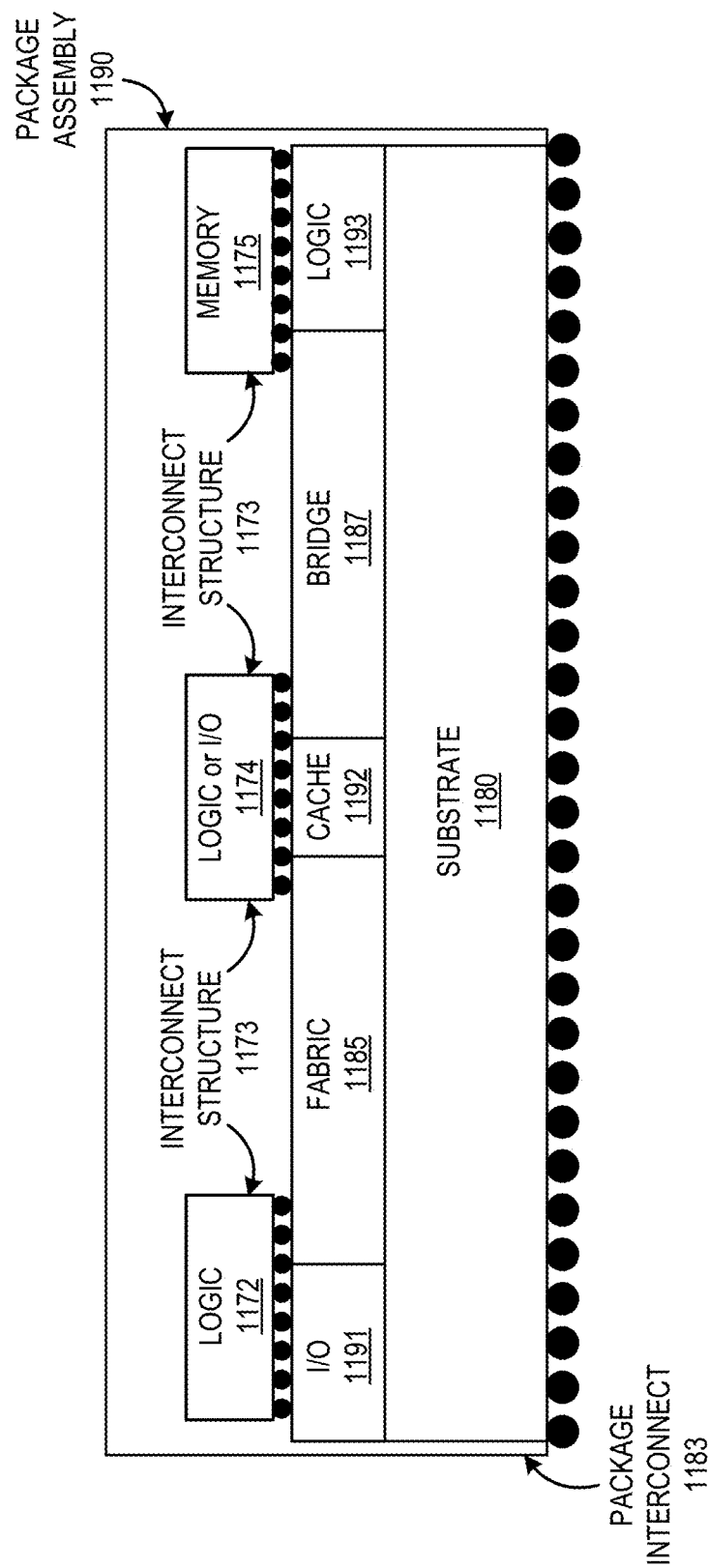

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic

1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
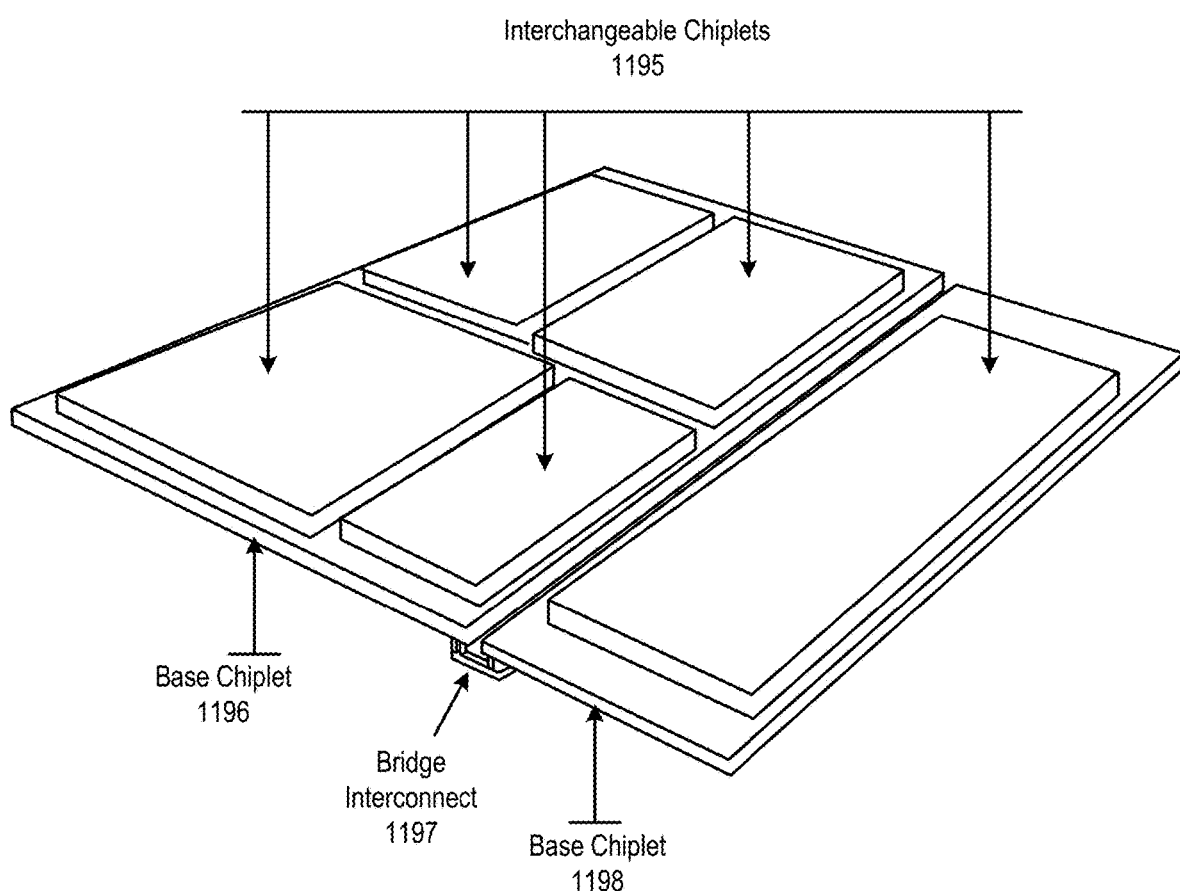

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
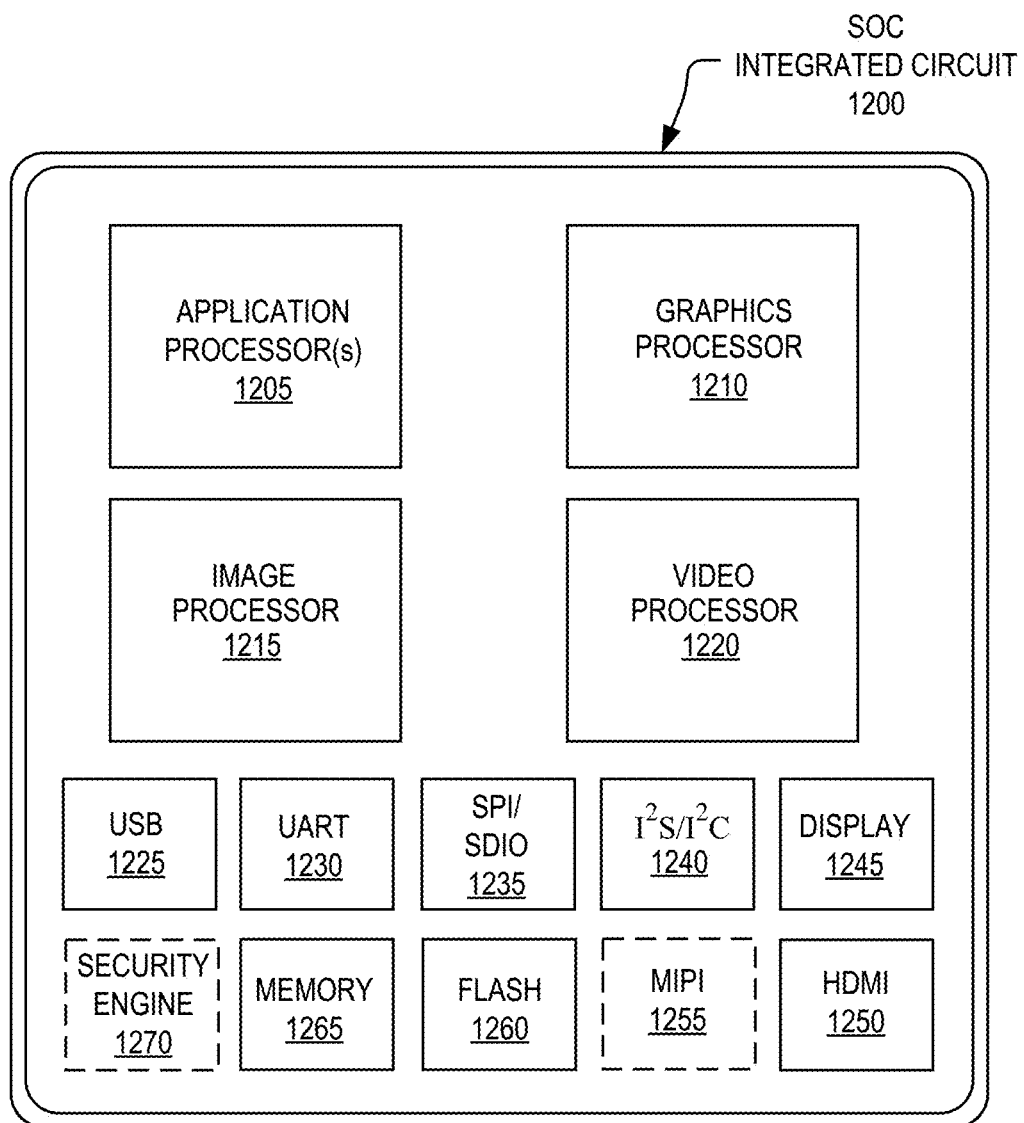
FIG. 12 illustrates an exemplary system on a chip integrated circuit that may be fabricated using one or more IP cores, according to an embodiment.
Figure 13:
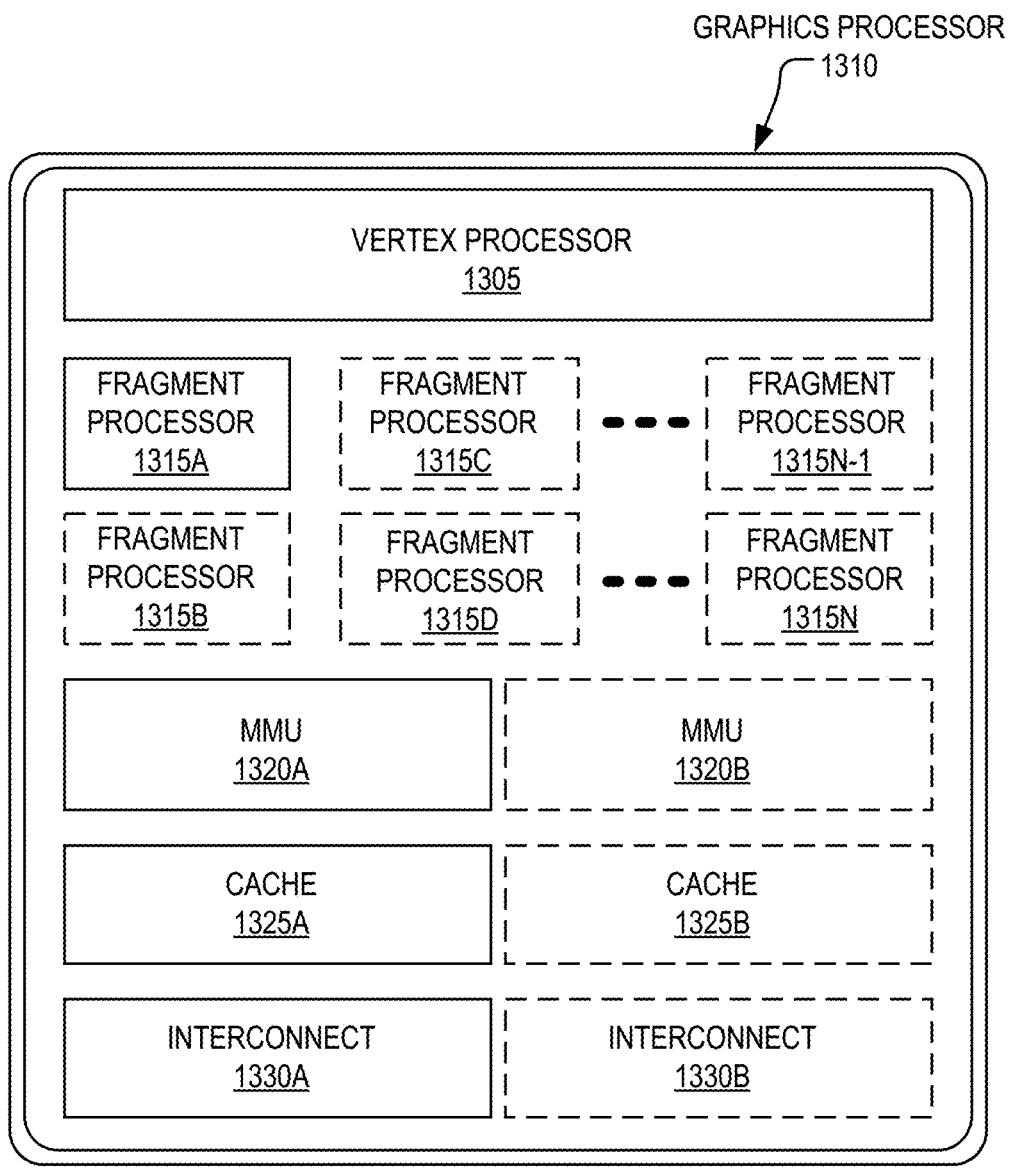
FIG. 13 illustrates an exemplary graphics processor of a system on a chip integrated circuit that may be fabricated using one or more IP cores.

FIGS. 12-13 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 14:
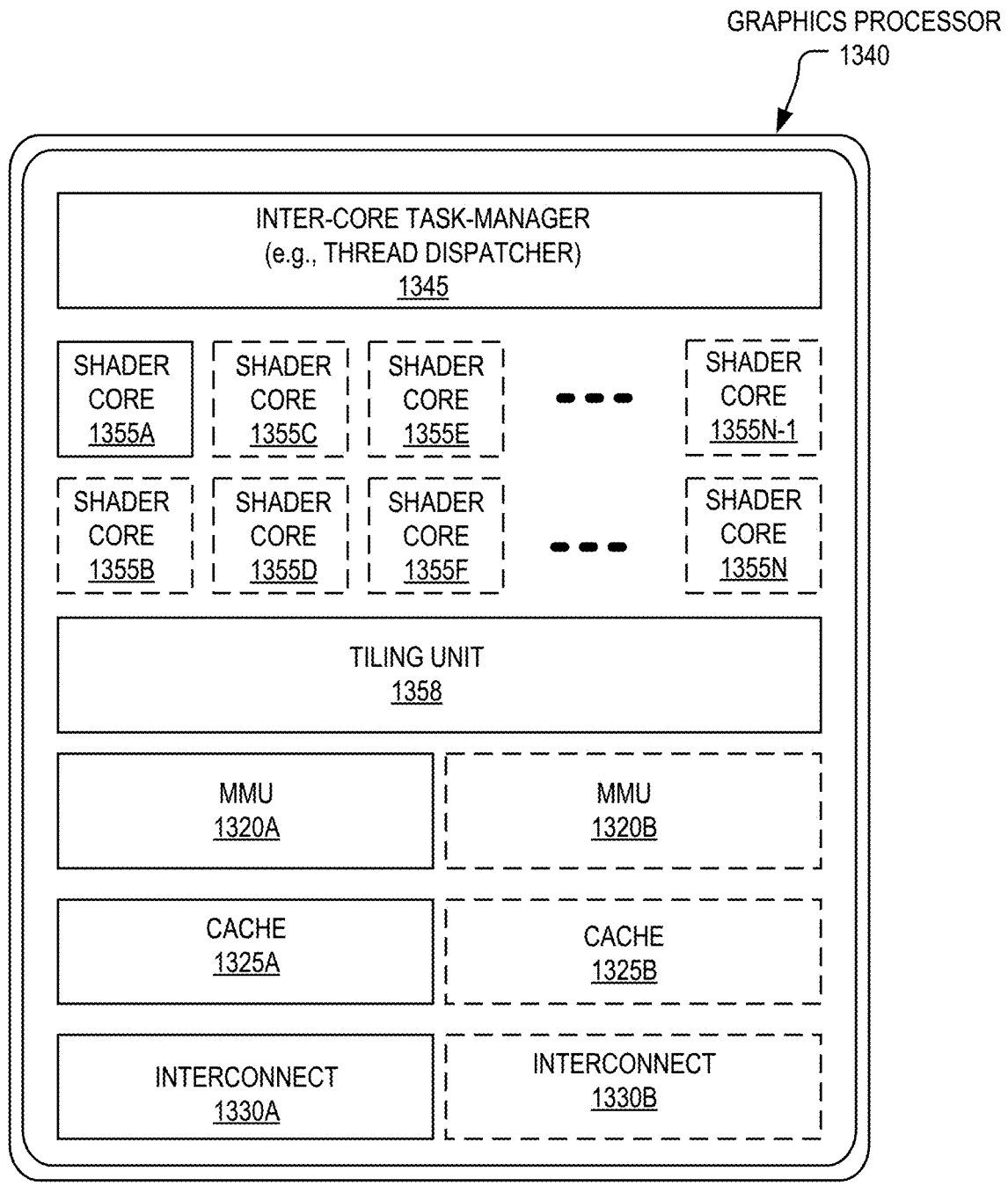
FIG. 14 illustrate exemplary graphics processor architectures.

FIGS. 13-14 are block diagrams illustrating exemplary graphics processors for use within an SoC, according to embodiments described herein. FIG. 13 illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13 is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 14, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Ray Tracing with Machine Learning

As mentioned above, ray tracing is a graphics processing technique in which a light transport is simulated through physically-based rendering. One of the key operations in ray tracing is processing a visibility query which requires traversal and intersection testing of nodes in a bounding volume hierarchy (BVH).

Ray- and path-tracing based techniques compute images by tracing rays and paths through each pixel, and using random sampling to compute advanced effects such as shadows, glossiness, indirect illumination, etc. Using only a few samples is fast but produces noisy images while using many samples produces high quality images, but is cost prohibitive.

In the last several years, a breakthrough solution to ray-/path-tracing for real-time use has come in the form of "denoising"—the process of using image processing techniques to produce high quality, filtered/denoised images from noisy, low-sample count inputs. The most effective denoising techniques rely on machine learning techniques where a machine-learning engine learns what a noisy image would likely look like if it had been computed with more samples. In one particular implementation, the machine learning is performed by a convolutional neural network (CNN); however, the underlying principles of the invention are not limited to a CNN implementation. In such an implementation, training data is produced with low-sample count inputs and ground-truth. The CNN is trained to predict the converged pixel from a neighborhood of noisy pixel inputs around the pixel in question.

Though not perfect, this AI-based denoising technique has proven surprisingly effective. The caveat, however, is that good training data is required, since the network may otherwise predict the wrong results. For example, if an animated movie studio trained a denoising CNN on past movies with scenes on land and then attempted to use the trained CNN to denoise frames from a new movie set on water, the denoising operation will perform sub-optimally.

To address this problem, one embodiment of the invention gathers learning data dynamically, while rendering, and continuously trains a machine learning engine, such as a CNN, based on the data on which it is currently being run, thus continuously improving the machine learning engine for the task at hand. This embodiment may still perform a training phase prior to runtime, but continues to adjust the machine learning weights as needed during runtime. In addition, this embodiment avoids the high cost of computing the reference data required for the training by restricting the generation of learning data to a sub-region of the image every frame or every N frames. In particular, the noisy inputs of a frame are generated for denoising the full frame with the current network. in addition, a small region of reference pixels are generated and used for continuous training, as described below.

While a CNN implementation is described with respect to certain embodiments, any form of machine learning engine may be used including, but not limited to systems which perform supervised learning (e.g., building a mathematical model of a set of data that contains both the inputs and the desired outputs), unsupervised learning (e.g., which evaluate the input data for certain types of structure), and/or a combination of supervised and unsupervised learning.

Existing de-noising implementations operate in a training phase and a runtime phase. During the training phase, a network topology is defined which receives a region of N×N pixels with various per-pixel data channels such as pixel color, depth, normal, normal deviation, primitive IDs, and albedo and generates a final pixel color. A set of "representative" training data is generated using one frame's worth of low-sample count inputs, and referencing the "desired" pixel colors computed with a very high sample count. The network is trained towards these inputs, generating a set of "ideal" weights for the network. In these implementations, the reference data is used to train the network's weights to most closely match the network's output to the desired result.

At runtime, the given, pre-computed ideal network weights are loaded and the network is initialized. For each frame, a low-sample count image of denoising inputs (i.e., the same as used for training) is generated. For each pixel, the given neighborhood of pixels' inputs is run through the network to predict the "denoised" pixel color, generating a denoised frame.

Figure 15:
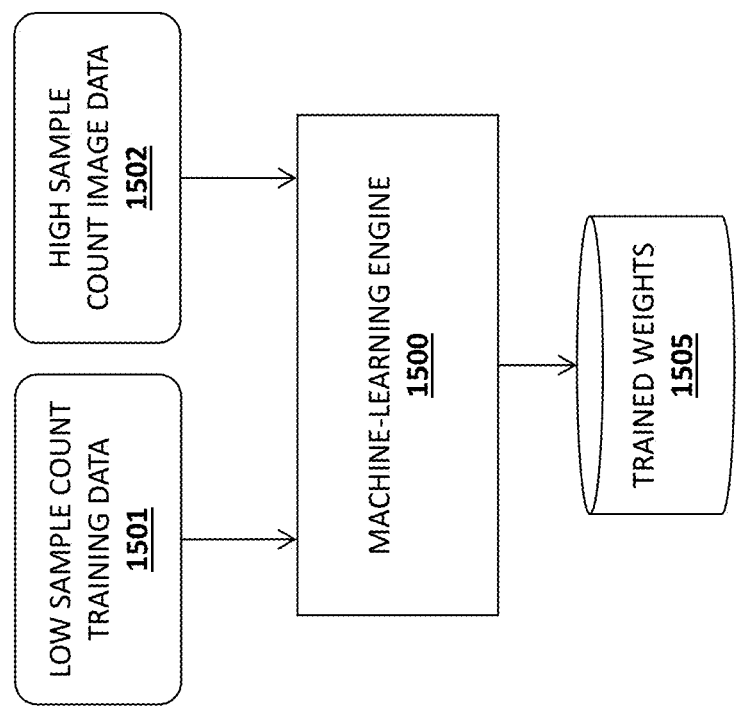
FIG. 15 illustrates one embodiment of an initial training implementation.

FIG. 15 illustrates one embodiment of an initial training implementation. A machine learning engine 1500 (e.g., a CNN) receives a region of N×N pixels as high sample count image data 1702 with various per-pixel data channels such as pixel color, depth, normal, normal deviation, primitive IDs, and albedo and generates final pixel colors. Representative training data is generated using one frame's worth of low-sample count inputs 1501. The network is trained towards these inputs, generating a set of "ideal" weights 1505 which the machine learning engine 1500 subsequently uses to denoise low sample count images at runtime.

Figure 16:
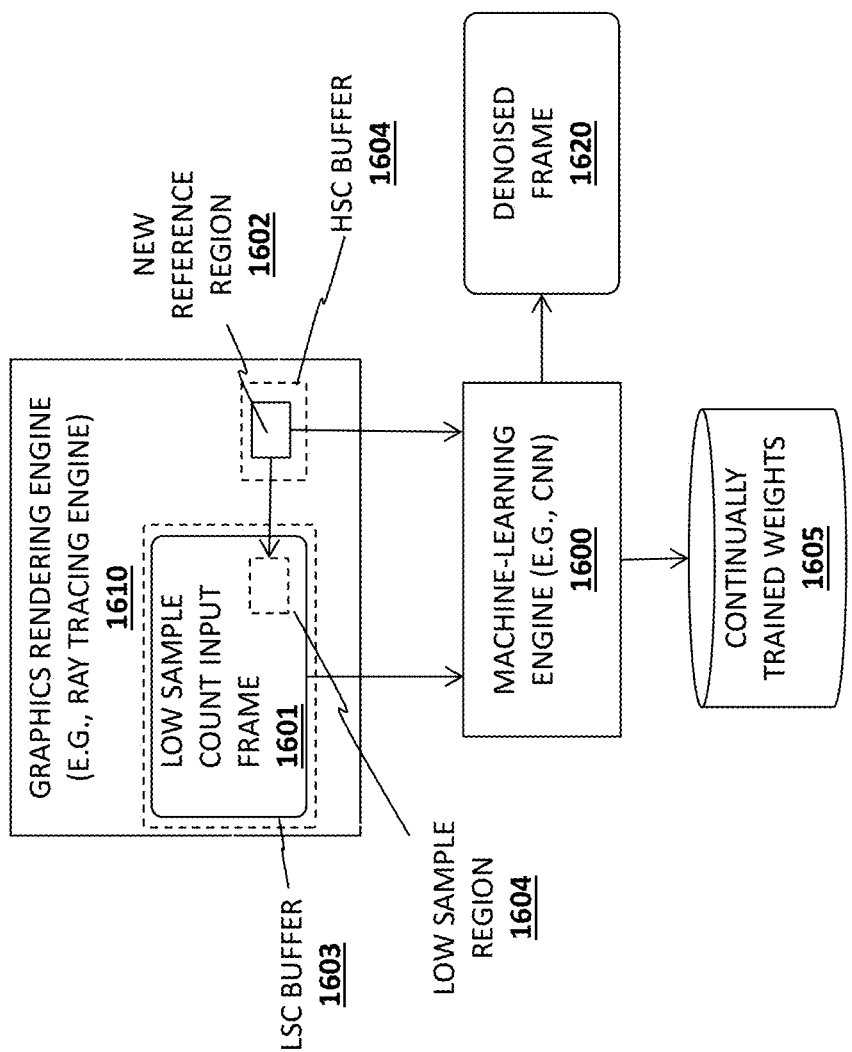
FIG. 16 illustrates one embodiment which chooses one or more regions in each frame.

To improve the above techniques, one embodiment of the invention augments the denoising phase to generate new training data every frame or a subset of frames (e.g., every N frames where N=2, 3, 4, 10, 25, etc). In particular, as illustrated in FIG. 16, this embodiment chooses one or more regions in each frame, referred to here as "new reference regions" 1602 which are rendered with a high sample count into a separate high sample count buffer 1604. A low sample count buffer 1603 stores the low sample count input frame 1601 (including the low sample region 1604 corresponding to the new reference region 1602).

In one embodiment, the location of the new reference region 1602 is randomly selected. Alternatively, the location of the new reference region 1602 may be adjusted in a pre-specified manner for each new frame (e.g., using a predefined movement of the region between frames, limited to a specified region in the center of the frame, etc).

Regardless of how the new reference region is selected, it is used by the machine learning engine 1600 to continually refine and update the trained weights 1605 used for denoising. In particular, reference pixel colors from each new reference region 1602 and noisy reference pixel inputs from a corresponding low sample count region 1607 are rendered. Supplemental training is then performed on the machine learning engine 1600 using the high-sample-count reference region 1602 and the corresponding low sample count region 1607. In contrast to the initial training, this training is performed continuously during runtime for each new reference region 1602—thereby ensuring that the machine learning engine 1600 is precisely trained. For example, per-pixel data channels (e.g., pixel color, depth, normal, normal deviation, etc) may be evaluated, which the machine learning engine 1600 uses to make adjustments to the trained weights 1605. As in the training case (FIG. 15), the machine learning engine 1600 is trained towards a set of ideal weights 1605 for removing noise from the low sample count input frame 1601 to generate the denoised frame 1620. However, in this embodiment, the trained weights 1605 are continually updated, based on new image characteristics of new types of low sample count input frames 1601.

In one embodiment, the re-training operations performed by the machine learning engine 1600 are executed concurrently in a background process on the graphics processor unit (GPU) or host processor. The render loop, which may be implemented as a driver component and/or a GPU hardware component, continuously produces new training data (e.g., in the form of new reference regions 1602) which it places in a queue. The background training process, executed on the GPU or host processor, continuously reads the new training data from this queue, re-trains the machine learning engine 1600, and updates it with new weights 1605 at appropriate intervals.

Figure 17:
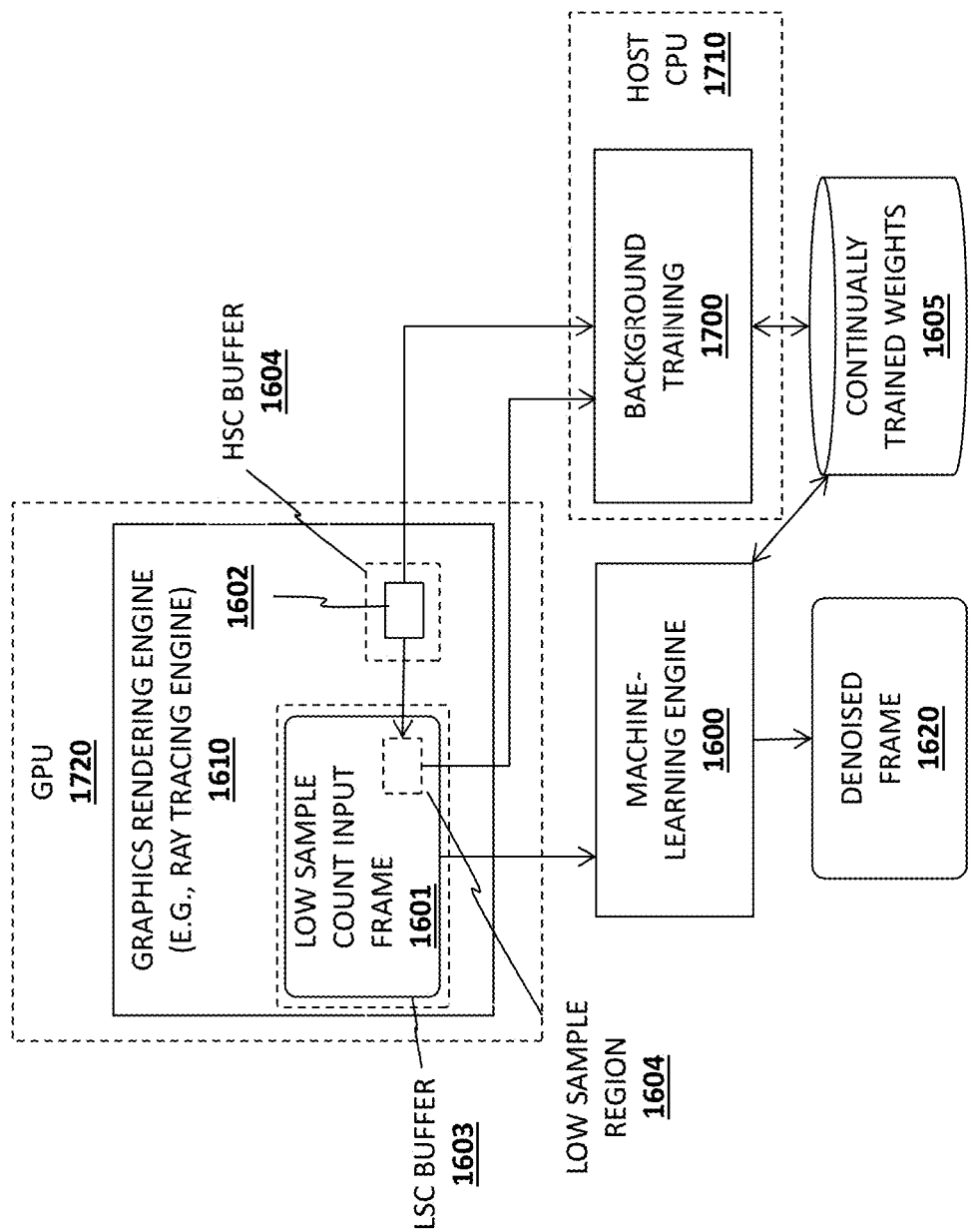
FIG. 17 illustrates an example implementation in which the background training process is implemented by the host CPU.

FIG. 17 illustrates an example of one such implementation in which the background training process 1700 is implemented by the host CPU 1710. In particular, in this embodiment, the background training process 1700 uses the high sample count new reference region 1602 and the corresponding low sample region 1604 to continually update the trained weights 1605, thereby updating the machine learning engine 1600.

Figure 18A:
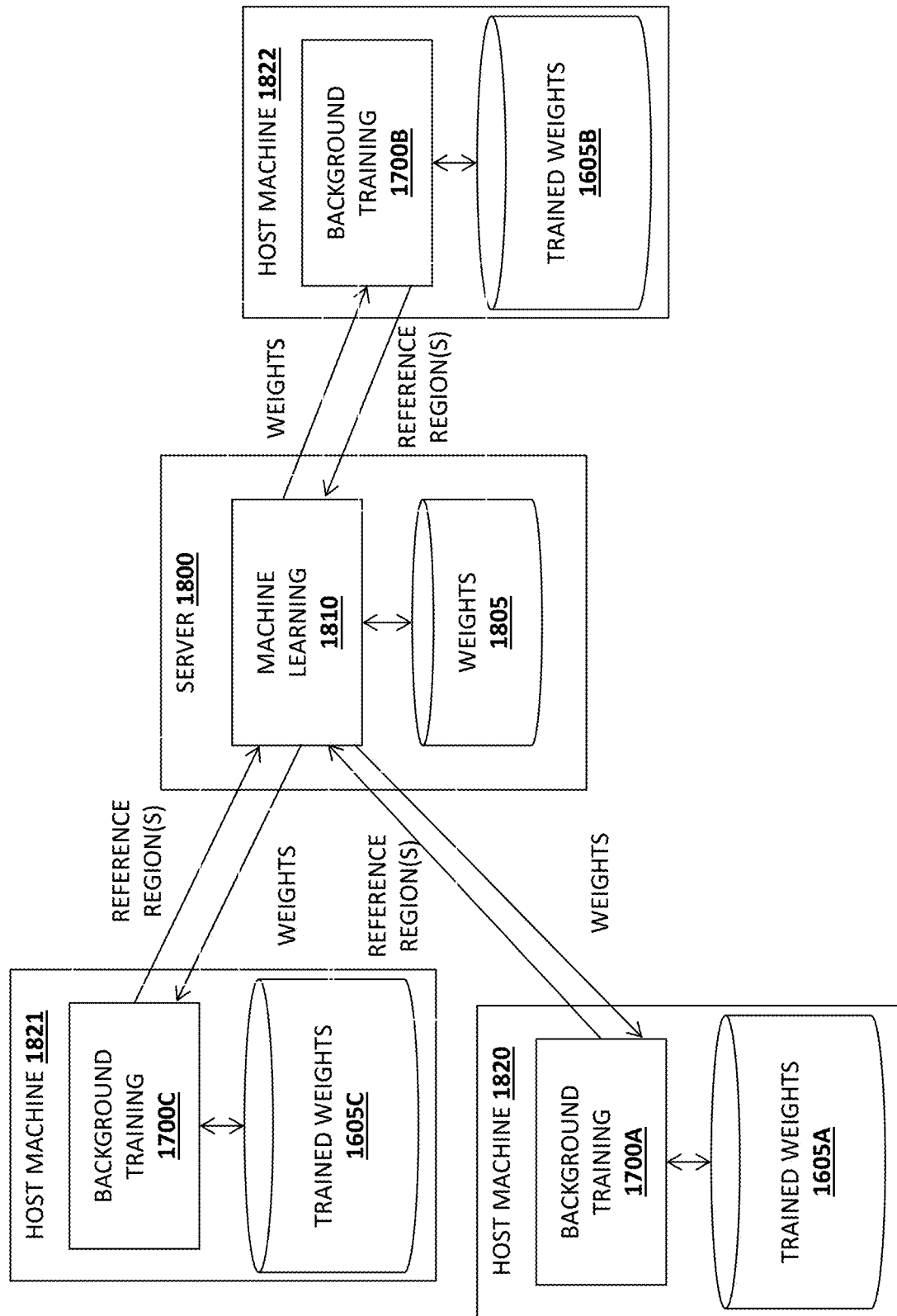
FIGS. 18A-B illustrate an implementation in which different host machines generate reference regions.

As illustrated in FIG. 18A, in one implementation such as in a multi-player online game, different host machines 1820-1822 individually generate reference regions which a background training process 1700A-C transmits to a server 1800 (e.g., such as a gaming server). The server 1800 then performs training on a machine learning engine 1810 using the new reference regions received from each of the hosts 1821-1822, updating the weights 1805 as previously described. It transmits these weights 1805 to the host machines 1820 which store the weights 1605A-C, thereby updating each individual machine learning engine (not shown). Because the server 1800 may be provided a large number of reference regions in a short period of time, it can efficiently and precisely update the weights for any given application (e.g., an online game) being executed by the users.

Figure 18B:
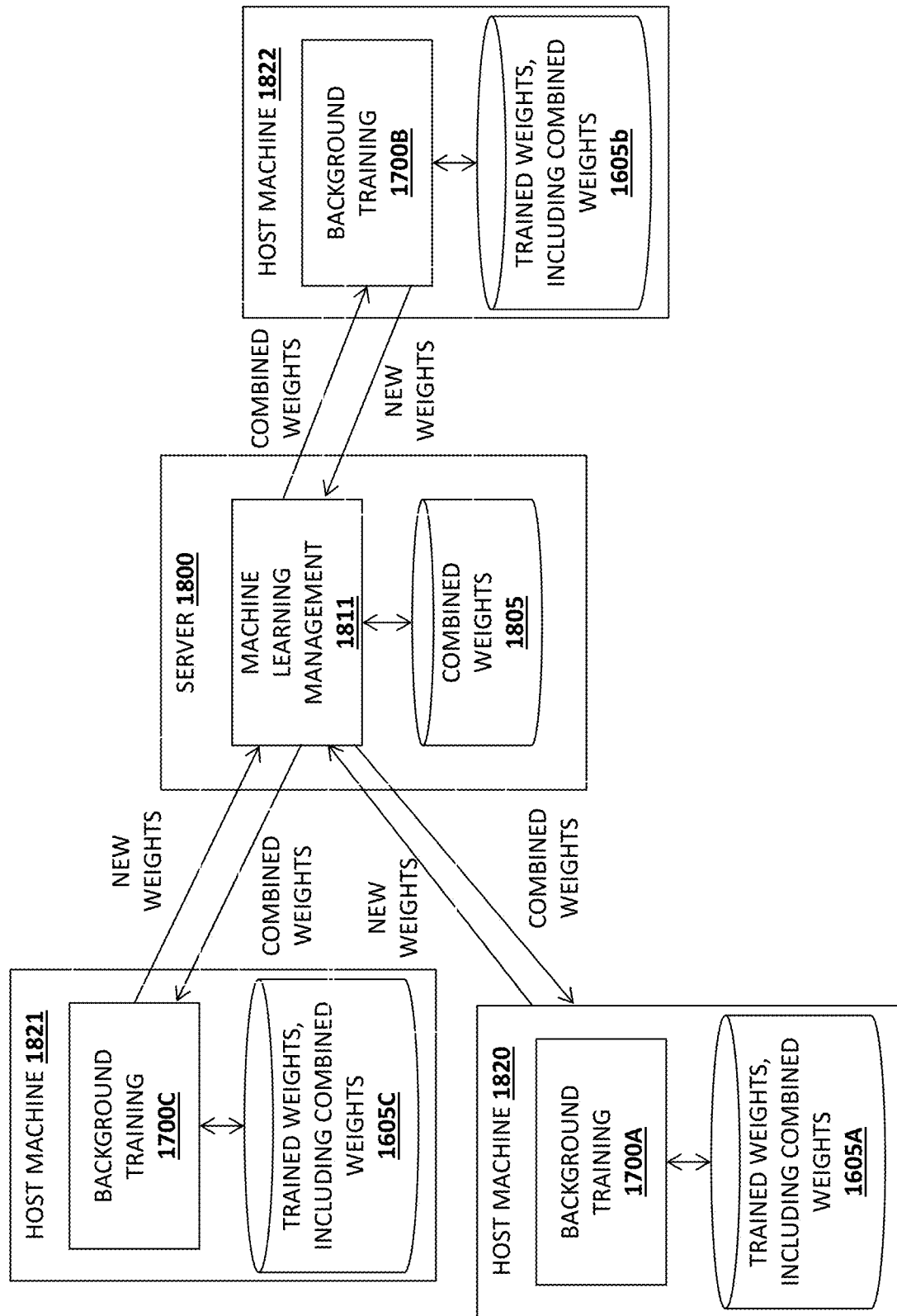

As illustrated in FIG. 18B, the different host machines may generate new trained weights (e.g., based on training/reference regions 1602 as previously described) and share the new trained weights with a server 1800 (e.g., such as a gaming server) or, alternatively, use a peer-to-peer sharing protocol. A machine learning management component 1810 on the server generates a set of combined weights 1805 using the new weights received from each of the host machines. The combined weights 1805, for example, may be an average generated from the new weights and continually updated as described herein. Once generated, copies of the combined weights 1605A-C may be transmitted and stored on each of the host machines 1820-1821 which may then use the combined weights as described herein to perform denoising operations.

In one embodiment, this semi-closed loop update mechanism can be used by the hardware manufacturer. For example, the reference network may be included as part of the driver distributed by the hardware manufacturer. As the driver generates new training data using the techniques described herein and continuously submits these back to the hardware manufacturer, the hardware manufacturer uses this information to continue to improve its machine learning implementations for the next driver update.

In one implementation (e.g., in batch movie rendering on a render farm) the renderer transmits the newly generated training regions to a dedicated server or database (in that studio's render farm) that aggregates this data from multiple render nodes over time. A separate process on a separate machine continuously improves the studio's dedicated denoising network, and new render jobs always use the latest trained network.

Figure 19:
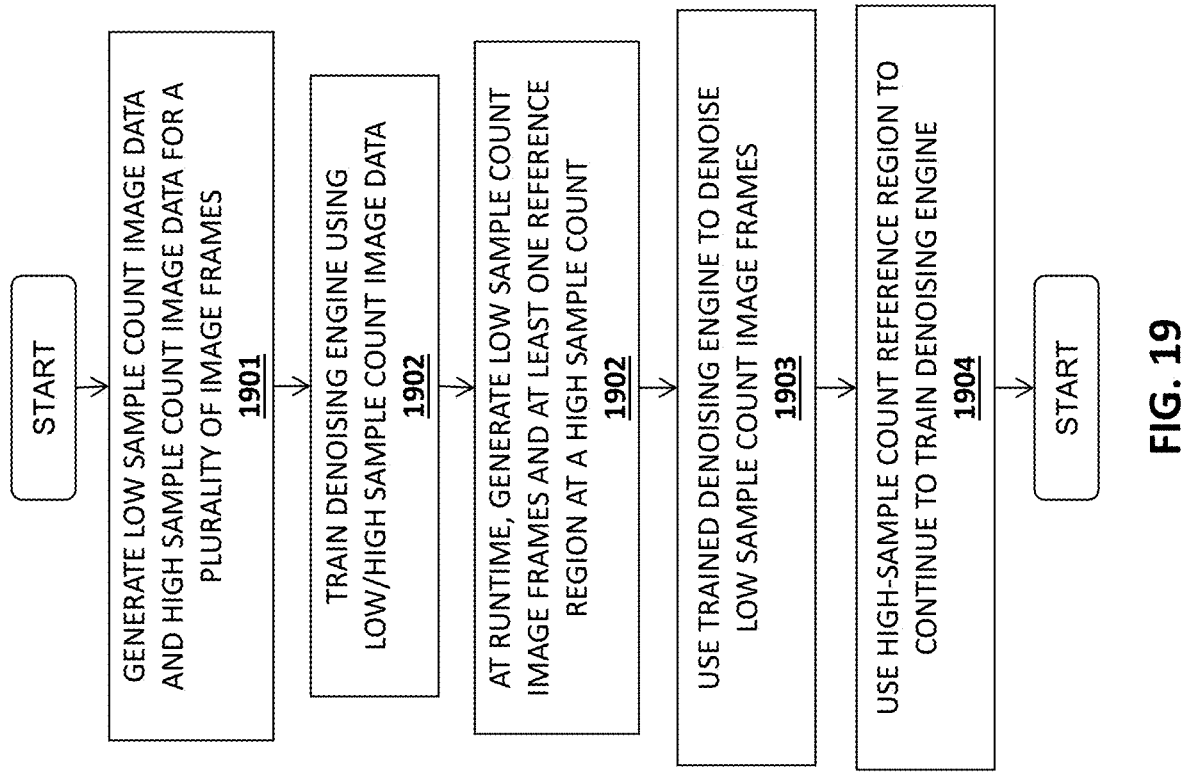
FIG. 19 illustrates a method in accordance with one embodiment of the invention.

A method in accordance with one embodiment of the invention is illustrated in FIG. 19. The method may be implemented on the architectures described herein, but is not limited to any particular system or graphics processing architecture.

At 1901, as part of the initial training phase, low sample count image data and high sample count image data are generated for a plurality of image frames. At 1902, a machine-learning denoising engine is trained using the high/low sample count image data. In one embodiment, for example, a set of convolutional neural network weights associated with pixel features may be updated in accordance with the training. However, any machine-learning architecture may be used.

At 1903, at runtime, low sample count image frames are generated along with at least one reference region having a high sample count. At 1904, the high sample count reference region is used by the machine-learning engine and/or separate training logic (e.g., background training module 1700) to continually refine the training of the machine learning engine. For example, in one embodiment, the high sample count reference region is used in combination with a corresponding portion of the low sample count image to continue to teach the machine learning engine 1904 how to most effectively perform denoising. In a CNN implementation, for example, this may involve updating the weights associated with the CNN.

Multiple variations of the embodiments described above may be implemented, such as the manner in which the feedback loop to the machine learning engine is configured, the entities which generate the training data, the manner in which the training data is fed back to training engine, and how the improved network is provided to the rendering engines. In addition, while the above embodiments described above perform continuous training using a single reference region, any number of reference regions may be used. Moreover, as previously mentioned, the reference regions may be of different sizes, may be used on different numbers of image frames, and may be positioned in different locations within the image frames using different techniques (e.g., random, according to a predetermined pattern, etc).

In addition, while a convolutional neural network (CNN) is described as one example of a machine-learning engine 1600, the underlying principles of the invention may be implemented using any form of machine learning engine which is capable of continually refining its results using new training data. By way of example, and not limitation, other machine learning implementations include the group method of data handling (GMDH), long short-term memory, deep reservoir computing, deep belief networks, tensor deep stacking networks, and deep predictive coding networks, to name a few.

Cloud-Based Virtualization

In some embodiments of the invention, a server performs graphics virtualization, virtualizing physical GPUs and running graphics applications on behalf of clients. FIG. 19 illustrates one such embodiment in which two clients 1901-1902 are connected to servers 1930 over a network 1910 such as the Internet and/or a private network. The servers 1930 implement a virtualized graphics environment in which a hypervisor 1960 allocates resources from one or more physical GPUs 1938, presenting the resources as virtual GPUs 1934-1935 to VMs/applications 1932-1933. The graphics processing resources may allocated in accordance with resource allocation policies 1961 which may cause the hypervisor 1960 to allocate resources based on the requirements of the applications 1932-1933 (e.g., higher performance graphics applications requiring more resources), the user account associated with the applications 1932-1933 (e.g., with certain users paying a premium for higher performance), and/or the current load on the system. The GPU resources being allocated may include, for example, sets of graphics processing engines such as 3D engines, blit engines, execution units, and media engines, to name a few.

In one embodiment, a user of each client 1901-1902 has an account on the service hosting the server(s) 1930. For example, the service may offer a subscription service to provide users remote access to online applications 1932-1933 such as video games, productivity applications, and multi-player virtual reality applications. In one embodiment, the applications are executed remotely on a virtual machine in response to user input 1907-1908 from the clients 1901-1902. Although not illustrated in FIG. 19, one or more CPUs may also be virtualized and used to execute the applications 1932-1933, with graphics processing operations offloaded to the vGPUs 1934-1935.

In one embodiment, a sequence of image frames are generated by the vGPUs 1934-1935 in response to the execution of the graphics operations. For example, in a first person shooter game, a user may specify input 1907 to move a character around a fantasy world. In one embodiment, the resulting images are compressed (e.g., by compression circuitry/logic, not shown) and streamed over the network 1910 to the clients 1901-1902. In one implementation, a video compression algorithm such as H.261 may be used; however, various different compression techniques may be used. Decoders 1905-1906 decode the incoming video streams, which are then rendered on respective displays 1903-1904 of the clients 1901-1902.

Using the system illustrated in FIG. 19, high performance graphics processing resources such as GPUs 1938 may be allocated to different clients who subscribe to the service. In an online gaming implementation, for example, the servers 1930 may host new video games as they are released. The video game program code is then executed in the virtualized environment and the resulting video frames compressed and streamed to each client 1901-1902. The clients 1901-1902 in this architecture do not require significant graphics processing resources. For example, even a relatively low power smartphone or tablet with a decoder 1905-1906 will be capable of decompressing a video stream. Thus, the latest graphics-intensive video games may be played on any type of client capable of compressing video. While video games are described as one possible implementation, the underlying principles of the invention may be used for any form of application which requires graphics processing resources (e.g., graphic design applications, interactive and non-interactive ray tracing applications, productivity software, video editing software, etc).

Distributed Denoising

As described above, denoising has become a critical feature real-time ray tracing with smooth, noiseless images. Rendering can be done across a distributed system on multiple devices, but so far the existing denoising frameworks all operate on a single instance on a single machine. If rendering is being done across multiple devices, they may not have all rendered pixels accessible for computing a denoised portion of the image.

One embodiment of the invention includes a distributed denoising algorithm that works with both artificial intelligence (AI) and non-AI based denoising techniques. Regions of the image are either already distributed across nodes from a distributed render operation, or split up and distributed from a single framebuffer. Ghost regions of neighboring regions needed for computing sufficient denoising are collected from neighboring nodes when needed, and the final resulting tiles are composited into a final image.

Distributed Processing

Figure 20:
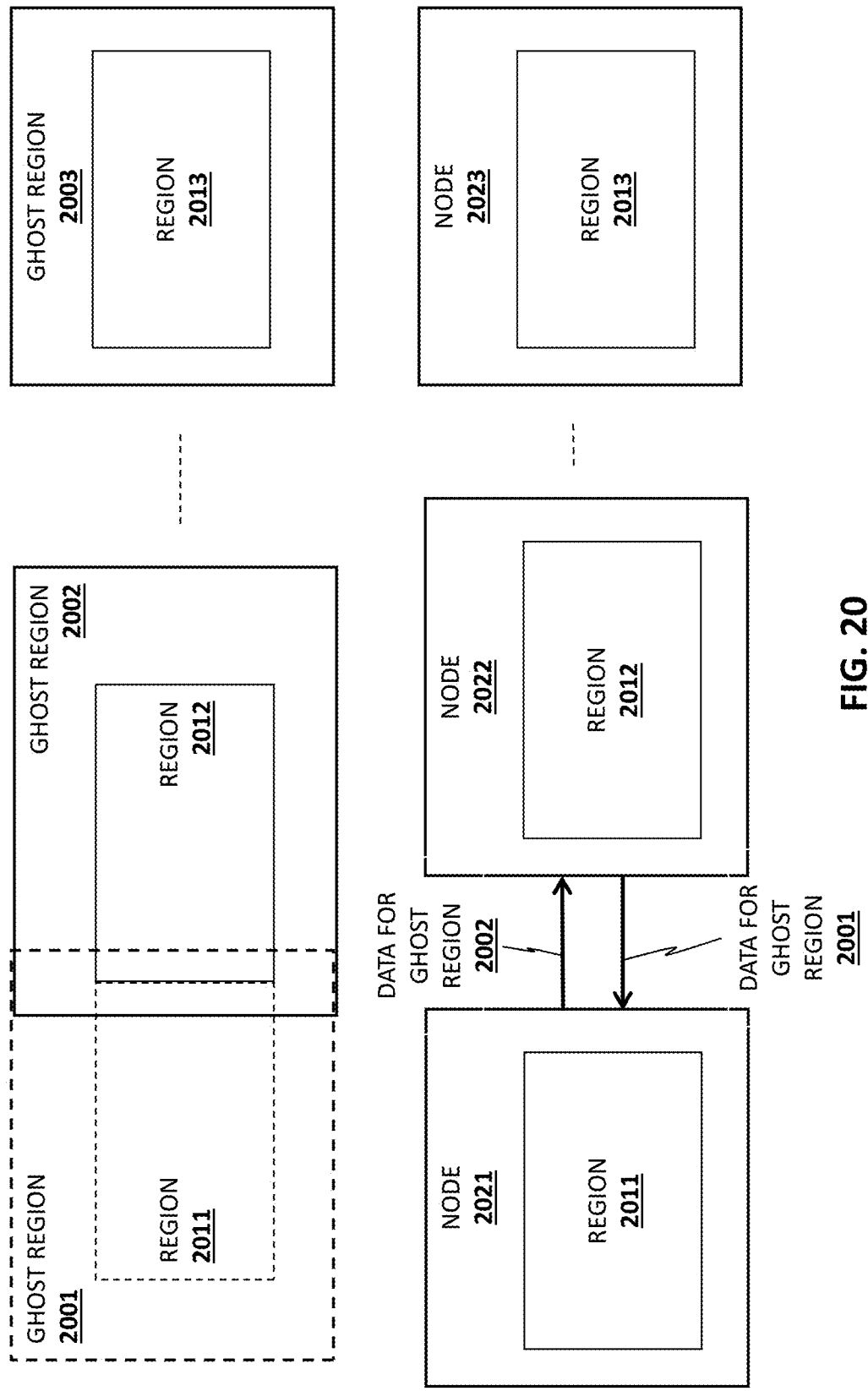
FIG. 20 illustrates one embodiment in which nodes exchange ghost region data to perform distributed denoising operations.

FIG. 20 illustrates one embodiment of the invention where multiple nodes 2021-2023 perform rendering. While only three nodes are illustrated for simplicity, the underlying principles of the invention are not limited to any particular number of nodes. In fact, a single node may be used to implement certain embodiments of the invention.

Nodes 2021-2023 each render a portion of an image, resulting in regions 2011-2013 in this example. While rectangular regions 2011-2013 are shown in FIG. 20, regions of any shape may be used and any device can process any number of regions. The regions that are needed by a node to perform a sufficiently smooth denoising operation are referred to as ghost regions 2011-2013. In other words, the ghost regions 2001-2003 represent the entirety of data required to perform denoising at a specified level of quality. Lowering the quality level reduces the size of the ghost region and therefore the amount of data required and raising the quality level increases the ghost region and corresponding data required.

In one embodiment, if a node such as node 2021 does have a local copy of a portion of the ghost region 2001 required to denoise its region 2011 at a specified level of quality, the node will retrieve the required data from one or more "adjacent" nodes, such as node 2022 which owns a portion of ghost region 2001 as illustrated. Similarly, if node 2022 does have a local copy of a portion of ghost region 2002 required to denoise its region 2012 at the specified level of quality, node 2022 will retrieve the required ghost region data 2032 from node 2021. The retrieval may be performed over a bus, an interconnect, a high speed memory fabric, a network (e.g., high speed Ethernet), or may even be an on-chip interconnect in a multi-core chip capable of distributing rendering work among a plurality of cores (e.g., used for rendering large images at either extreme resolutions or time varying). In one embodiment, each node 2021-2023 comprises an individual execution unit or specified set of execution units within a graphics processor.

The specific amount of data to be sent is dependent on the denoising techniques being used. Moreover, the data from the ghost region may include any data needed to improve denoising of each respective region. In one embodiment, for example, the ghost region data includes image colors/wavelengths, intensity/alpha data, and/or normals. However, the underlying principles of the invention are not limited to any particular set of ghost region data.

Additional Details of One Embodiment

For slower networks or interconnects, compression of this data can be utilized using existing general purpose lossless or lossy compression. Examples include, but are not limited to, zlib, gzip, and Lempel-Ziv-Markov chain algorithm (LZMA). Further content-specific compression may be used by noting that the delta in ray hit information between frames can be quite sparse, and only the samples that contribute to that delta need to be sent when the node already has the collected deltas from previous frames. These can be selectively pushed to nodes that collect those samples, i, or node i can request samples from other nodes. In one embodiment, lossless compression is used for certain types of data and program code while lossy data is used for other types of data.

Figure 21:
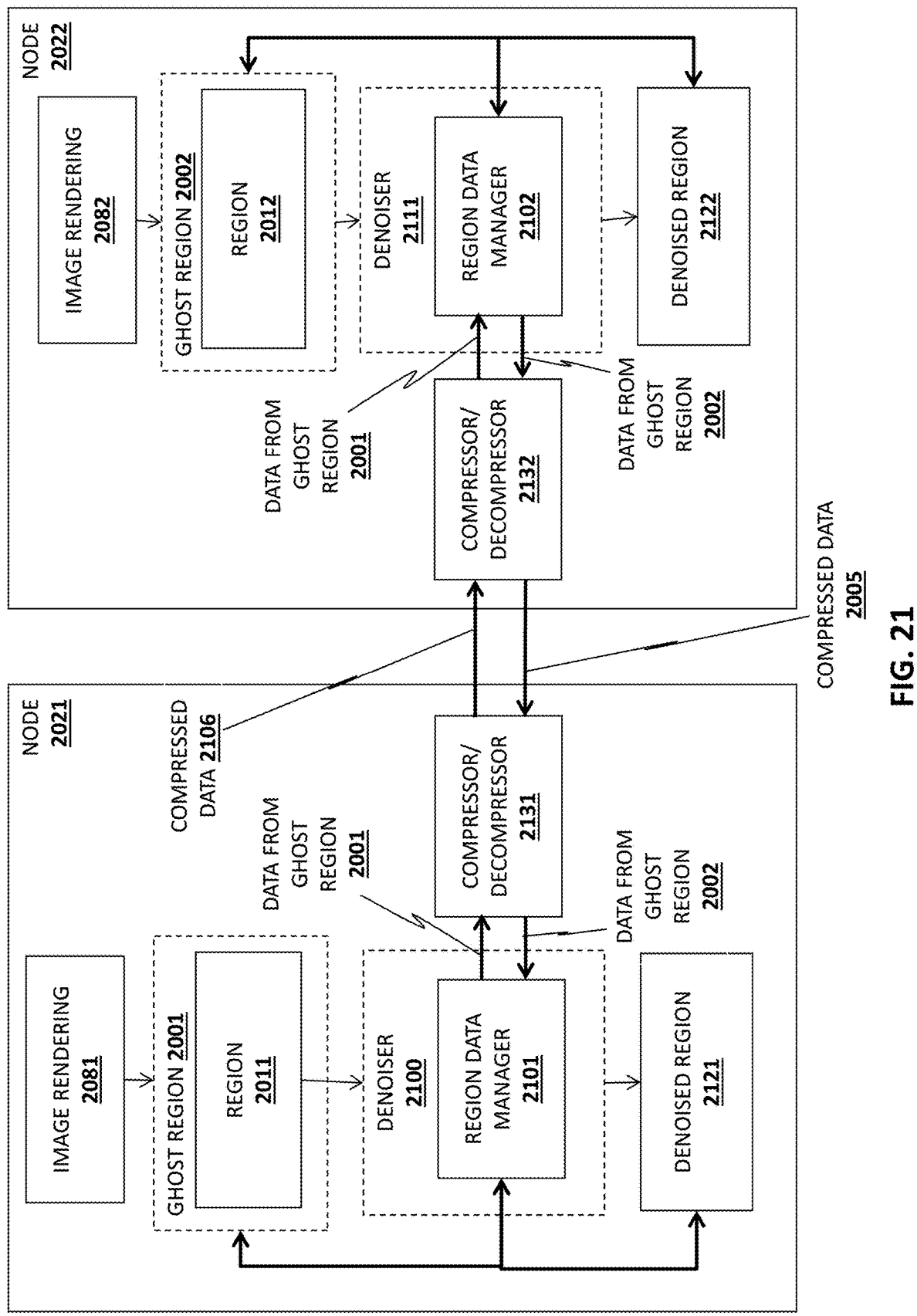
FIG. 21 illustrates one embodiment of an architecture in which image rendering and denoising operations are distributed across a plurality of nodes.

FIG. 21 illustrates additional details of the interactions between nodes 2021-2022, in accordance with one embodiment of the invention. Each node 2021-2022 includes a ray tracing rendering circuitry 2081-2082 for rendering the respective image regions 2011-2012 and ghost regions 2001-2002. Denoisers 2100-2111 execute denoising operations on the regions 2011-2012, respectively, which each node 2021-2022 is responsible for rendering and denoising. The denoisers 2021-2022, for example, may comprise circuitry, software, or any combination thereof to generate the denoised regions 2121-2122, respectively. As mentioned, when generating denoised regions the denoisers 2021-2022 may need to rely on data within a ghost region owned by a different node (e.g., denoiser 2100 may need data from ghost region 2002 owned by node 2022).

Thus, in one embodiment, the denoisers 2100-2111 generate the denoised regions 2121-2122 using data from regions 2011-2012 and ghost regions 2001-2002, respectively, at least a portion of which may be received from another node. Region data managers 2101-2102 manage data transfers from ghost regions 2001-2002 as described herein. In one embodiment, compressor/decompressor units 2131-2132 perform compression and decompression of the ghost region data exchanged between the nodes 2021-2022, respectively.

For example, region data manager 2101 of node 2021 may, upon request from node 2022, send data from ghost region 2001 to compressor/decompressor 2131, which compresses the data to generate compressed data 2106 which it transmits to node 2022, thereby reducing bandwidth over the interconnect, network, bus, or other data communication link. Compressor/decompressor 2132 of node 2022 then decompresses the compressed data 2106 and denoiser 2111 uses the decompressed ghost data to generate a higher quality denoised region 2012 than would be possible with only data from region 2012. The region data manager 2102 may store the decompressed data from ghost region 2001 in a cache, memory, register file or other storage to make it available to the denoiser 2111 when generating the denoised region 2122. A similar set of operations may be performed to provide the data from ghost region 2002 to denoiser 2100 on node 2021 which uses the data in combination with data from region 2011 to generate a higher quality denoised region 2121.

Grab Data or Render

If the connection between devices such as nodes 2021-2022 is slow (i.e., lower than a threshold latency and/or threshold bandwidth), it may be faster to render ghost regions locally rather than requesting the results from other devices. This can be determined at run-time by tracking network transaction speeds and linearly extrapolated render times for the ghost region size. In such cases where it is faster to render out the entire ghost region, multiple devices may end up rendering the same portions of the image. The resolution of the rendered portion of the ghost regions may be adjusted based on the variance of the base region and the determined degree of blurring.

Load Balancing

In one embodiment, static and/or dynamic load balancing schemes may are used to distribute the processing load among the various nodes 2021-2023. For dynamic load balancing, the variance determined by the denoising filter may require both more time in denoising but drive the amount of samples used to render a particular region of the scene, with low variance and blurry regions of the image requiring fewer samples. The specific regions assigned to specific nodes may be adjusted dynamically based on data from previous frames or dynamically communicated across devices as they are rendering so that all devices will have the same amount of work.

Figure 22:
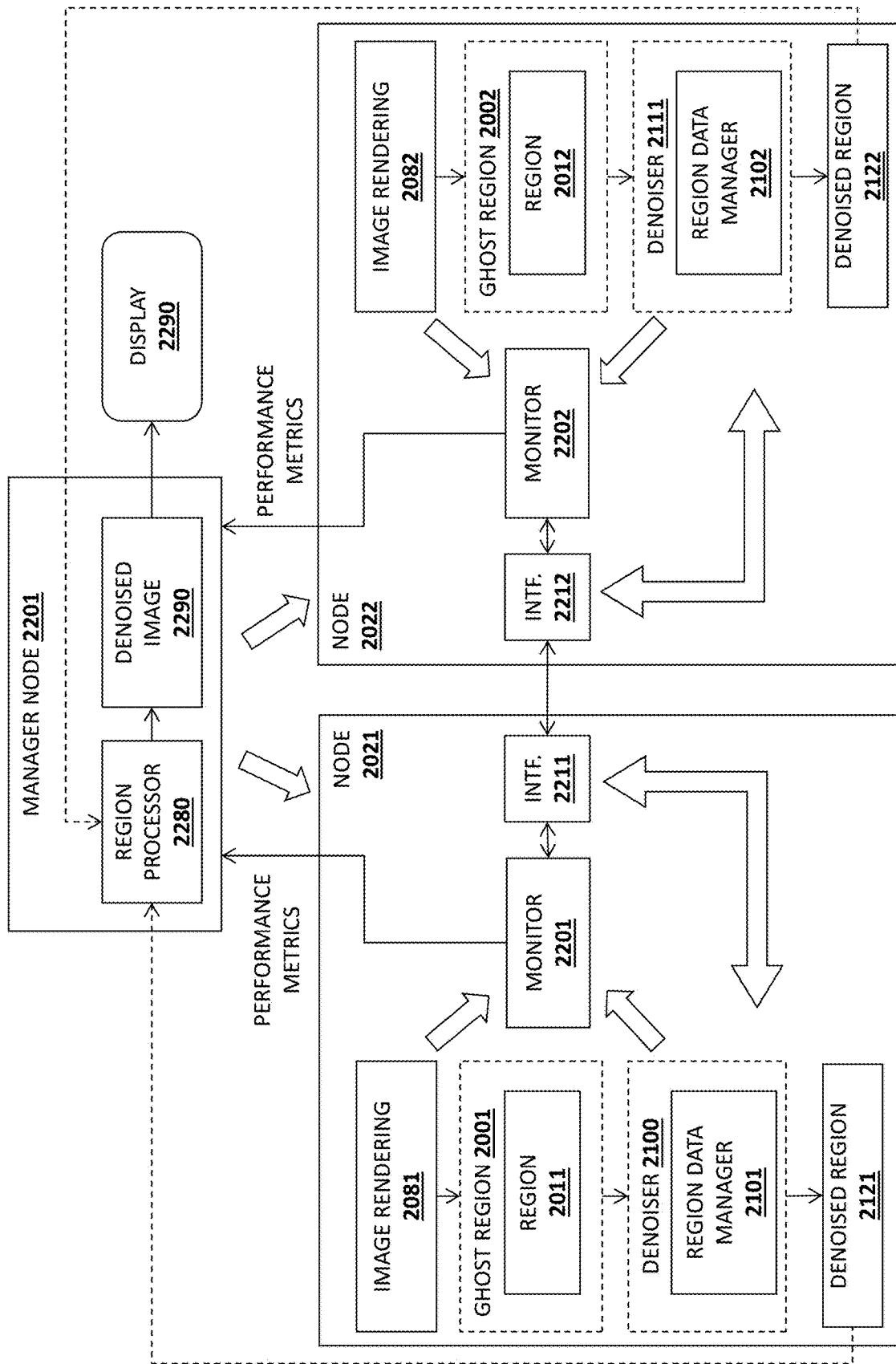
FIG. 22 illustrates additional details of an architecture for distributed rendering and denoising.

FIG. 22 illustrates one embodiment in which a monitor 2201-2202 running on each respective node 2021-2022 collects performance metric data including, but not limited to, the time consumed to transmit data over the network interface 2211-2212, the time consumed when denoising a region (with and without ghost region data), and the time consumed rendering each region/ghost region. The monitors 2201-2202 report these performance metrics back to a manager or load balancer node 2201, which analyzes the data to identify the current workload on each node 2021-2022 and potentially determines a more efficient mode of processing the various denoised regions 2121-2122. The manager node 2201 then distributes new workloads for new regions to the nodes 2021-2022 in accordance with the detected load. For example, the manager node 2201 may transmit more work to those nodes which are not heavily loaded and/or reallocate work from those nodes which are overloaded. In addition, the load balancer node 2201 may transmit a reconfiguration command to adjust the specific manner in which rendering and/or denoising is performed by each of the nodes (some examples of which are described above).

Determining Ghost Regions

In one embodiment, the sizes and shapes of the ghost regions 2001-2002 are determined based on the denoising algorithm implemented by the denoisers 2100-2111. Their respective sizes can then be dynamically modified based on the detected variance of the samples being denoised. The learning algorithm used for AI denoising itself may be used for determining appropriate region sizes, or in other cases such as a bilateral blur the predetermined filter width will determine the size of the ghost regions 2001-2002. In an implementation which uses a learning algorithm, the machine learning engine may be executed on the manager node 2201 and/or portions of the machine learning may be executed on each of the individual nodes 2021-2023 (see, e.g., FIGS. 18A-B and associated text above).

Gathering the Final Image

In one embodiment, the final image is generated by gathering the rendered and denoised regions from each of the nodes 2021-2023, without the need for the ghost regions or normals. In FIG. 22, for example, the denoised regions 2121-2122 are transmitted to regions processor 2280 of the manager node 2201 which combines the regions to generate the final denoised image 2290, which is then displayed on a display 2290. The region processor 2280 may combine the regions using a variety of 2D compositing techniques. Although illustrated as separate components, the region processor 2280 and denoised image 2290 may be integral to the display 2290. In this embodiment, the various nodes 2021-2022 may use a direct-send technique to transmit the denoised regions 2121-2122 and potentially using various lossy or lossless compression of the region data.

AI denoising is still a costly operation and as gaming moves into the cloud. As such, distributing processing of denoising across multiple nodes 2021-2022 may become required for achieving real-time frame rates for traditional gaming or virtual reality (VR) which requires higher frame rates. Movie studios also often render in large render farms which can be utilized for faster denoising.

Figure 23:
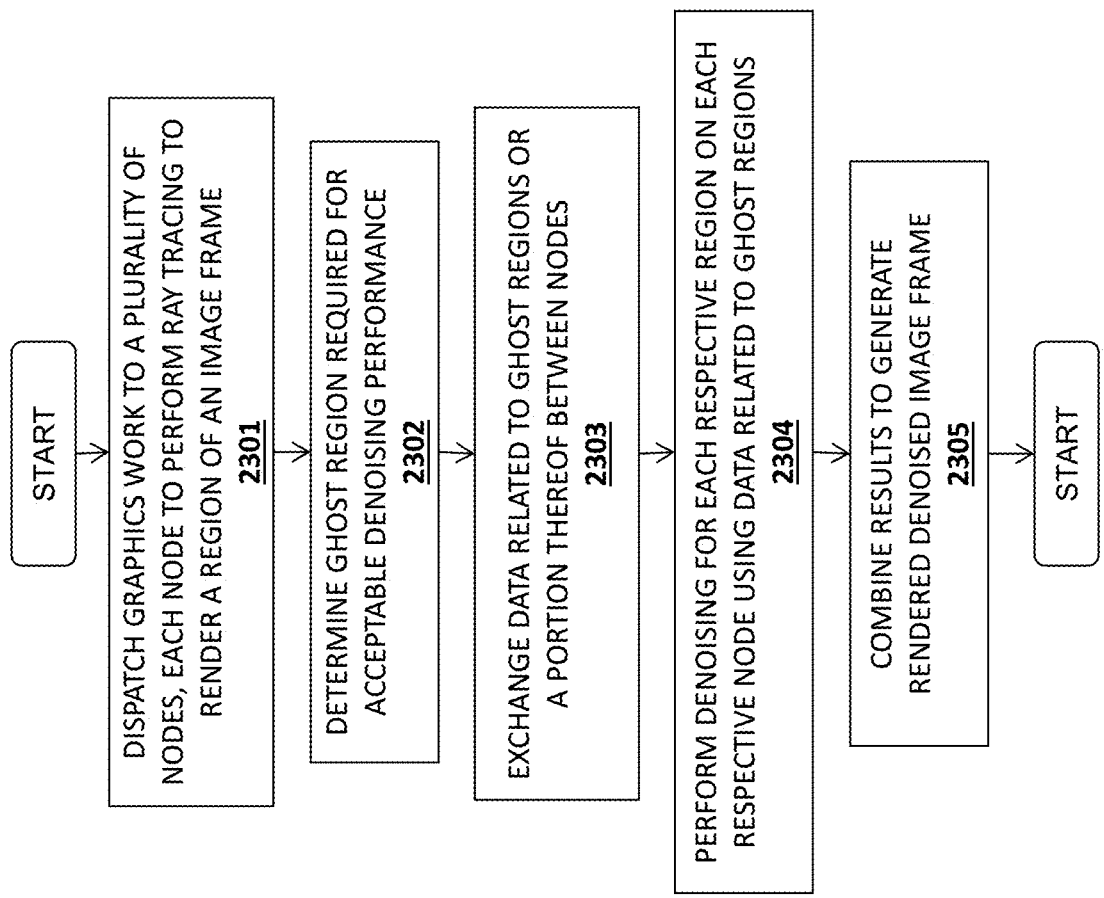
FIG. 23 illustrates a method in accordance with one embodiment of the invention.

One embodiment of a method for performing distributed rendering and denoising is illustrated in FIG. 23. The method may be implemented within the context of the system architectures described above, but is not limited to any particular system architecture.

At 2301, graphics work is dispatched to a plurality of nodes which perform ray tracing operations to render a region of an image frame. In one embodiment, each node may already have data required to perform the operations in memory. For example, two or more of the nodes may share a common memory or the local memories of the nodes may already have stored data from prior ray tracing operations. Alternatively, or in addition, certain data may be transmitted to each node.

At 2302, the "ghost region" required for a specified level of denoising (i.e., at an acceptable level of performance) is determined. The ghost region comprises any data required to perform the specified level of denoising, including data owned by one or more other nodes.

At 2303, data related to the ghost regions (or portions thereof) is exchanged between nodes. At 2304 each node performs denoising on its respective region (e.g., using the exchanged data) and at 2305 the results are combined to generate the final denoised image frame.

In one embodiment, a manager node or primary node such as shown in FIG. 22 dispatches the work to the nodes and then combines the work performed by the nodes to generate the final image frame. In another embodiment, a peer-based architecture is used where the nodes are peers which exchange data to render and denoise the final image frame.

The nodes described herein (e.g., nodes 2021-2023) may be graphics processing computing systems interconnected via a high speed network. Alternatively, the nodes may be individual processing elements coupled to a high speed memory fabric. In this embodiment, all of the nodes may share a common virtual memory space and/or a common physical memory. In another embodiment, the nodes may be a combination of CPUs and GPUs. For example, the manager node 2201 described above may be a CPU and/or software executed on the CPU and the nodes 2021-2022 may be GPUs and/or software executed on the GPUs. Various different types of nodes may be used while still complying with the underlying principles of the invention.

Example Neural Network Implementations

There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 24:
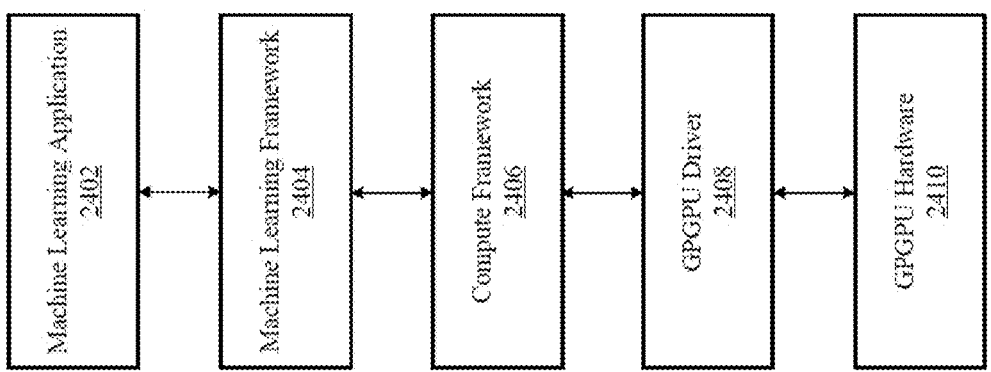
FIG. 24 illustrates one embodiment of a machine learning method.

FIG. 24 is a generalized diagram of a machine learning software stack 2400. A machine learning application 2402 can be configured to train a neural network using a training dataset or to use a trained deep neural network to implement machine intelligence. The machine learning application 2402 can include training and inference functionality for a neural network and/or specialized software that can be used to train a neural network before deployment. The machine learning application 2402 can implement any type of machine intelligence including but not limited to image recognition, mapping and localization, autonomous navigation, speech synthesis, medical imaging, or language translation.

Hardware acceleration for the machine learning application 2402 can be enabled via a machine learning framework 2404. The machine learning framework 2404 can provide a library of machine learning primitives. Machine learning primitives are basic operations that are commonly performed by machine learning algorithms. Without the machine learning framework 2404, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 2404. Exemplary primitives include tensor convolutions, activation functions, and pooling, which are computational operations that are performed while training a convolutional neural network (CNN). The machine learning framework 2404 can also provide primitives to implement basic linear algebra subprograms performed by many machine-learning algorithms, such as matrix and vector operations.

The machine learning framework 2404 can process input data received from the machine learning application 2402 and generate the appropriate input to a compute framework 2406. The compute framework 2406 can abstract the underlying instructions provided to the GPGPU driver 2408 to enable the machine learning framework 2404 to take advantage of hardware acceleration via the GPGPU hardware 2410 without requiring the machine learning framework 2404 to have intimate knowledge of the architecture of the GPGPU hardware 2410. Additionally, the compute framework 2406 can enable hardware acceleration for the machine learning framework 2404 across a variety of types and generations of the GPGPU hardware 2410.

GPGPU Machine Learning Acceleration

Figure 25:
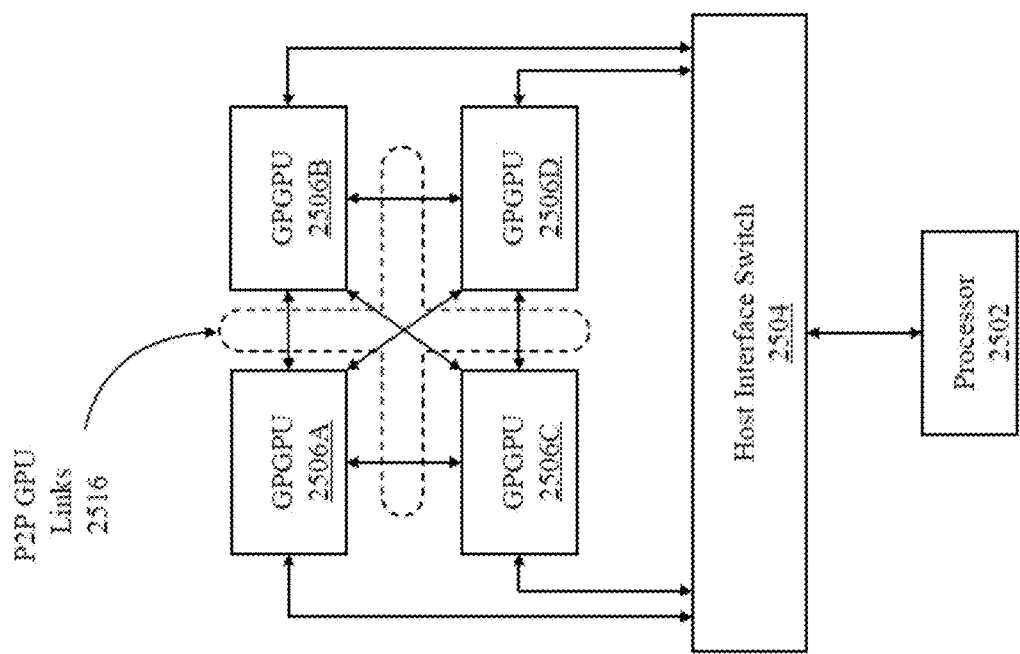
FIG. 25 illustrates a plurality of interconnected general purpose graphics processors.

FIG. 25 illustrates a multi-GPU computing system 2500, according to an embodiment. The multi-GPU computing system 2500 can include a processor 2502 coupled to multiple GPGPUs 2506A-D via a host interface switch 2504. The host interface switch 2504, in one embodiment, is a PCI express switch device that couples the processor 2502 to a PCI express bus over which the processor 2502 can communicate with the set of GPGPUs 2506A-D. Each of the multiple GPGPUs 2506A-D can be an instance of the GPGPU described above. The GPGPUs 2506A-D can interconnect via a set of high-speed point to point GPU to GPU links 2516. The high-speed GPU to GPU links can connect to each of the GPGPUs 2506A-D via a dedicated GPU link. The P2P GPU links 2516 enable direct communication between each of the GPGPUs 2506A-D without requiring communication over the host interface bus to which the processor 2502 is connected. With GPU-to-GPU traffic directed to the P2P GPU links, the host interface bus remains available for system memory access or to communicate with other instances of the multi-GPU computing system 2500, for example, via one or more network devices. While in the illustrated embodiment the GPGPUs 2506A-D connect to the processor 2502 via the host interface switch 2504, in one embodiment the processor 2502 includes direct support for the P2P GPU links 2516 and can connect directly to the GPGPUs 2506A-D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 26:
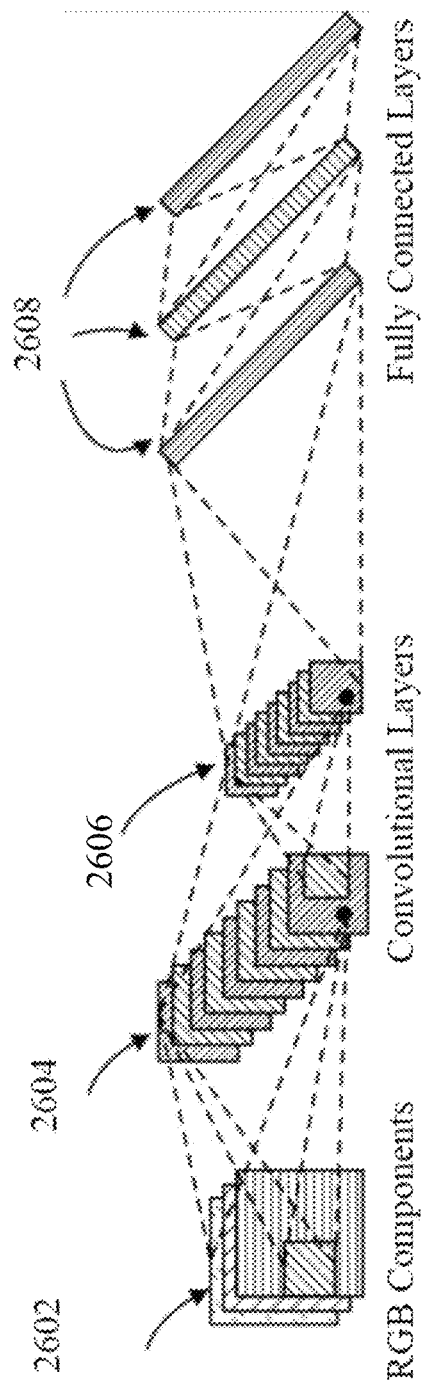
FIG. 26 illustrates a set of convolutional layers and fully connected layers for a machine learning implementation.
Figure 27:
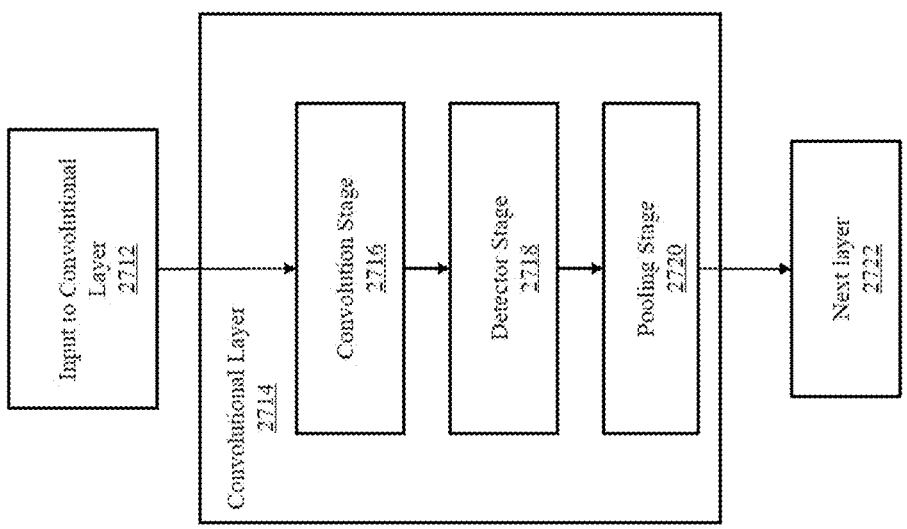
FIG. 27 illustrates one embodiment of a convolutional layer.

FIGS. 26-27 illustrate an exemplary convolutional neural network. FIG. 26 illustrates various layers within a CNN. As shown in FIG. 26, an exemplary CNN used to model image processing can receive input 2602 describing the red, green, and blue (RGB) components of an input image. The input 2602 can be processed by multiple convolutional layers (e.g., convolutional layer 2604, convolutional layer 2606). The output from the multiple convolutional layers may optionally be processed by a set of fully connected layers 2608. Neurons in a fully connected layer have full connections to all activations in the previous layer, as previously described for a feedforward network. The output from the fully connected layers 2608 can be used to generate an output result from the network. The activations within the fully connected layers 2608 can be computed using matrix multiplication instead of convolution. Not all CNN implementations are make use of fully connected layers. For example, in some implementations the convolutional layer 2606 can generate output for the CNN.

The convolutional layers are sparsely connected, which differs from traditional neural network configuration found in the fully connected layers 2608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 27 illustrates exemplary computation stages within a convolutional layer of a CNN. Input to a convolutional layer 2712 of a CNN can be processed in three stages of a convolutional layer 2714. The three stages can include a convolution stage 2716, a detector stage 2718, and a pooling stage 2720. The convolution layer 2714 can then output data to a successive convolutional layer. The final convolutional layer of the network can generate output feature map data or provide input to a fully connected layer, for example, to generate a classification value for the input to the CNN.

In the convolution stage 2716 performs several convolutions in parallel to produce a set of linear activations. The convolution stage 2716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 2716 defines a set of linear activations that are processed by successive stages of the convolutional layer 2714.

The linear activations can be processed by a detector stage 2718. In the detector stage 2718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 2720 uses a pooling function that replaces the output of the convolutional layer 2706 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 2720, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 2714 can then be processed by the next layer 2722. The next layer 2722 can be an additional convolutional layer or one of the fully connected layers 2708. For example, the first convolutional layer 2704 of FIG. 27 can output to the second convolutional layer 2706, while the second convolutional layer can output to a first layer of the fully connected layers 2808.

Figure 28:
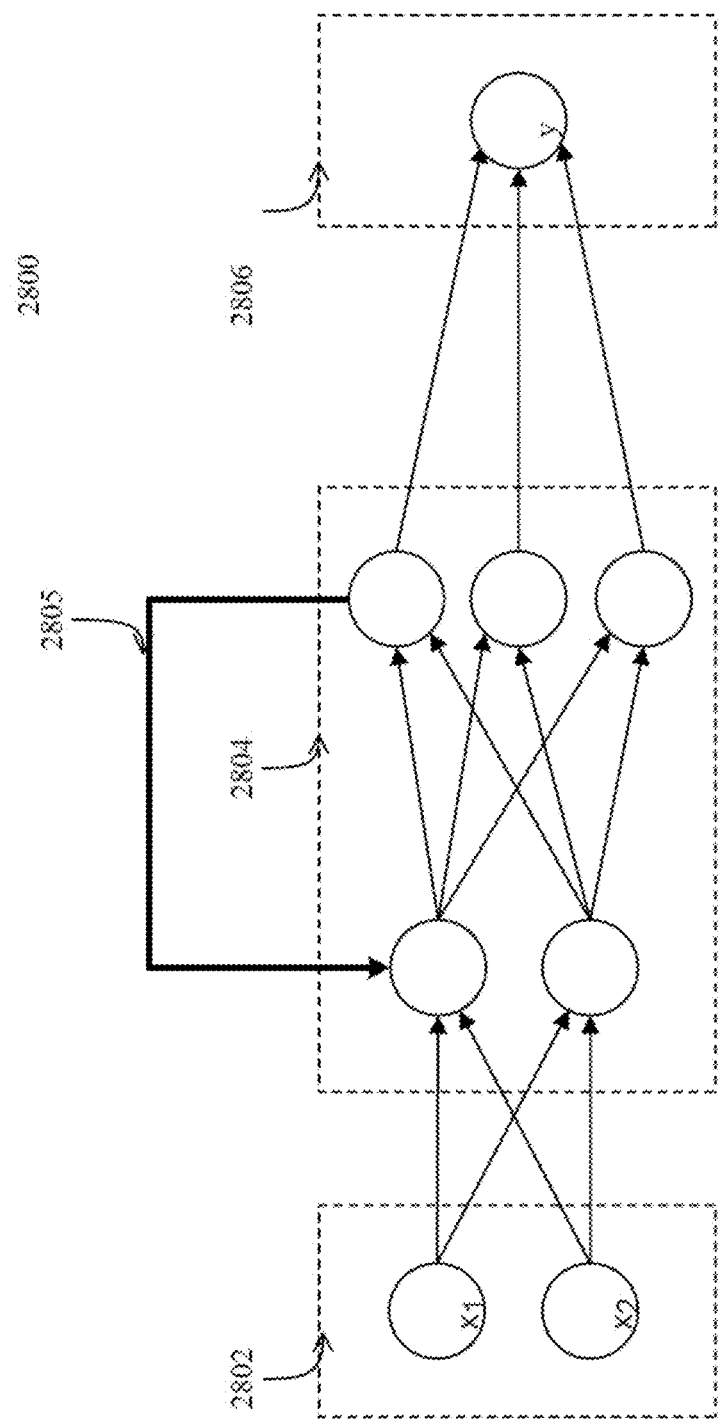
FIG. 28 illustrates an example of a set of interconnected nodes in a machine learning implementation.

FIG. 28 illustrates an exemplary recurrent neural network 2800. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 2800 can be described has having an input layer 2802 that receives an input vector, hidden layers 2804 to implement a recurrent function, a feedback mechanism 2805 to enable a 'memory' of previous states, and an output layer 2806 to output a result. The RNN 2800 operates based on time-steps. The state of the RNN at a given time step is influenced based on the previous time step via the feedback mechanism 2805. For a given time step, the state of the hidden layers 2804 is defined by the previous state and the input at the current time step. An initial input (x1) at a first time step can be processed by the hidden layer 2804. A second input (x2) can be processed by the hidden layer 2804 using state information that is determined during the processing of the initial input (x1). A given state can be computed as s_t=f(Ux_t+Ws_(t−1)), where U and W are parameter matrices. The function f is generally a nonlinearity, such as the hyperbolic tangent function (Tanh) or a variant of the rectifier function f(x)=max(0,x). However, the specific mathematical function used in the hidden layers 2804 can vary depending on the specific implementation details of the RNN 2800.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 29:
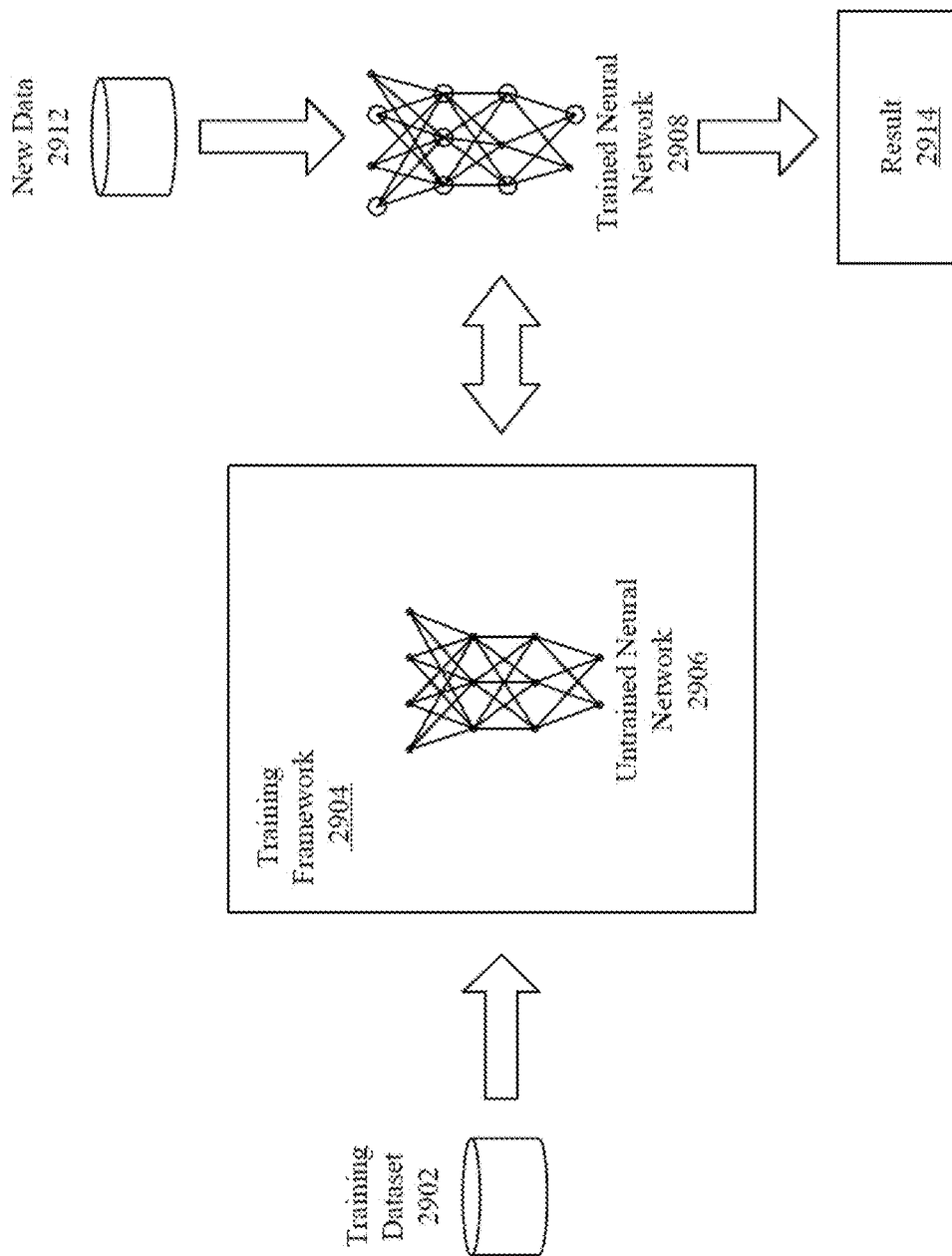
FIG. 29 illustrates an embodiment of a training framework within which a neural network learns using a training dataset.

FIG. 29 illustrates training and deployment of a deep neural network. Once a given network has been structured for a task the neural network is trained using a training dataset 2902. Various training frameworks 2904 have been developed to enable hardware acceleration of the training process. For example, the machine learning framework described above may be configured as a training framework. The training framework 2904 can hook into an untrained neural network 2906 and enable the untrained neural net to be trained using the parallel processing resources described herein to generate a trained neural net 2908.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 2902 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 2904 can adjust to adjust the weights that control the untrained neural network 2906. The training framework 2904 can provide tools to monitor how well the untrained neural network 2906 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 2908. The trained neural network 2908 can then be deployed to implement any number of machine learning operations.

Unsupervised learning is a learning method in which the network attempts to train itself using unlabeled data. Thus, for unsupervised learning the training dataset 2902 will include input data without any associated output data. The untrained neural network 2906 can learn groupings within the unlabeled input and can determine how individual inputs are related to the overall dataset. Unsupervised training can be used to generate a self-organizing map, which is a type of trained neural network 2907 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 2902 includes a mix of labeled and unlabeled data of the same distribution. Incremental learning is a variant of supervised learning in which input data is continuously used to further train the model. Incremental learning enables the trained neural network 2908 to adapt to the new data 2912 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 30A:
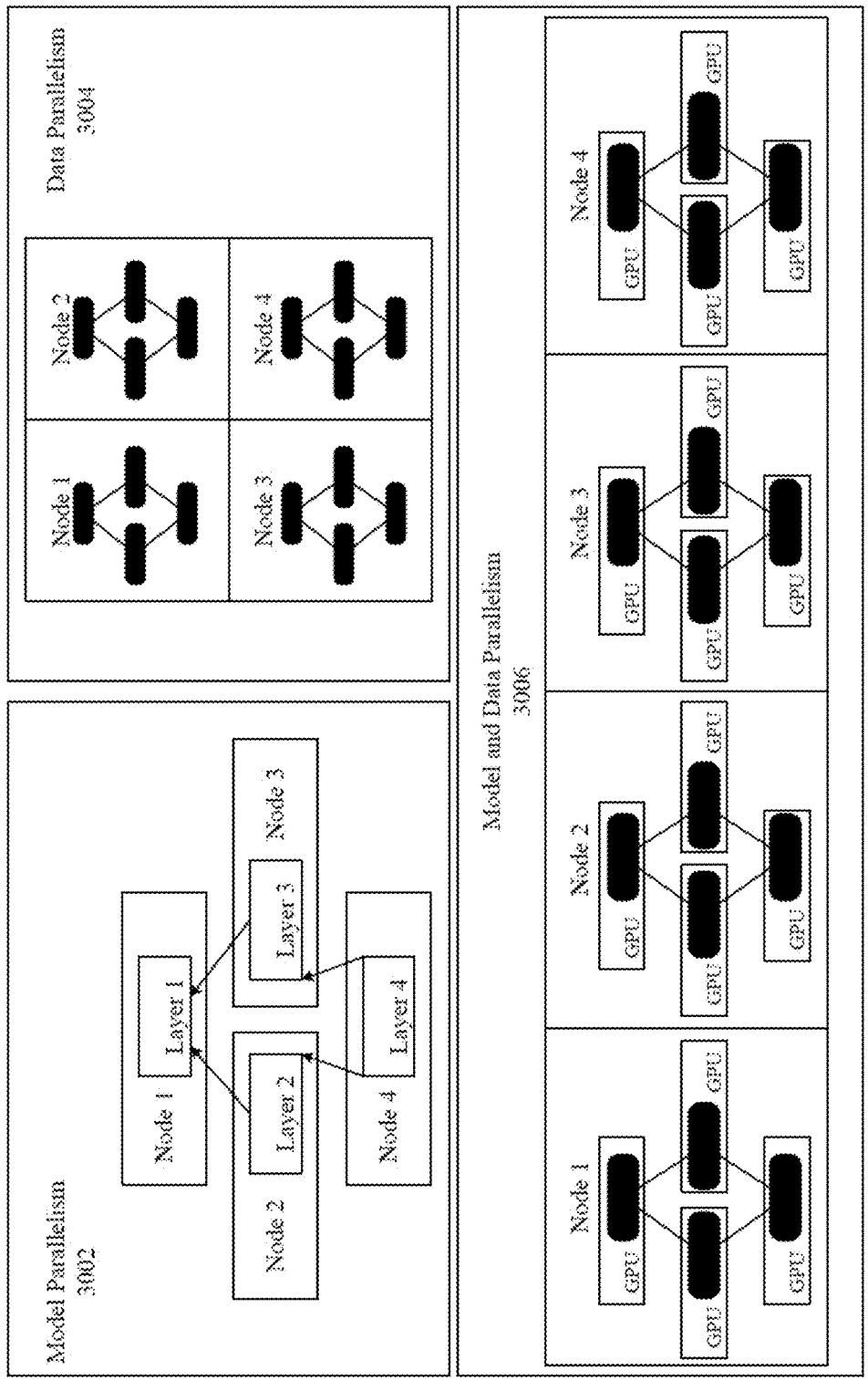
FIG. 30A illustrates examples of model parallelism and data parallelism.

FIG. 30A is a block diagram illustrating distributed learning. Distributed learning is a training model that uses multiple distributed computing nodes such as the nodes described above to perform supervised or unsupervised training of a neural network. The distributed computational nodes can each include one or more host processors and one or more of the general-purpose processing nodes, such as a highly-parallel general-purpose graphics processing unit. As illustrated, distributed learning can be performed model parallelism 3002, data parallelism 3004, or a combination of model and data parallelism.

In model parallelism 3002, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 3004, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 3006 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit and/or the multi-GPU computing systems described herein. On the contrary, deployed machine learning platforms generally include lower power parallel processors suitable for use in products such as cameras, autonomous robots, and autonomous vehicles.

Figure 30B:
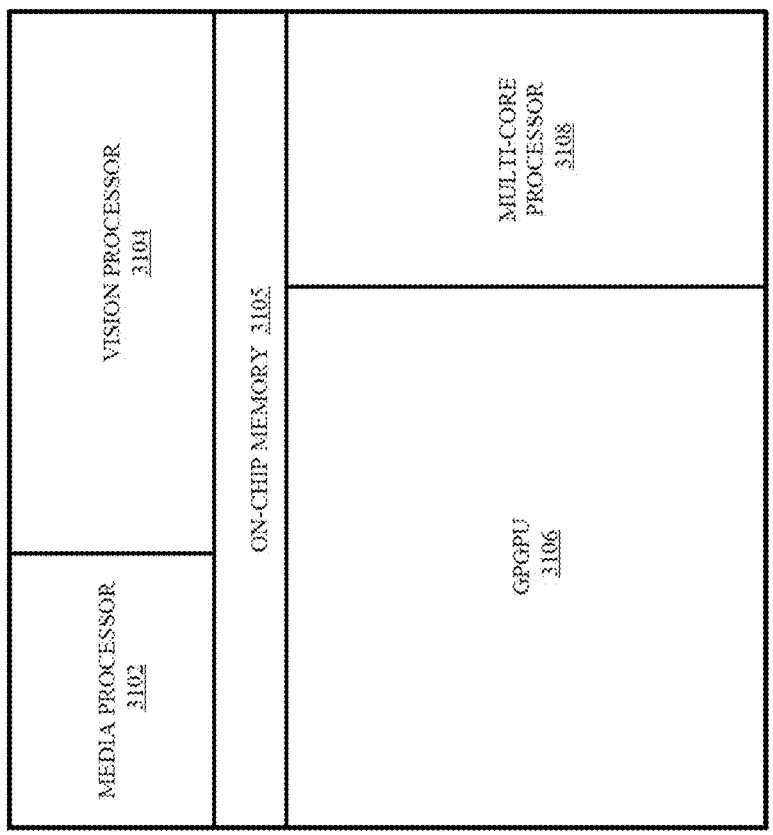
FIG. 30B illustrates an example of a system on a chip (SoC)

FIG. 30B illustrates an exemplary inferencing system on a chip (SOC) 3100 suitable for performing inferencing using a trained model. The SOC 3100 can integrate processing components including a media processor 3102, a vision processor 3104, a GPGPU 3106 and a multi-core processor 3108. The SOC 3100 can additionally include on-chip memory 3105 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 3100 can be used as a portion of the main control system for an autonomous vehicle. Where the SOC 3100 is configured for use in autonomous vehicles the SOC is designed and configured for compliance with the relevant functional safety standards of the deployment jurisdiction.

During operation, the media processor 3102 and vision processor 3104 can work in concert to accelerate computer vision operations. The media processor 3102 can enable low latency decode of multiple high-resolution (e.g., 4K, 8K) video streams. The decoded video streams can be written to a buffer in the on-chip-memory 3105. The vision processor 3104 can then parse the decoded video and perform preliminary processing operations on the frames of the decoded video in preparation of processing the frames using a trained image recognition model. For example, the vision processor 3104 can accelerate convolution operations for a CNN that is used to perform image recognition on the high-resolution video data, while back end model computations are performed by the GPGPU 3106.

The multi-core processor 3108 can include control logic to assist with sequencing and synchronization of data transfers and shared memory operations performed by the media processor 3102 and the vision processor 3104. The multi-core processor 3108 can also function as an application processor to execute software applications that can make use of the inferencing compute capability of the GPGPU 3106. For example, at least a portion of the navigation and driving logic can be implemented in software executing on the multi-core processor 3108. Such software can directly issue computational workloads to the GPGPU 3106 or the computational workloads can be issued to the multi-core processor 3108, which can offload at least a portion of those operations to the GPGPU 3106.

The GPGPU 3106 can include compute clusters such as a low power configuration of the compute clusters DPLAB06A-DPLAB06H within the highly-parallel general-purpose graphics processing unit DPLAB00. The compute clusters within the GPGPU 3106 can support instruction that are specifically optimized to perform inferencing computations on a trained neural network. For example, the GPGPU 3106 can support instructions to perform low precision computations such as 8-bit and 4-bit integer vector operations.

Example Ray Tracing Architecture

In one implementation, the graphics processor includes circuitry and/or program code for performing real-time ray tracing. In some embodiments, a dedicated set of ray tracing cores are included in the graphics processor to perform the various ray tracing operations described herein, including ray traversal and/or ray intersection operations. In addition to the ray tracing cores, one embodiment includes multiple sets of graphics processing cores for performing programmable shading operations and multiple sets of tensor cores for performing matrix operations on tensor data.

Figure 31:
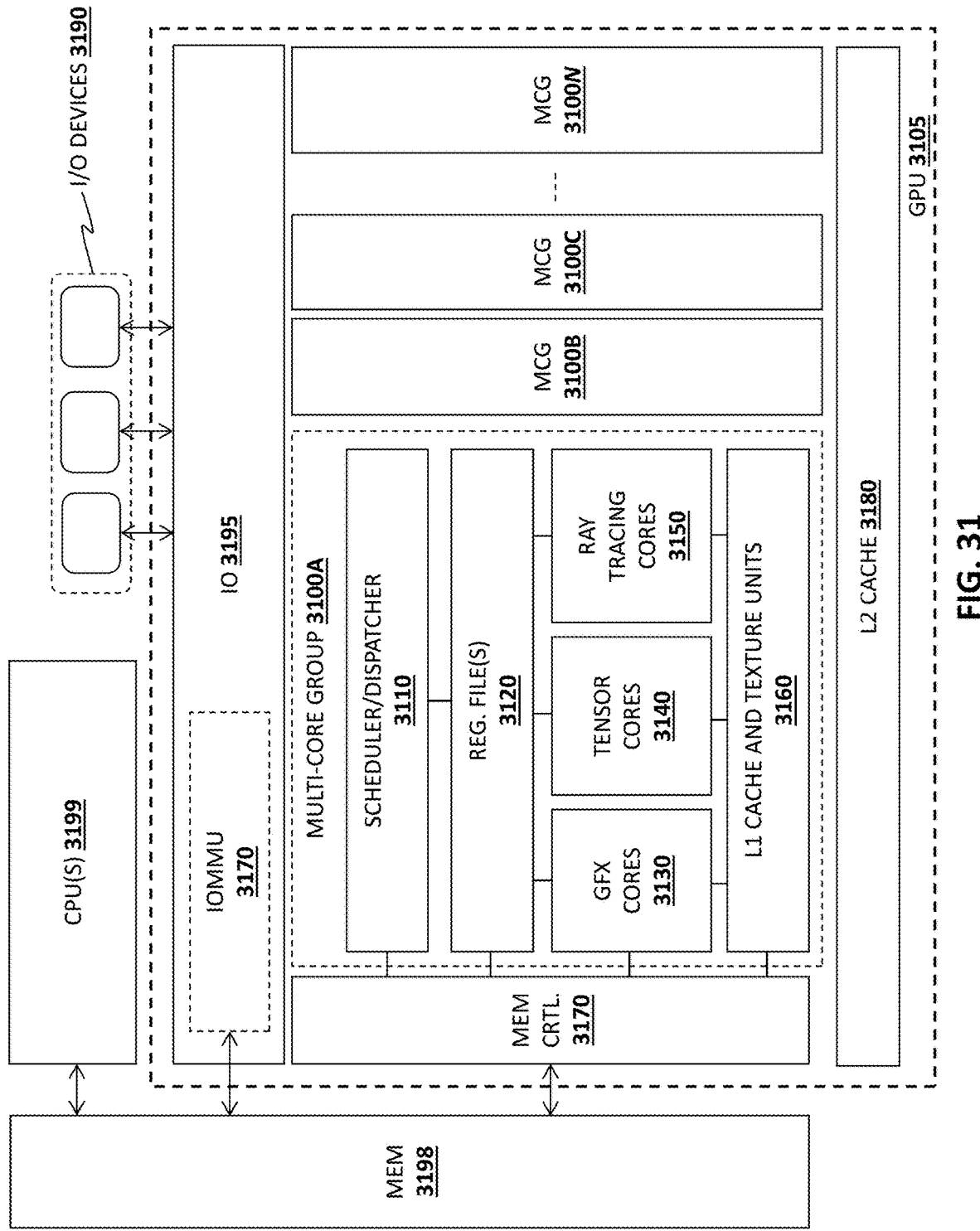
FIG. 31 illustrates an example of a processing architecture which includes ray tracing cores and tensor cores.

FIG. 31 illustrates an exemplary portion of one such graphics processing unit (GPU) 3105 which includes dedicated sets of graphics processing resources arranged into multi-core groups 3100A-N. While the details of only a single multi-core group 3100A are provided, it will be appreciated that the other multi-core groups 3100B-N may be equipped with the same or similar sets of graphics processing resources.

As illustrated, a multi-core group 3100A may include a set of graphics cores 3130, a set of tensor cores 3140, and a set of ray tracing cores 3150. A scheduler/dispatcher 3110 schedules and dispatches the graphics threads for execution on the various cores 3130, 3140, 3150. A set of register files 3120 store operand values used by the cores 3130, 3140, 3150 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more Level 1 (L1) caches and texture units 3160 store graphics data such as texture data, vertex data, pixel data, ray data, bounding volume data, etc, locally within each multi-core group 3100A. A Level 2 (L2) cache 3180 shared by all or a subset of the multi-core groups 3100A-N stores graphics data and/or instructions for multiple concurrent graphics threads. As illustrated, the L2 cache 3180 may be shared across a plurality of multi-core groups 3100A-N. One or more memory controllers 3170 couple the GPU 3105 to a memory 3198 which may be a system memory (e.g., DRAM) and/or a dedicated graphics memory (e.g., GDDR6 memory).

Input/output (IO) circuitry 3195 couples the GPU 3105 to one or more IO devices 3195 such as digital signal processors (DSPs), network controllers, or user input devices. An on-chip interconnect may be used to couple the I/O devices 3190 to the GPU 3105 and memory 3198. One or more IO memory management units (IOMMUs) 3170 of the IO circuitry 3195 couple the IO devices 3190 directly to the system memory 3198. In one embodiment, the IOMMU 3170 manages multiple sets of page tables to map virtual addresses to physical addresses in system memory 3198. In this embodiment, the IO devices 3190, CPU(s) 3199, and GPU(s) 3105 may share the same virtual address space.

In one implementation, the IOMMU 3170 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 3198). The base addresses of each of the first and second sets of page tables may be stored in control registers and swapped out on a context switch (e.g., so that the new context is provided with access to the relevant set of page tables). While not illustrated in FIG. 31, each of the cores 3130, 3140, 3150 and/or multi-core groups 3100A-N may include translation lookaside buffers (TLBs) to cache guest virtual to guest physical translations, guest physical to host physical translations, and guest virtual to host physical translations.

In one embodiment, the CPUs 3199, GPUs 3105, and IO devices 3190 are integrated on a single semiconductor chip and/or chip package. The illustrated memory 3198 may be integrated on the same chip or may be coupled to the memory controllers 3170 via an off-chip interface. In one implementation, the memory 3198 comprises GDDR6 memory which shares the same virtual address space as other physical system-level memories, although the underlying principles of the invention are not limited to this specific implementation.

In one embodiment, the tensor cores 3140 include a plurality of execution units specifically designed to perform matrix operations, which are the fundamental compute operation used to perform deep learning operations. For example, simultaneous matrix multiplication operations may be used for neural network training and inferencing. The tensor cores 3140 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 3140. The training of neural networks, in particular, requires a significant number matrix dot product operations. In order to process an inner-product formulation of an N×N×N matrix multiply, the tensor cores 3140 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 3140 to ensure that the most efficient precision is used for different workloads (e.g., such as inferencing workloads which can tolerate quantization to bytes and half-bytes).

In one embodiment, the ray tracing cores 3150 accelerate ray tracing operations for both real-time ray tracing and non-real-time ray tracing implementations. In particular, the ray tracing cores 3150 include ray traversal/intersection circuitry for performing ray traversal using bounding volume hierarchies (BVHs) and identifying intersections between rays and primitives enclosed within the BVH volumes. The ray tracing cores 3150 may also include circuitry for performing depth testing and culling (e.g., using a Z buffer or similar arrangement). In one implementation, the ray tracing cores 3150 perform traversal and intersection operations in concert with the image denoising techniques described herein, at least a portion of which may be executed on the tensor cores 3140. For example, in one embodiment, the tensor cores 3140 implement a deep learning neural network to perform denoising of frames generated by the ray tracing cores 3150. However, the CPU(s) 3199, graphics cores 3130, and/or ray tracing cores 3150 may also implement all or a portion of the denoising and/or deep learning algorithms.

In addition, as described above, a distributed approach to denoising may be employed in which the GPU 3105 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 3150 process all BVH traversal and ray-primitive intersections, saving the graphics cores 3130 from being overloaded with thousands of instructions per ray. In one embodiment, each ray tracing core 3150 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 3100A can simply launch a ray probe, and the ray tracing cores 3150 independently perform ray traversal and intersection and return hit data (e.g., a hit, no hit, multiple hits, etc) to the thread context. The other cores 3130, 3140 are freed to perform other graphics or compute work while the ray tracing cores 3150 perform the traversal and intersection operations.

In one embodiment, each ray tracing core 3150 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 3130 and tensor cores 3140) are freed to perform other forms of graphics work.

In one particular embodiment described below, a hybrid rasterization/ray tracing approach is used in which work is distributed between the graphics cores 3130 and ray tracing cores 3150.

In one embodiment, the ray tracing cores 3150 (and/or other cores 3130, 3140) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 3150, graphics cores 3130 and tensor cores 3140 is Vulkan 1.1.85. Note, however, that the underlying principles of the invention are not limited to any particular ray tracing ISA.

In general, the various cores 3150, 3140, 3130 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Reduced Precision Bounding Volume

Hierarchy (BVH) Construction

Embodiments of the invention implement reduced-precision, high-quality BVH construction with spatial splitting and direct incremental hierarchy output. These embodiments are suited to custom fixed-function hardware implementations, but may also be useful in the context of programmable platforms such as GPUs. Certain embodiments operate within a compact integer space, dramatically reducing hardware implementation cost. One implementation is intimately linked to, and allows direct output of, recently proposed incremental BVH formats to enable fast ray tracing of highly dynamic, complex scenes. Also disclosed is a system which takes advantage of caching schemes and lossless compression to reduce memory and storage bandwidth.

High-Quality BVHs for Ray Tracing

Real-time performance for ray tracing is usually achieved with the use of auxiliary acceleration data structures. The ray-tracing community appears to have settled on BVHs as the acceleration structure of choice in most scenarios.

The bounding volume hierarchy (BVH) is a tree data structure which serves as a spatial index into the scene. This spatial index dramatically accelerates the core operation of ray-tracing: the discovery of intersections between rays and geometric primitives. The BVH bounds geometry in a hierarchical fashion. Each node of the BVH typically stores an axis-aligned bounding box (AABB) which represents the spatial extent of the subset of geometry which the node references. The root node of the BVH stores the full spatial extent of the geometry of interest. Each node, including the root, stores a reference to its child nodes which encompass an increasingly smaller portion of the scene. The leaf nodes of the hierarchy store references to primitives which can then be tested for ray intersections. The number of triangles referenced by a leaf node is not fixed, and can vary between leaves.

Figure 32B:
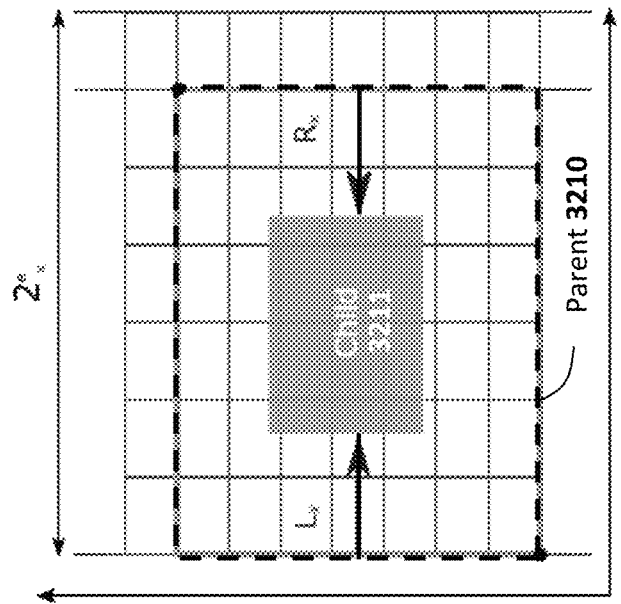
FIG. 32B illustrates a 2D representation of a BVH parent node and one of its child nodes.
Figure 32A:
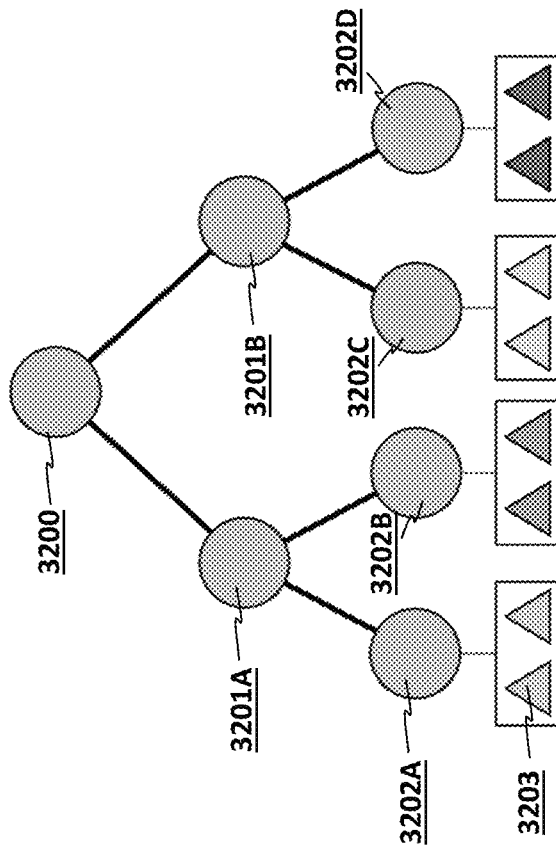
FIG. 32A illustrates an example bounding volume hierarchy (BVH) structure.

FIG. 32A shows the general structure of a BVH hierarchy comprising a root node 3200, a first set of child nodes 3201A-B under the root node, and a set of leaf nodes 3202A-D under the first set of child nodes. Different sets of primitives 3203 are shown within each of the leaf nodes 3202A-D. Note that FIG. 32A is merely an example of one specific hierarchy. BVHs are general tree structures which can have many levels (e.g., 20 levels for many realistic scenes). Thus, the underlying principles of the invention are not limited to the example shown in FIG. 32A.

FIG. 32B illustrates a 2D representation of a parent node 3210 and one of its child nodes 3211. In this example, a left offset value $L_x$ indicates distance along the X axis from the left side of the parent 3210 to the left side of the child 3211 and a right offset value $R_x$ indicates the distance along the X axis from the right side of the parent 3210 to the right side of the child 3211. These types of minimum and maximum values along a particular axis (the X axis in this example) are frequently used to determine which primitives are contained within each bounding box.

BVHs can be formed with an arbitrary branching factor, but most modern implementations use between two and eight-wide trees. BVHs are normally built such that they tightly enclose their underlying geometry. This ensures correct traversal results and optimal performance. In dynamic scenarios, where geometric changes are observed perhaps every frame, it is necessary to frequently update or rebuild the BVH structure. The research community has thus directed considerable attention towards the goal of improving BVH construction speed, while preserving good traversal performance.

To this end, a considerable variety of BVH construction approaches has emerged in recent years. Such approaches can be loosely classified as either top-down, LBVH-style, refinement-based, clustering-based, and incremental. Details associated with these approaches can be found in the list of references cited at the end of this detailed description. A common factor in many of these builders is their use of the Surface Area Heuristic (SAH). The SAH can be used to guide construction of a BVH by providing an objective way to estimate the ray tracing cost of splitting a node into a number of child nodes as the BVH is built.

Top Down BVH Construction

Among the highest quality BVH construction algorithms are the so called "top-down" BVH builders. Because certain embodiments of the invention use a top-down approach to BVH construction, various top-down construction techniques will now be described.

The code sequence set forth below illustrates the general flow of such builders. Construction begins with a single root node representing the entire scene. For each node during construction, a termination condition is checked. Termination conditions are chosen to control the depth of the hierarchy, and are often chosen based on variables such as the number of primitives remaining in the node, depth of the node in the tree, or based on a heuristic such as the SAH. If the condition is met, then the node is simply marked as a leaf and construction continues with an outstanding node.

Generic Pseudocode for Top-Down BVH Construction:

```
1:   function TopDownBuild(BVHNode* currentNode)
2:      if terminationCondition( ) then
3:         makeLeaf(currentNode)
4:         return
5:      else
6:         bestCost ← ∞
7:         bestPartition ← NULL
8:         for all candidate partitions P of currentNode do
9:            cost ← EvaluatePartition(P)
10:           if cost < bestCost then
11:              bestPartition ← P
12:              bestCost ← cost(P)
13:           end if
14:        end for
15:
16:        if bestCost < ∞ then
17:           partitionNode(currentNode,leftChild,rightChild)
18:           TopDownBuild(leftChild)
19:           TopDownBuild(rightChild)
20:        else
21:           makeLeaf(currentNode)
22:        end if
23:     end if
24:  end function
```

For nodes not meeting the termination criteria, the top-down build process attempts to split the node to form a number of child nodes. The pseudocode above assumes two child nodes will be produced, which is a common configuration. Splitting a node amounts to determining a partition of the underlying geometry into two subsets, computing the AABB s of these two subsets, and adding these new nodes as child nodes of the original node. Several candidate partitions may be evaluated as part of a splitting strategy. The split cost (the predicted efficiency of tracing rays through the newly-created nodes) is used to choose between candidate splits. Once a split is chosen, the geometry is partitioned accordingly, and the algorithm recurses with the child nodes which may be split in the same fashion.

Binned Node Partitioning

In general, high-quality top-down BVH builders follow the general flow as outlined above. The main difference in how these algorithms operate is by employing different algorithms for the EvaluatePartition( ) function (line 9). The most commonly deployed algorithms are those which aim to minimize the SAH cost of the partition, which is given by:

$$C = K_T + K_I\left(\frac{SA(L)}{SA(P)}N_L + \frac{SA(R)}{SA(P)}N_R\right) \quad (1)$$

where P is the parent node, L and R are the left and right child nodes, SAO is the surface area, and NL and NR are the number of primitives assigned to the left and right child nodes respectively. KI and KT are implementation-defined constants which capture the cost of traversing a node and intersection a primitive respectively. The overall strategy which is typically employed to minimize the SAH is to try to find an axis-aligned splitting plane within the node, and to allocate the primitives to left and right child nodes according to this plane. By computing the value of Equation 1 for a number of candidate splitting planes, a good partition can be found.

However, in order to maintain reasonable construction speed, it is not possible to check a large number of planes along any given axis in search of a candidate split. Therefore, it is common to employ a binning approximation for the split. A small number of planes (typically 8-32) are evenly placed along the length of the node's bounding box. Triangles are "binned" into the regions between the planes, allowing for the SAH to be evaluated at the edges of the bins. When employing this strategy, some top-down builders choose the longest axis of the node AABB to search for a candidate partition, while others search all three axes.

Object vs. Spatial Splits

BVHs are flexible data structures which allow for two kinds of split when dividing a node. An object split is a split which groups triangles themselves, and independently computes bounding volumes. Any grouping is allowed, so it is common that the AABBs of the resulting child nodes may overlap to some extent. This is in contrast to a kd-tree, which necessitates strict splitting of space at all times.

A disadvantage of object splits is that if a lot of overlap is present between the sibling nodes, it can have a detrimental effect on traversal performance, as it is more likely that a ray will need to visit both subtrees. A common characteristic of high-quality BVH builders is to allow for a second kind of split, known as a spatial split. Similar to kd-trees, a spatial splits allows for a strict splitting of space into two disjoint regions. With spatial splits, it is thus possible for primitives to be referenced in both nodes if they overlap the splitting plane. However, this can be highly beneficial for large triangles, as overlap is eliminated. A BVH build can freely mix both types of split during construction. Spatial splits of primitives can be performed as a pre-process to cull large triangle references beforehand, or during construction itself.

Compact BVH Representations

In a typical ray tracer, data structures such as a BVH can consume a large portion of the total memory footprint and working set of the rendering process. This is a concern for larger scenes, as cache and local buffer sizes can be insufficient to maintain the scene data on-chip, especially for incoherent ray distributions.

More compact representations of a BVH can be achieved by lowering the storage requirements of node bounding planes, often via quantization. In addition, reductions in the size of child pointers can be produced with depth-first ordering, implicit indexing, or treelet-like clustering of nodes.

Recently, a number of compressed BVH formats have emerged which build on a number of the aforementioned compression techniques to reduce the size of a BVH node. One embodiment of the invention utilizes a slightly modified version of the format of Vaidyanathan et al [29], an overview of which will now be provided. The version used by embodiments of the invention is almost identical but is processed very slightly differently because of use of the global grid (see, e.g., FIG. 33, element 3302), which Vaidyanathan's format does not use.

FIG. 32B shows how bounding planes are encoded relative to the parent planes in Vaidyanathan's scheme (e.g., using offset values $L_x$ and $R_x$). The scheme employs integer plane quantization, plane-reuse between parent and sibling nodes, as well as techniques to reduce pointer overhead. The structure stores pairs of nodes and includes the following elements: 1) a 1-bit Leaf Flag, 2) six NB-bit plane offsets 3) two 3-bit parent plane re-use masks, and 4) an NP-bit pointer to a right child pair. Any pair of BVH nodes are guaranteed to share at least six bounding planes with their parent, and so the reuse masks indicate which child shares which plane of the parent. By storing six new planes along with the reuse masks, all twelve planes can be inferred. This sharing of planes occurs incrementally down the tree at each node. The choice of NB determines the level of quantization of the bounding planes, and thus tightness of the bounding boxes. During quantization and again during traversal, node exponents are inferred for each node in each axis ($2^e x$ for the x axis). The exponent is essentially a scale factor for the node along a given axis, and is the lowest power of two which is just large enough to contain the node in that axis. Along with the parent node extent, the exponents allow precise float values to be computed for the quantized planes, and as such, the node structure encodes a floating point bounding box.

Embodiments of a Reduced-Precision Top-Down BVH Builder

In order to produce a reduced-precision top-down BVH builder, one embodiment of the invention uses the general control flow described above. Reduced-precision implementations are used for producing and evaluating candidate planes (lines 8-14 in the above code sequence) and a compatible implementation of partitionNode (line 17 in the above code sequence). A framework for quantizing primitives is used in one embodiment to work from full-precision meshes. To achieve this, one embodiment of the invention relies on geometry quantization, heuristic evaluation, and node output.

Briefly, for geometry quantization, the input is a regular full-precision mesh in memory at each point in time. During construction, primitives are read in and adaptively quantized depending on the extent of the current node. The quantization scheme is used which is always conservative (i.e., quantization always provides fully watertight results and no missed intersections are possible in the final BVH). The quantization essentially provides a regular integer space of parametrizable precision over the underlying float data, within which the BVH construction operations can be performed with low cost.

For Heuristic Evaluation, when a full precision primitive is read from memory, its vertices are quantized to integer space producing conservative AABBs. This vertex and AABB information can be used to perform triangle binning, centroid computations, spatial splitting, and SAH evaluation in integer space. With this toolkit of operations, full SBVH-style hierarchies are generated (both object and spatial splits) with minimal quality degradation.

For Node Output, once a determination is made through Heuristic Evaluation as to how to split the current BVH node, small-footprint, incrementally-encoded BVH hierarchies are produced in the style of Vaidyanathan et al [29], without requiring any kind of post-process.

Geometry Quantization

In order to enable direct construction of reduced-precision BVHs without any kind of post-processing step for the output hierarchy, the underlying quantization scheme used for the BVH build operations are themselves intimately linked with the proposed incremental tree output format. The quantization scheme provides the underlying "playing field" on top of which everything else occurs.

Quantization begins with the full-precision float input vertices. For the purpose of illustration, single precision IEEE 754 floating point numbers are used. It is trivial to extend these concepts to double precision, and perhaps even to other floating point schemes. Each single precision number in IEEE floating point consists of a sign bit S, an 8 bit exponent E, and a 23-bit mantissa M. The value encoded by the floating-point number is given by:

$$(-1)^S \times 1 \cdot M \times 2^{E-127} \qquad (2)$$

The IEEE format always assumes an additional leading 1 bit in the mantissa, as shown. The exponent E is encoded as an unsigned number in offset form.

Floating point numbers, unlike integers, do not encode a regular space. Since the mantissa is a fixed number of bits, the distance between consecutive float values increases as the exponent grows larger. However, all float values with the same exponent (and same sign) encode a subset of the floating point space that constitutes a regular spacing of numbers, similar to the uniform spacing of integers. One embodiment of the invention uses this fact as the foundation of the quantization scheme.

Vaidyanathan's format [29] uses a fixed number of bits NB to store quantized planes. This value is analogous to the mantissa value of a float, and the format derives a minimal exponent for each axis such that the local reference frame of the node is just sufficient to contain the full extent of the node (see FIG. 32B). This defines the precision at which any child node bounding planes can be encoded. Nodes which are lower down in the tree will have more precision to represent child node bounding planes, as the exponent can be reduced due to their smaller size. This mantissa-exponent representation can of course lead to a coordinate space which is larger than the node, but results in an extremely compact structure.

Just as incremental traversal derives a local coordinate space for each node it encounters by deriving an exponent for each node, this space is derived for each node during the build. This space is then used not only for storage of the final tree, but also for the build itself. By doing so, reduced-precision operations can be used which are aligned to, and at the same precision as, the incremental output hierarchy. This allows writing out of the hierarchy during the build.

Quantization Overview

One embodiment of the input is a regular, 32-bit single-precision floating-point mesh, and for each node, an unsigned integer space is derived for each node in order to carry out node splitting in reduced-precision space. The move to integer space may be performed by "binning" the vertices to a regular grid using a sequence of regular float operations. However, the underlying principles of the invention do not require binning of the vertices. Given that the goal is to reduce full precision operations as much as possible, one embodiment employs techniques which do not require full floating point operations for this process.

In particular, for each BVH node a coordinate space is derived similar to that derived by Vaidyanathan [29] during tree traversal (FIG. 32B). These per-node coordinate spaces are referred to herein as local grids. All node partitioning is performed within the local grids of the nodes, meaning that the resulting bounding boxes correspond perfectly to those which are written in the incremental output hierarchy.

In Vaidyanathan [29], local grids were positioned at arbitrary locations within the irregular space of floating point numbers. One embodiment of the invention uses a different approach, where local grids are positioned arbitrarily in a high-precision, regular grid, referred to as the global grid. Although the global grid is regular, each location in the global grid corresponds perfectly to a floating-point value.

Figure 33:
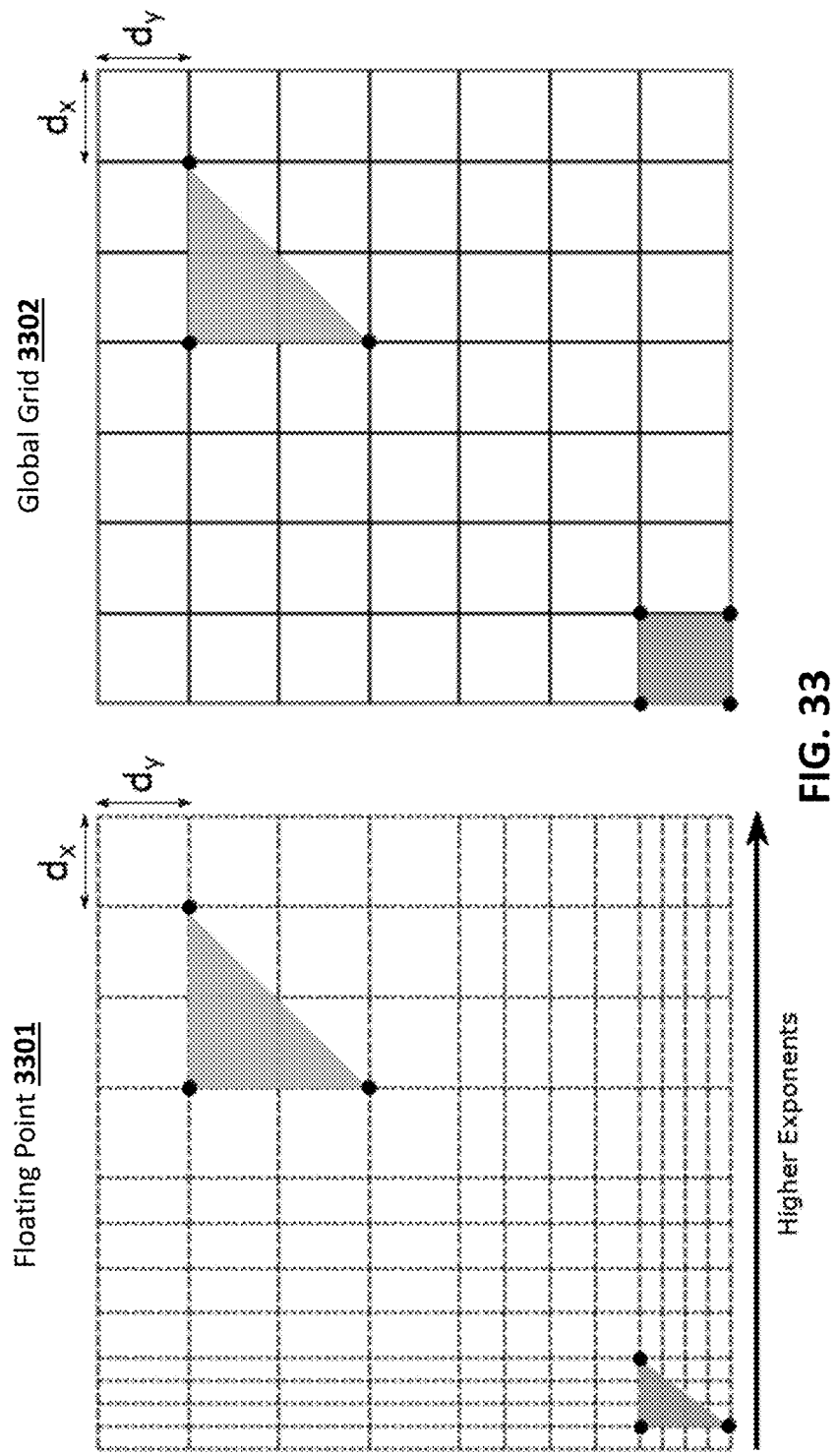
FIG. 33 illustrates the relationship between a floating-point space and a global grid.

FIG. 33 shows the relationship between the underlying floating-point space and the global grid. As shown, higher exponents in the float space result in less precision. Regularity in the global grid is achieved by fixing the exponent which is used to represent values within the grid, rather than allowing the exponent to vary. The global grid linearizes the underlying float space by discarding the lower bits of more precise values. Values further from the origin are often still representable without error (indicated by the large triangle), but values closer to the origin are more likely to have quantization error (smaller triangle).

For each axis, a global exponent is chosen that is greater than or equal to the highest exponent found in that axis in the entire input mesh. The level of precision is thus normalized across the grid to the lowest level of precision present in the range of values. This allows all values to be represented, albeit with a loss of precision in the values with smaller exponents. During construction, full floating-point vertices are re-read from memory for each node during partitioning. This means that quantization is performed anew each time a vertex is accessed. By re-quantizing, quantized vertices do not need to be stored in memory. In the presence of a memory cache (as described below), partially quantized values can be cached instead of full-precision values, allowing the performance of the cache to be amplified, and reducing the overall cost of quantization. For now, it is assumed that the vertices are quantized at each node.

The final operation is to quantize the vertex to the current local grid (i.e., for the current node being partitioned). In one embodiment, the quantization is a two-step process: quantize to the global grid, and from there, quantize to the current local grid.

Precision Constants

Before construction, the precision constants which define the precision of the global grid and the local grids is determined. The elements of one embodiment of this data structure are provided below (i.e., the "precisionConstants" structure). The following suffixes are used to denote the types of vector variables: f (full-precision floating point), u (unsigned integer), i (signed integer). For unsigned and signed integers, the bit-width will vary due to the specific usage of the variable and choice of parameters.

The first set of constants are the number of global bits per axis (globalBitsPerAxis). This value encodes the number of bits for each axis of the global grid. These values need not be equal, and for example, may be allocated in proportion to the lengths of the scene bounding box in each axis. In a given axis, the length of the scene bounding box and the number of bits allocated to that axis imply a global exponent which defines the precision of the global grid. A smaller box length and more allocated bits results in a higher precision global grid, and vice versa. The total number of bits allocated to representing a vertex in the global grid is referred to herein as NV, which equals the sum of the elements of globalBitsPerAxis.

The second constant is the bits per plane (BPP). This constant corresponds exactly to the bits per plane of Vaidyanathan [29], and together with the local grid's exponent, defines the precision of a local grid. The total number of bits allocated to representing a vertex in a local grid is referred to as NL, which equals BPP×3.

```
struct precisionConstants {
    Vec3u globalBitsPerAxis;
    uint BPP;
}
```

The above-defined Precision Constants specify the number of bits per axis of the global grid and the local grids.

Constructing the Global Grid

At the beginning of the build, the global grid and the local grid of the root node of the BVH are determined. In fact, most of this effort is in constructing the global grid, and the root local grid can be trivially inferred from the global grid. The following code sequence is used in one embodiment to specify the global grid data structure.

```
struct globalGrid {
    AABBf inputAABB;
    AABBf alignedAABB ;
    Vec3i globalExponents ;
    Vec3u pow2LengthGlobalUnits ;
    Vec3i originTransform ;
}
```

Figure 34B:
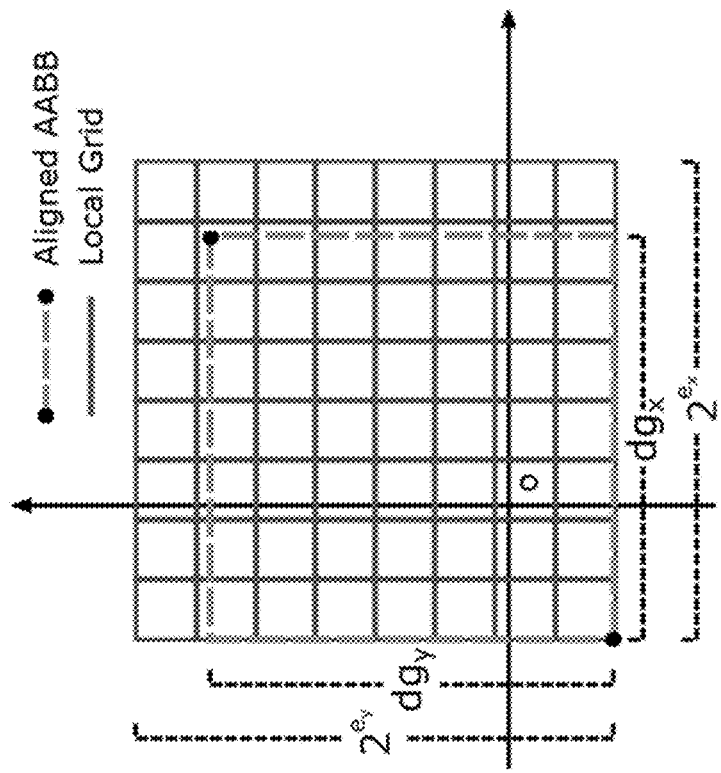
FIGS. 34A-D illustrate features associated with axis aligned bounding boxes within a scene and/or a local grid.
Figure 34A:
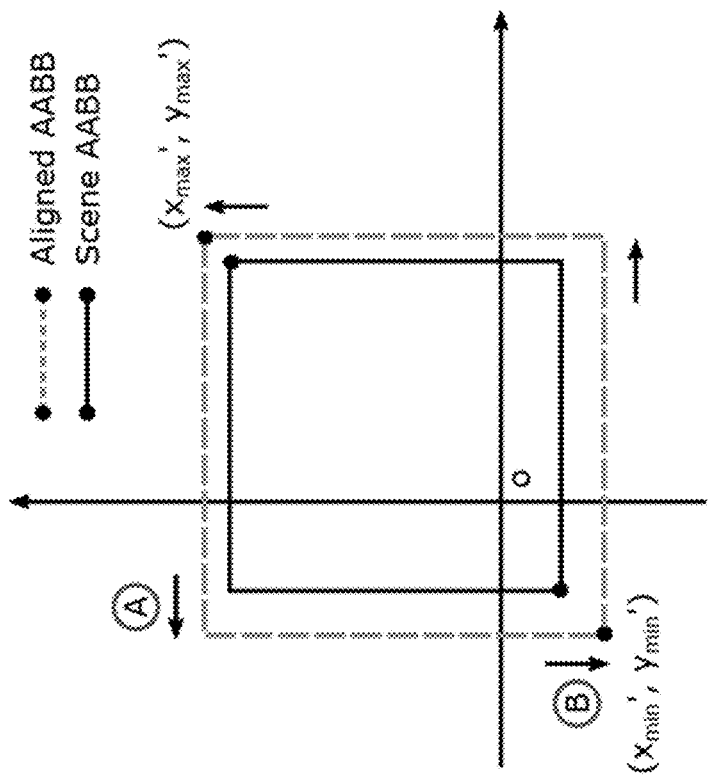

One embodiment of a sequence of operations for constructing the global grid is illustrated in FIGS. 34A-D. Root AABB alignment is illustrated in FIG. 34A. The purpose of this stage is to conservatively align the min and max coordinates of the scene AABB to the global grid precision, since the global grid precision may be lower than their current precision. The globalGridExponents chosen earlier as part of the precision constants imply a regular, signed grid, centered around the origin of the original floating-point space which has the same precision as floating point values possessing that exponent. Root AABB alignment involves conservatively expanding the full-precision root bounding box to align to this global grid.

The inputAABB and alignedAABB members of the globalGrid structure are initialized to the full-precision AABB of the mesh. The alignedAABB is aligned to the global grid. Note, however, that alignedAABB remains a floating point AABB after alignment.

The following program code sequence specifies these operations and other operations described below:

```
1:    procedure createGlobalGrid(globalGrid g, AABBf box, uint N_B,
uint N_V, uint axis, precisionConstants pc)
2:        globalExpReductions[axis] ←
3:        getGlobalExpReduction(box,pc.globalBitsPerAxis,axis)
4:        g.alignedAABB.min[axis] ← box.min[axis]
5:        g.alignedAABB.max[axis] ← box.max[axis]
6:
7:        while true do
8:            exps[0] ← getExponent(g.alignedAABB.min[axis])
9:            exps[1] ← getExponent(g.alignedAABB.max[axis])
10:           signs[0] ← getSign(box.min[axis])
11:           signs[1] ← getSign(box.max[axis])
12:           roundUp[0] ← signs[0]
13:           roundUp[1] ← !signs[1]
14:           g.globalExponents[axis] ← max(exps[0],exps[1])+
15:           globalExpReductions[axis]
16:
17:           for j in 0 . . . 1 do
18:               expDiffs[j] ← g.globalExponents[axis] − exps[j]
19:           end for
20:
21:           g.alignedAABB.min[axis] ← roundToNBitsFloat(
22:           g.alignedAABB.min[axis],expDiffs[0],roundUp[0])
23:           g.alignedAABB.max[axis] ← roundToNBitsFloat(
24:           g.alignedAABB.max[axis],expDiffs[1],roundUp[1])
25:
26:           lengthGlobalUnits[axis] ←
27:           getLengthGlobalUnits(sceneBox,axis.expDiffs)
28:
29:           g.pow2lengthGlobalUnits[axis] +
30:           ceil(log2(lengthGlobalUnits[axis]))
31:
32:           if pc.BPP < g.pow2lengthGlobalUnits[axis] then
33:           numDivsPerLocalGridCell ← 1 <<
34:               (g.pow2lengthGlobalUnits[axis] − pc.BPP)
35:
36:           numUnitsToRound ←
37:               (lengthGlobalUnits%gUnitsPerNodeCell)
38:
39:           roundValue ←
40:           numDivsPerNodeCell − numUnitsToRound
41:
42:           if roundValue != numDivsPerLocalGridCell then
43:           roundValue ← roundValue << expDiffs[1]
44:           mantissa ← getMantissaFP32
45:               (g.alignedAABB.max[axis])
46:
47:           if !isPositive(signs[1]) then
48:           roundValue ←− roundValue
49:           end if
50:
51:           mantissa ← mantissa + roundValue
52:
53:           if mantissa >= (1 << 23) then
54:               setExponentFP32(g.alignedAABB.max[axis],
55:                   getExponent(g.alignedAABB.max[axis]+1)
56:               setMantissaFP32(g.alignedAABB.max[axis],0)
57:               continue
58:           end if
59:
60:           setMantissaFP32(g.alignedAABB.max[axis],
61:           mantissa)
62:           end if
63:           end if
64:           break
65:        end while
66:
67:        g.originTransform ←
68:        computeOriginTransform(g.alignedAABB)
69:    end procedure
```

In the above code, lines 2-64 define operations for performing the alignment for one axis. The axes are independent in this regard, so the procedure is simply called for each axis in turn. Since, for each axis, a global exponent has been chosen which is at least as large as the maximum exponent encountered in the input mesh in that axis, a global exponent reduction is determined for each axis, which encodes by how many units to increase the exponent from the max value encountered in the input mesh (i.e., to accommodate the chosen number of bits for that axis (line 2 in the above code)). A determination is also made as to whether to round the floating-point values of alignedAABB up or down depending on their sign and also on whether it is the min or max coordinate (lines 10-13), in order to round conservatively.

To complete the root AABB Alignment, the difference between the global exponents and the exponents of the floating point box coordinates is determined (lines 17-19). Following that, the floating point value's mantissa is rounded to a number of bits corresponding to the difference in the exponents (lines 21-24). This ensures that the coordinates are aligned with the precision of the chosen exponent. The operation roundToNBitsFloat rounds a float value's mantissa to N bits in the least significant digits and can round up or down depending on the value of roundUp.

The node exponent determination is shown in FIG. 34B and in lines 26-30 of the above code sequence. Local grids are always aligned to the global grid. In one embodiment, local grids define a bits-per-plane and a set of node exponents, meaning that the extent of the local grid is always a power of two number of units in all axes. In addition, there will always be a power of two number of units in the global grid per cell of any local grid as the precision of the grids differ by a power of 2 exponent only. Therefore, the full extent of the root local grid is the smallest power of two number of units in the global grid which is larger than the length of the current box after the root AABB Alignment stage.

Figure 34D:
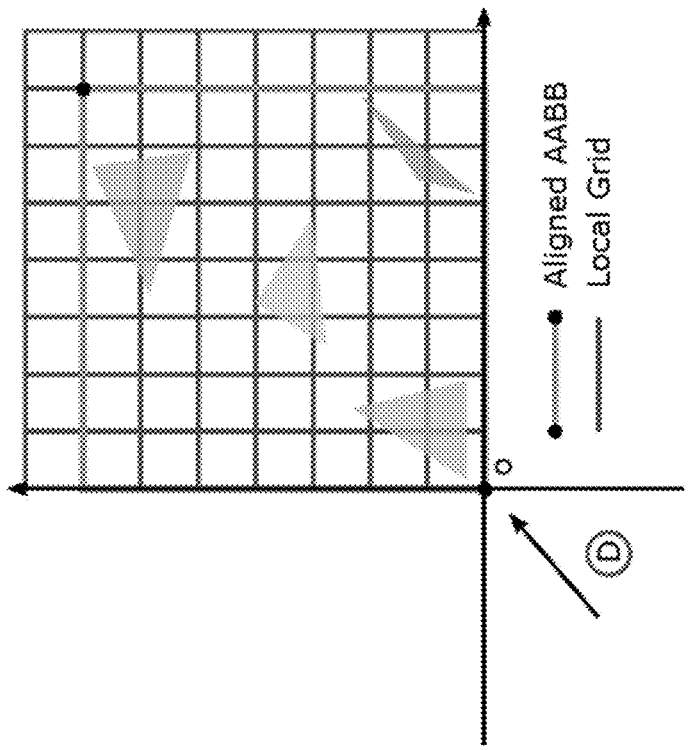
Figure 34C:
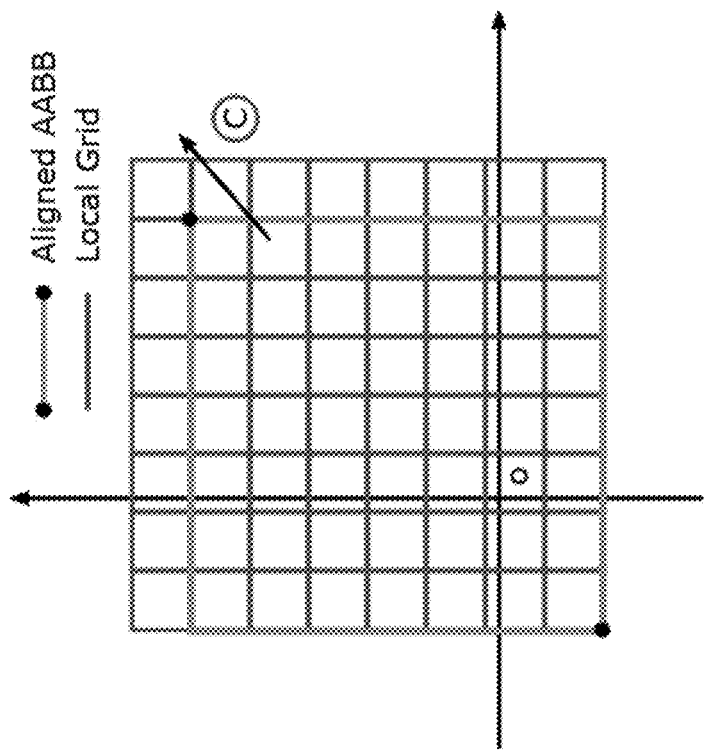

The next stage of the alignment, Round Max to Node Grid, is shown in FIG. 34C, and is performed in lines 32-65 of the above code. Now that the number of units in the global grid are known for each cell in the root local grid, a remainder is determined and the max coordinate of the box aligned to the local grid.

One caveat of rounding up the max coordinate is that if a global exponent is chosen which is the same as the exponent of the max coordinate, it is possible that increasing the max coordinate will increase its exponent. If this new exponent is larger, then the root AABB alignment may be re-run. This behavior is implemented with the continue and break statements of lines 57 and 64, respectively, in the above code.

Finally, the origin transform is determined, shown in FIG. 34D, and lines 67-68 of the above code sequence. The origin transform provides a transform for translating any quantized vertex in the global grid to an unsigned space anchored at the original floating-point origin. This concludes the initialization of the global grid structure.

Constructing the Root Local Grid

Figure 35:
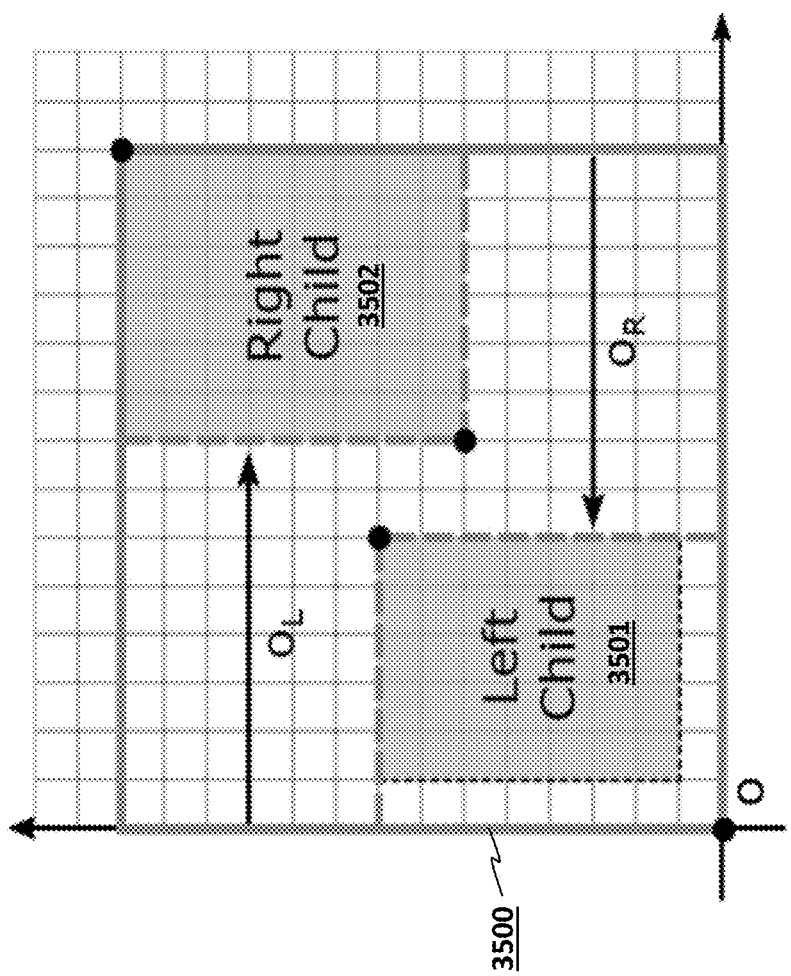
FIG. 35 illustrate an example of left and right child nodes within a parent node.

Since the properties of the root local grid were inferred while aligning the global grid's AABB, the initialization of the root local grid may be finalized in a simple manner. Elements of the local grid are described with respect to the LocalGrid struct below and FIG. 35. As previously noted, by inspecting the pow2lengthGlobalUnits member variable of the global grid, we can infer the gridExponents of the local grid. In addition, we use a routine which we will later describe to quantize the full precision max coordinate of alignedAABB to the local grid. This gives us the gridMax of the local grid. The gridExponents and the gridMax correspond exactly to the node exponents and max coordinate of the node bounding box in Vaidyanathan's format (the min coordinate is always zero and need not be stored). The following example code specifies a local grid data structure:

```
struct localGrid {
    Vec3i gridExponents ;
    Vec3i globalShiftOffset ;
    Vec3u gridMax ;
    Vec3i originTransform ;
    AABBi centroidBox ;
}
```

Referring to FIG. 34B once again illuminates this process. While initializing the global grid, the number of units in the global grid that the box spans are determined in each axis (shown as $dg_x$ and $dg_y$ in the Figure) as well as the smallest power of 2 larger than this value ($2^{ex}$ and $2_{ey}$ in the Figure).

Once these values are determined, the gridExponents as well as the globalShiftOffsets are determined. The globalShiftOffsets encode the differences in the exponents (precision) between a given local grid and the global grid. The full procedure for producing the local grid is shown in the following program code:

```
 1:  procedure createRootLocalGrid(globalGrid g, localGrid lGrid, precisionConstants pc)
 2:    for i in 0 . . . 2 do
 3:        axis ← i
 4:numLeadingZeros = 23 – g.pow2lengthGlobalUnits[axis]
 5:    lGrid.gridExponents[axis] = g.globalExponents[axis]–
 6:        numLeadingZeros
 7:        lGrid.globalShiftOffset[axis] ← 23–
 8:            numLeadingZeros – pc.BPP
 9:    end for
10:
11:lGrid.originTransform ← 0
12:
13:boxMax ← quantizeVertex(g,g.alignedAABB.max,false)
14:boxMax ← g.applyOriginTransform(boxMax)
15:
16:    for i in 0 . . . 2 do
17:        axis ← i
18:        boxMax.min[axis] ←
19:            convertGlobalUnitsToGridUnits(
20:                boxMax.min[axis],
21:                lGrid.globalShiftOffset[axis],
22:                    false)
23:    end for
24:
25:    lGrid.gridMax ← boxMax.min
26: end procedure
```

The next element to calculate is the originTransform of the local grid, which is in the same units as the global grid's origin transform, and is applied in addition to the global grid's transform. The global grid's origin transform translates a quantized vertex into an unsigned space anchored at the original floating-point origin (FIG. 34D), while the additional origin transform of the local grid translates it from that coordinate frame to an unsigned space anchored at the origin of the local grid, which lies within the unsigned global space.

Finally, the local grid also carries a centroid box, which is a conservatively quantized AABB within the local grid, which bounds the centroids of the primitives within the current node. To initialize this in the root local grid, we simply compute this value in full precision while computing the full precision scene AABB, and then quantize it to the root local grid using the quantization procedures detailed in the next section.

Quantizing Primitives

Throughout the build process, full-precision float vertices are re-read from main memory and quantized to the current level of precision as defined by the current local grid. By doing this, the mesh can be left unmodified in memory for other tasks such as ray-triangle intersection, and avoid writing intermediate data. A single core operation of quantizing a vertex is first implemented. From this core operation, it is trivial to quantize AABBs and triangles.

In order for quantized AABBs and triangles to be conservative and watertight, the fact that quantization of vertices will introduce some degree of uncertainty in the "true" value of the vertex must be considered. To take this into account, a full-precision vertex is not quantized to a single, quantized vertex. Instead, quantization is performed to a reduced-precision AABB per vertex, which is guaranteed to contain the original full precision vertex. This AABB captures the range of uncertainty with regard to the full-precision vertex.

The overall goal for vertex quantization is to start with a 32-bit floating point vertex and quantize it to an AABB in the local grid defined by the current node. However, due to spatial splits, it may be the case that not all vertices referenced by triangles in the current node lie within the representable region defined by the local grid of this node. However, to perform correct top-down BVH construction including spatial splitting of triangle AABBs, only the overlap of this AABB with the current node is required. One embodiment of the invention therefore utilizes the following quantization process:
  1. Quantize the vertex to the global grid, producing an AABBi of uncertainty in the global grid (float→integer quantization).
  2. Apply the origin transform of the global grid to the AABBi.
  3. Apply the origin transform of the local grid to the AABBi.
  4. Quantize the AABBi to the current local grid's precision (integer→integer quantization).

5. Clamp the AABBi to the current node's extent in the local grid. The resulting AABBu is guaranteed to require only NL bits per vertex to represent.

Of course, since the two transforms are in the same units, they may be combined. However, as described below, there can be an advantage to not doing so. All vertices or AABBs are now represented as an AABBu in NL-bit space. This means that all build operations such as centroid computations, binning, spatial splitting of AABBs, SAH evaluation and primitive list partitioning are performed in NL-bit space. An AABB of a triangle is trivially computed as the union of the result of this procedure for each vertex. This is also performed in unsigned NL-bit space.

The most intricate part of this process is quantizing to the global grid (Step 1). In one embodiment, vertex quantization is implemented in accordance with the following code sequence:

```
1:   function quantizeVertex(globalGrid g, Vec3f fullPrec Vtx, bool applyRounding)
2:       for all axes a do
3:           if fullPrecisionVtx[a] == 0 then
4:               result.min[a] ← 0
5:               result.max[a] ← (int)applyRounding
6:               continue
7:           end if
8:
9:           roundUp ←!isPositive(fullPrecVtx[a])
10:
11:          vertexExponent ←
12:              getExponent(fullPrecVtx[a])
13:
14:          gridVertexExpDiff ← g.globalExponents[a]–
15:              vertexExponent
16:
17:          result.min[a] ← getMantissaFP32(fullPrecVtx[a])
18:          result.max[a] ← result.min[a]
19:
20:          if gridVertexExpDiff <= 23 then
21:              if applyRounding then
22:                  result.min[a] ←
23:                      roundToNBitsInt(result.min[a],
24:                      gridVertexExpDiff,roundUp)
25:                  result.max[a] ←
26:                      roundToNBitsInt(result.max[a],
27:                      gridVertexExpDiff,!roundUp)
28:              end if
29:
30:              result.min[a] ← result.min[a]
31:                  >> gridVertexExpDiff
32:              result.max[a] ← result.max[a]
33:                  >> gridVertexExpDiff
34:          else
35:              result.min[a] ← (int)applyRounding
36:              result.max[a] ← 0
37:
38:              if !roundUp then
39:                  swap(result.min[a],result.max[a])
40:              end if
41:          end if
42:
43:          if getSignFP32(fullPrecisionVtx[a]) == 1 then
44:              result.min[a] ←–result.min[a]
45:              result.max[a] ←–result.max[a]
46:          end if
47:      end for
48:      return result
49:  end function
```

As indicated above, to quantize the vertex to NV-bit signed space, each vertex component's exponent is subtracted from the global exponent for that axis. The component value is then shifted down by this difference. This may of course discard some precision in the lower portion of the component. To capture this loss, an AABB is produced by rounding the min value down and the max value up after this shift. To maintain simplicity, a vertex is quantized to a unit AABB, even if there is no error during quantization.

Transitioning to an unsigned NV-bit space is accomplished by applying the origin transform to the AABB. The origin transform of the local grid is first applied, followed by a transition from the grid resolution of the global grid to the resolution of the local grid. In one embodiment, this is specified by the following code sequence:

```
1: procedure quantizeToLocalGrid(Box3i lossyVertex,
localGrid lGrid)
2:     for all axes a do
3:     result.min[a] = convertGlobalUnitsToGridUnits(
4:     lossyVertex.min[a],lGrid.globalShiftOffset[a],false)
5:     result.max[a] = convertGlobalUnitsToGridUnits(
6:     lossyVertex.max[a],lGrid.globalShiftOffset[a],true)
7:         end for
            return result
8:  end procedure
9:
10: procedure convertGlobalUnitsToGridUnits(uint globalUnits, int shiftOffset, bool roundUp)
11: shiftValue ← abs(shiftOffset)
12:
13:     if shiftOffset ≥ 0 then
14:return roundToNBitsInt(globalUnits,
15:         shiftValue, roundUp) >> shiftValue
16:     else
17:return globalUnits << shiftValue
18:     end if
19: end procedure
20
21: procedure clampAndExpandAABB(localGrid lGrid, Box3i& vertexBox, Box3i& result,
        bool force NonZeroBox, bool
        clampToGridDimensions)
22:if clampToGridDimensions then
23: result ← vertexBox.clampTo(lGrid.getAABB( ))
```

```
24:        end if
25:
26:    if forceNonZeroBox then
27:        for all axes a do
28:            if result.min[a] == result.max[a] then
29:                if result.min[a]! = 0 then
30:                    result.min[a] ← result.min[a] − 1
31:                else
32:                    result.max[a] ← result.max[a] + 1
33:                end if
34:            end if
35:        end for
36:    end if
37: end procedure
```

The min and max of the NV-bit AABB is shifted down by the globalShiftOffset for that axis. This transitions the vertex to a grid requiring a maximum of NV bits to represent, which is at the granularity of the current local grid, but extended across the entire scene. In the case of spatial splits, the vertex may lie outside the current node at this point.

If globalShiftOffset is greater than 0, this will of course discard precision. As before, the min value of the box is rounded down and the max value is rounded up to produce an AABB in the coarser grid. Note that if the NV-bit AABB before rounding to NL-bits overlaps more than one division of the node grid in a given axis, the NL-bit AABB can also span multiple units in the node grid.

A quantized AABB can be produced by quantizing the min and max vertices of the AABB in this fashion. However, the vertices of the AABB may require as much NV-bits to represent. However, as previously noted, only the overlap of the AABB with the current node's bounding box is required. The AABB can thus be clamped to this bounding box, which allows all the remaining build stages to be performed in fully reduced precision. This is detailed in clampAndExpandBox in the quantizeToLocalGrid code above. The box may also be expanded to ensure that it has a width of at least one unit in all axes. This is required to ensure that the exponent in subsequent nodes is not infinitely reduced.

The operation roundToNBitsInt rounds an integer to N bits in the least significant digits and can round up or down depending on the value of roundUp. One other caveat is that since clamping is performed to an NV-bit global space via the global exponent, globalShiftOffset may become negative, meaning that the current incremental node may be encoding more precision than the NV-bit space. To correct for this, simply shift up instead of down in this case, and do not perform rounding. This has the effect of "skipping" certain plane values in the space. However, in all cases the AABBs in node space must span at least one unit in each axis. In Vaidyanathan [29], providing the limit of the floating-point exponent has not been reached, bounding planes by definition are at least $2^{N_B-1}+1$ units from the node origin (otherwise the exponent would drop once again). The global exponent places a hard limit on the ability to drop the exponent, which can result in bounding planes less than $2^{N_b-1}+1$. Snapping to NV-bit unsigned space reduces the cost per vertex for quantization.

Deriving a Local Grid for New Child Nodes

The above techniques may be used to establish the root node and to perform quantization of vertices to NB-bit space. One implementation of the logic to evaluate splitting decisions (such as SAH binning) is provided below. For now, a description is provided for creating child nodes, regardless of which heuristic is used to determine the split.

When a split has been determined, the resulting child nodes will be represented as two integer bounding boxes in the NB-bit space. In addition to this, a centroid box may be propagated to the child nodes, as some partitioning schemes benefit from this (e.g. SAH binning on the centroid box is beneficial for object splits). Propagation of a centroid box accumulated during primitive binning is also described below.

The first step in deriving the new local grids for the child nodes is to determine which planes from which child node will be shared with the parent. This is achieved simply by determining which child node contains the plane closest to the min and max coordinates of the parent node. These planes are encoded into an incremental format in a very similar manner to Vaidyanathan [29].

It is important to determine this first before computing the local grids because of an effect which does not occur in a regular full-precision BVH build. A common case during the build is that the vertices contained in each child node are quantized at a higher level of precision than when they were quantized to determine the parent (because there is often an exponent reduction moving from parent to child). This means that the planes of the child node AABBs may not be precisely shared between parent and child, due to a lower degree of rounding. The parent node may be slightly "inflated" around the child nodes due to quantization differences. This is shown for the left child 3501 in FIG. 35 which is offset from the left side of the parent bounding box 3500 (in contrast to the right child 3502 which shares a plane with the parent in the X and Y axes). This is not directly compatible with the incremental format or derivation of the local grids.

This may be solved by replacing the planes that should be shared in the child nodes with the values in the parent (in other words, they are clamped up or down to the parent planes). The new local grids are then derived from these new updated child AABBs. This enlarges the child box slightly, but results in a watertight child that is compatible with the incremental format. Once the updated bounds are obtained, the new local grid may be computed in accordance with the following code sequence:

```
1: procedure createChildGrid(localGrid parentGrid, AABB childBox, localGrid childGrid,
        precisionConstants pc)
```

```
 2:   childGrid ← parentGrid
 3:
 4:     for all axes a do
 5:   length ← childBox.max[a] – childBox.min[a]
 6:     pow2ChildLength ← ceil(log2(length))
 7:
 8:   childExpReduction ← pc.BPP – pow2ChildLength
 9:
10:   childExpReduction ← min(childExpReduction,
11:           childGrid.globalShiftOffset[a])
12:
13:childGrid.gridExponents[a]– = childExpReduction
14:
15:         originOffset ← convertGridUnitsToGlobalUnits( 16:
           childBox.min[a],parentGrid.globalShiftOffset[a])
17:
18:         childGrid.originTransform[a] ←
19:         childGrid.originTransform[a] – originOffset
20:
21:     childGrid.globalShiftOffset[a] ←
22:childGrid.shiftOffsetNodeGrid[a] – childExpReduction
23:
24:childGrid.gridMax[a] ← length << childExpReduction
25:       end for
26:     end procedure
```

Heuristic Evaluation

The embodiments of the invention described herein enable a top-down, spatial-split oriented builder. Such builders are consistently observed to deliver the highest traversal performance of all known BVH construction algorithms. In particular one embodiment comprises a binning-based builder that compares the results of conventional, non-splitting binned SAH-style node partitioning, with a spatial split oriented partitioning. There is some commonality between these partitioning strategies, so the non-spatial-split binning technique is described first followed by the extensions needed for the spatial-split partitioning.

Primitive Binning

Primitive binning is very cheap once quantization has occurred. Two slightly different approaches to binning are required for a SBVH-style build. For spatial splits, the min and max coordinates of the triangle's AABB are binned in the splitting axis along the entire extent of the node. For object splits, AABB centroids are binned along the extent of the centroid box only. FIG. 36A illustrates an example with spatial splits and FIG. 36B illustrates an example with object splits (both examples with two triangles for objects).

Figure 36B:
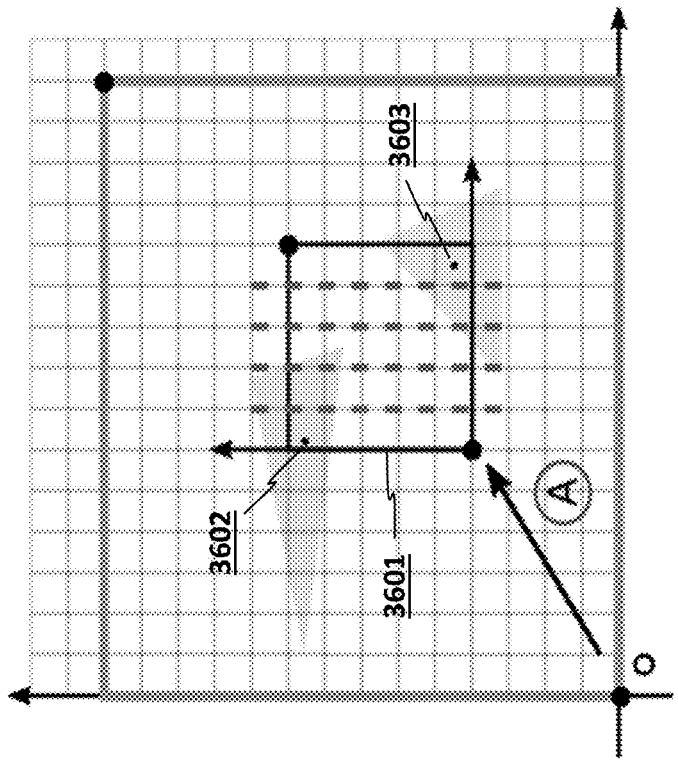
FIGS. 36A-B illustrate features associated with spatial splitting and object splitting.
Figure 36A:
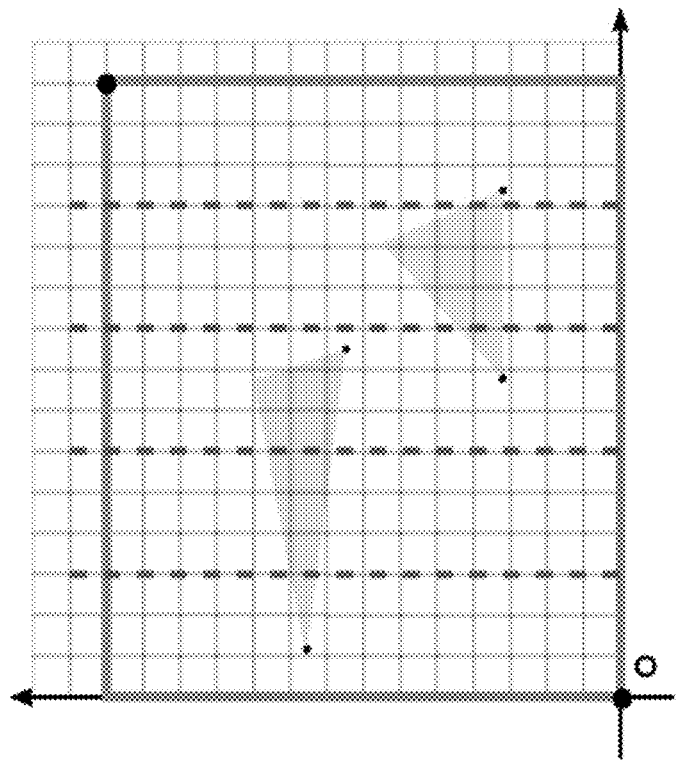

A centroid box 3601 is shown in FIG. 36B bounding centroids 3602, 3603 of the two objects. The reason for binning only along the centroid box for object splits is that this results in higher quality splits. Since the AABB centroids determine the bin for each primitive during object splitting, the chosen bin must reside within the centroid box. This prevents "wasted bins" outside the possible range and also prevent invalid splits (zero primitives in one child).

Binning can occur cheaply in NB-bit space. The main thing to determine is how many units in the local grid each bin will span. To compute this, the length of the binning range is determined (node or centroid box) in that axis. Like existing top-down builders, the goal is a constant number of bins per axis. However, since fractional values are not allowed, there must be at least one unit in the local grid per bin. To correct for cases where the number of desired bins is greater than the precision of the local grid, one embodiment clamps to the number of units available in the local grid. Therefore, the number of bins is determined somewhat dynamically based on available precision. However, it is observed that the number of bins needs to be limited for relatively few nodes, and usually very close to the leaves. From this, the number of local grid units per bin are determined in reduced-precision which can be used for binning. The following code sequence specifies computation of the number of bins and number of local grid units per bin in the splitting axis.

```
1: function getNumUnitsPerBin(uint numDesiredBins,
     Box3i binRange, uint splitAxis, precisionConstants pc)
2: length←binRange.max[splitAxis]–binRange.min[spli-
     tAxis]
3: numBins←min(binLength,numDesiredBins)
4:
5: binScale←numBins<<pc.BPP
6: binScale←binScale/length
7: numUnitsPerBin←(1<<pc.BPP)/binScale
8: return numUnitsPerBin
9: end function
```

Using this information, a vertex may be binned for spatial splits (which uses the entire length of the box in that axis), simply by dividing the vertex coordinate by numUnitsPerBin (FIG. 36A). For object splits, the centroid of the AABB of the triangle is binned. To do this, a centroid is determined in local grid space.

Binning the centroid requires one more operation. An NB-bit centroid transform is computed per node as the min vertex of the centroid box for the node. This is in units of the local grid. Before binning, this transform is subtracted from the vertex, moving it into the local centroid space (FIG. 36B). Binning is then performed simply by dividing by numUnitsPerBin.

This binning scheme eliminates the need for expensive full precision operations, including the multiply/divide for binning.

Spatial splitting requires maintaining a start and an end counter per bin. However, when performing object splits, only a single counter is required. However, to avoid needing separate hardware for the two approaches, separate start and end counters are used for implementing both object and spatial split binning. Object splits are made compatible with this approach simply by incrementing both the start and end counters for the single bin where the triangle centroid lies during object splitting.

A limitation of the integer binning approach is that, an integer number of divisions is required in the local grid per bin. This can lead to an effective loss of bins, when the number divisions across the range is small. For example, if NB=8 bits, and the node box is 158 units wide in x, and 16 bins are desired, then 158/16=9 units per bin may be determined. This means that the last bin will cover 23 units, enlarging the last bin to some degree. However, this did not result in a significant impact on tree quality.

In cases where a node partition is not possible with either binning approach, one embodiment defaults to a simple "list partitioning" strategy, where the primitive array of the node is divided in two (without sorting) and the AABBs computed. This can of course lead to much node overlap. However, this strategy is only required in a very small number of cases, and has no major impact on tree quality. Such a split is also performed when splitting a node with only two primitives. The third case in which this partitioning is applied is when there is only sufficient precision for a single bin, as indicated in getNumUnitsPerBin above.

A fortunate property of binning in reduced-precision space is that, in most cases, it has zero negative impact on tree quality above and beyond that imposed by the incremental node encoding. This is because only sufficient precision is required such that each bin has a width of at least one unit in the quantized space to accurately determine the bin in which a triangle centroid is to be placed. In a full-precision builder, extra precision within a bin is essentially ignored for binning purposes.

The AABBs of the bins will be inflated by the incremental format, but this will occur anyway as a side effect of using such a format. If it is desired to store the hierarchy in a quantized format, it is better to have the inflated AABB information during the build, as it leads to a SAH estimate which is true to the final tree, as opposed to the situation where quantization is applied as a post-process.

Propagating a Centroid Box

Another issue which is sensitive to varying levels of precision between parent and child is the determination and propagation of a centroid box for object splits. In the build process, a centroid box is maintained during binning, so that it may be propagated to each new child node for binning operations in that new child. To avoid floating point arithmetic, the centroids are computed based on the min and max coordinates of the quantized AABB. Depending on the relative distances of the full-precision min and max coordinates to their quantized locations, it is possible for the centroid to get "pulled" either up or down when being computed. For example, even if rounding down during the midpoint calculation, the centroid can get rounded "up" if the min coordinate of the box is already close to its quantized position, and the full-precision max coordinate is much further away from its quantized position.

To address this issue, the centroid box may be naïvely accumulated with regular AABB-point union operations. Once a split is selected and the centroid box to propagate is determined, it may be expanded by one unit in each direction for each axis. This resolves all ambiguity inherent in the quantized computation. Once a splitting plane is determined, the associated centroid box can be transformed to the child's local grid as shown in the following program code sequence:

```
1:  function transformBoxToChild(localGrid parentGrid, AABB childBox, AABB
    childCentroidBox, localGrid childGrid)
2:      for all axes a
3:          result.min[a] ← childCentroidBox.min[a] -
4:              childBox.min[a]
5:
6:          result.max[a] ← childCentroidBox.max[a]-
7:              childBox.min[a]
8:
9:          scaleDiff ← parentGrid.gridExponents[a]-
10:             childGrid.gridExponents[a]
11:
12:         result.min[a] ← result.min[a] << scaleDiff
13:         result.max[a] ← result.max[a] << scaleDiff
14:     end for
15:     return result
16: end function
```

Spatial Splits

An important feature of high quality BVH builders is spatial splitting, which provides a way to eliminate overlap of sibling nodes, which might otherwise be unavoidable. Such overlap can have a detrimental effect on traversal performance.

However, spatial splitting of triangles in local reduced precision space raises an important challenge which does not arise in full-precision builders: triangles in the current node that have previously been split in an ancestor node may have vertices lying outside the local grid. Therefore, we simply cannot represent these vertices in the NB-bit space.

In lieu of full triangle splitting, one embodiment implements a simple and cheap approach that can yield acceptable results. To enable spatial splits, this embodiment first quantizes the AABB of a triangle in the NV-bit space, clips it to the node bounding box, and bins that NB-bit box into the node. We bin the min and max coordinates of the AABB into the node, and can perform spatial splits by splitting the AABB against the splitting planes which it overlaps.

Since an interactive builder is desired, a hard limit may be introduced on the number of new references that can be produced due to spatial splitting. Such a feature is common to a number of fast spatial splitting builders. As each spatial split is performed, it reduces the remaining quota of spatial splits. When two new child nodes are produced, distribution of the remaining split quota is determined. In one embodiment, distribution is performed in proportion to the SAH cost of the child node. Higher cost child nodes will therefore receive more of the split quota.

On top of a hard quota for new references produced during the build, an allowance is made for spatial split attempts to be limited to nodes which possess certain attributes. In addition, one embodiment combines this with a hard split quota. Observations reveal that with a hard quota for new references, many spatial splits are attempted which can never end up in the tree. For example, if a large number of primitives are referenced at a node, but the remaining budget for splits is very small relative to this large number, then no spatial split is likely to be possible, since more than a small number of new references are likely to be created. For efficiency purposes, split attempts which are unlikely to be actionable may be disallowed.

Computing the SAH

Once binning is complete as either object or spatial-split binning, the SAH is determined for each potential split plane. In one implementation, determining the SAH can be done entirely with unsigned integers, by computing the surface area of the bin boxes, along with the bin counts. To compute this, the same technique involving both start and end bins is used for both object and spatial splits. These may be efficiently unified with the hardware implementations described herein. Searching for candidate planes is inherently supported on both the longest axis of the box only, and on all three axes if desired.

As with the other stages, this step may be modified from a conventional full-precision builder. Wald et al [33] also reports handling of this case in his reduced-precision builder. The additional factor relates to computing the surface area. The exponents of each of the coordinate axes in the local grid may have different values. Therefore, the units of measurement are potentially different across axes. To compute surface area values, we must obtain each length in the same units.

To solve this, all values are represented with respect to the largest unit (largest exponent) across the three axes. The alternative approach would be to represent the lengths of the box by the smallest unit (smallest exponent), but this would require wider arithmetic operations. Furthermore, no quality degradation has been observed from using the larger exponent. Values may be shifted from axes with smaller exponents down by the difference between the exponents, and a length of at least one unit enforced for any length. Once the surface area is obtained, multiply by the number of primitives inside the AABB when computing the SAH. The following code sequence specifies how the surface area is computed in one embodiment:

```
1:   function getSurfaceArea(localGrid lGrid, Box3i lGridBox)
2:       exps ← lGrid.getExponents( )
3:       largestExp ← max(exps[0],exps[1])
4:       largestExp ← max(largestExp,exps[2])
5:
6:       for i in 0 . . . 2 do
7:           newBoxLengths[i] = [GridBox.max[i] – lGridBox.min[i]
8:           expDiff ← largestExp – exps[i]
9:           newBoxLengths[i] ← newBoxLengths[i] >> expDiff
10:          newBoxLengths[i] ← max(newBoxLengths[i],1)
11:      end for
12:
13:      result = newBoxLengths[0] * newBoxLengths[1];
14:      result+ = newBoxLengths[1] * newBoxLengths[2];
15:      result+ = newBoxLengths[0] * newBoxLengths[2];
16:      return result
17:  end function
```

Node Output

Since local grids are aligned to the quantization scheme employed for traversal in Vaidyanathan [29], direct output of incrementally encoded hierarchies may be easily achieved. For example, in one embodiment, this is achieved by checking for shared planes as in FIG. 35 to define the reuse masks, by directly using the quantized bounding boxes of the local grid to infer the new quantized planes, and by setting the leaf node flags and right child pointers as appropriate.

Architecture

Figure 37:
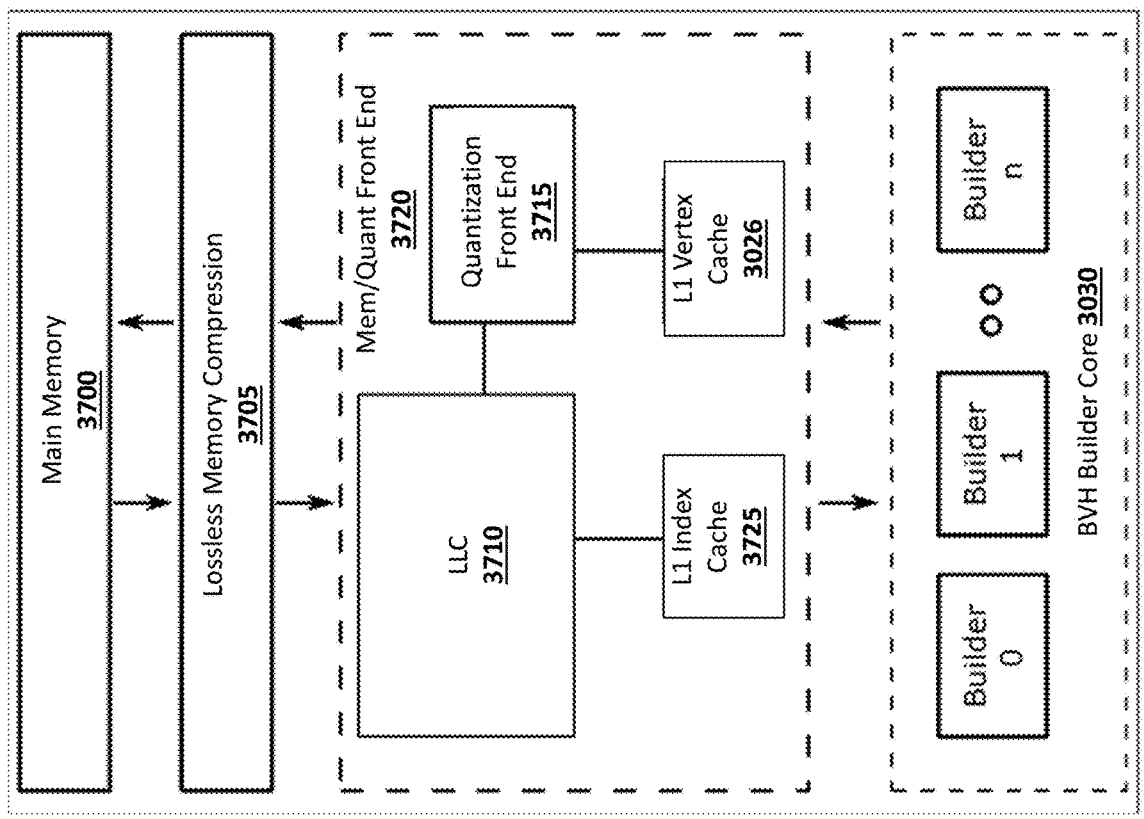
FIG. 37 illustrates one embodiment of a ray tracing architecture.

FIG. 37 illustrates one embodiment of an architecture for implementing the reduced-precision BVH construction techniques described herein. In addition to reduced-precision arithmetic, this embodiment includes lossless memory compression circuitry 3705 for implementing lossless memory bandwidth compression, similar to implementations often employed in GPUs for improving scalability and lowering power consumption. In one embodiment, the lossless memory compression logic 3705 compresses data being written to main memory 3700 and decompresses data being read from main memory 3700.

The illustrated architecture includes BVH build units 0-n within the BVH builder core 3030 requesting data from a memory/quantization front end 3715, which includes or is coupled to a large last-level cache (LLC) 3710. The BVH build units 0-n thus only ever work with quantized data produced by the quantization front end 3715. In addition, one embodiment includes an L1 index cache 3725 and an L1 vertex cache 3026 for caching triangle indices and vertices, respectively.

Vertex Caching

Different techniques may be used for caching vertices in the L1 vertex cache 3026 and LLC 3710. In one embodiment, the full-precision vertices are cached in both the last level cache 3710 and the L1 caches 3725-3726. In this implementation, quantization is performed after the data is read from the caches 3725-3726.

Alternatively, or in addition, the separation of quantization into global and local grids allows for a second caching scheme. Since the globalBitsPerAxis of the precisionConstants can be set arbitrarily, it is possible to limit the total size (NV) of a vertex to a small "record" comprising, for example, 64 bits. This record is used, and if a local grid implies a higher level of precision, a higher degree of quantization occurs, rather than allowing the globalBitsPerAxis to be exceeded. One advantage of producing such a small record is that these records can be cached for BVH construction instead of caching the full precision floating point values which may be much larger. This amounts to lossy compression of vertices, but this will likely only have a detrimental effect towards the bottom of the tree if the precision is exceeded by a local grid. Since the algorithm is generalized to any value of globalBitsPerAxis, differing levels of precision can be used to construct different parts of the tree. At the top of the tree, less precision is required, and so a small record may suffice at those levels. A larger record size may then be used for constructing lower levels of the tree to prevent additional quantization error at these levels.

One embodiment employs a combination of these two caching schemes, where the quantization occurs between the last-level cache 3710 and L1 caches 3725-3726. In addition, when caching quantized vertices, vertices pre-transformed by the global grid's originTransform can be cached, giving unsigned values (e.g., as in FIG. 34D). Then only the local grid's originTransform is applied before quantization of the vertices to the local grid, reducing overall quantization overhead.

The embodiments of the invention provide numerous advantages over existing implementations. In particular, the described embodiments allow for high-quality spatial-splitting BVHs to be constructed entirely within reduced-precision space, dramatically reducing the hardware cost of a fixed-function implementation. The architecture described with respect to FIG. 37 comprises the first hardware-based BVH builder supporting spatial splitting of triangles and the caching mechanism and lossless compression to reduce memory bandwidth are novel bandwidth-saving measures which are not found in any other BVH builder. Additionally, unlike other implementations, certain embodiments described herein allow for direct output of incrementally encoded hierarchies.

REFERENCES

[1] IEEE Standard for Floating-Point Arithmetic. IEEE Std 754-2008, pages 1-70, August 2008.
[2] Pablo Bauszat, Martin Eisemann, and Marcus Magnor. The Minimal Bounding Volume Hierarchy. In Vision, Modeling, and Visualization, pages 227-234, Siegen, Germany, 2010.
[3] Jiři Bittner, Michal Hapala, and Vlastimil Havran. Incremental bvh construction for ray tracing. Comput. Graph., 47(C):135-144, April 2015.
[4] David Cline, Kevin Steele, and Parris Egbert. Lightweight Bounding Volumes for Ray Tracing. Journal of Graphics, GPU, and Game Tools, 11(4):61-71, 2006.
[5] H. Dammertz and A. Keller. The edge volume heuristic—robust triangle subdivision for improved bvh performance. In 2008 IEEE Symposium on Interactive Ray Tracing, pages 155-158, August 2008.
[6] Michael J. Doyle, Colin Fowler, and Michael Manzke. A hardware unit for fast sah-optimised bvh construction. ACM Trans. Graph., 32(4):139:1-139:10, July 2013.
[7] Martin Eisemann, Pablo Bauszat, and Marcus Magnor. Implicit object space partitioning: The no-memory BVH. Technical Report 16, Computer Graphics Lab, TU Braunschweig, January 2012.
[8] Manfred Ernst and Gunther Greiner. Early Split Clipping for Bounding Volume Hierarchies. In IEEE Symposium on Interactive Ray Tracing, pages 73-78, 2007.
[9] Bartosz Fabianowski and John Dingliana. Compact BVH Storage for Ray Tracing and Photon Mapping. In Proceedings of Eurographics Ireland Workshop, pages 1-8, 2009.
[10] P. Ganestam, R. Barringer, M. Doggett, and T. AkenineMo¨ller. Bonsai: Rapid bounding volume hierarchy generation using mini trees. Journal of Computer Graphics Techniques (JCGT), 4(3):23-42, September 2015.
[11] Per Ganestam and Michael Doggett. Sah guided spatial split partitioning for fast bvh construction. Comput. Graph. Forum, 35(2):285-293, May 2016.
[12] Yan Gu, Yong He, Kayvon Fatahalian, and Guy Blelloch. Efficient bvh construction via approximate agglomerative clustering. In Proceedings of the 5th HighPerformance Graphics Conference, HPG '13, pages 81-88, New York, NY, USA, 2013. ACM.
[13] Vlastimil Havran. Cache sensitive representation for the bsp tree. In Compugraphics, volume 97, pages 369-376, 1997.
[14] J. Hendrich, D. Meister, and J. Bittner. Parallel bvh construction using progressive hierarchical refinement. Computer Graphics Forum, 36(2):487-494, 2017.
[15] Tero Karras and Timo Aila. Fast Parallel Construction of High-Quality Bounding Volume Hierarchies. In High-Performance Graphics, pages 89-99, 2013.
[16] Sean Keely. Reduced Precision for Hardware Ray Tracing in GPUs. In High-Performance Graphics, pages 29-40, 2014.
[17] C. Lauterbach, M. Garland, S. Sengupta, D. Luebke, and D. Manocha. Fast BVH Construction on GPUs. Computer Graphics Forum (Proceedings of Eurographics), 28(2):375-384, 2009.
[18] G. Liktor and K. Vaidyanathan. Bandwidth-efficient bvh layout for incremental hardware traversal. In Proceedings of High Performance Graphics, HPG '16, pages 51-61, Aire-la-Ville, Switzerland, Switzerland, 2016. Eurographics Association.
[19] X. Liu, Y. Deng, Y. Ni, and Z. Li. Fasttree: A hardware kd-tree construction acceleration engine for real-time ray tracing. In 2015 Design, Automation Test in Europe Conference Exhibition (DATE), pages 1595-1598, March 2015.
[20] J. David MacDonald and Kellogg S. Booth. Heuristics for Ray Tracing using Space Subdivision. 6(6):153-165, 1990.
[21] J. Mahovsky and B. Wyvill. Memory-Conserving Bounding Volume Hierarchies with Coherent Raytracing. Computer Graphics Forum, 25(2):173-182, 2006.
[22] D. Meister and J. Bittner. Parallel locally-ordered clustering for bounding volume hierarchy construction. IEEE Transactions on Visualization and Computer Graphics, 24(3):1345-1353, March 2018.
[23] J. H. Nah, J. W. Kim, J. Park, W. J. Lee, J. S. Park, S. Y. Jung, W. C. Park, D. Manocha, and T. D. Han. Hart: A hybrid architecture for ray tracing animated scenes. IEEE Transactions on Visualization and Computer Graphics, 21(3):389-401, March 2015.
[24] Jae-Ho Nah, Hyuck-Joo Kwon, Dong-Seok Kim, Cheol-Ho Jeong, Jinhong Park, Tack-Don Han, Dinesh Manocha, and Woo-Chan Park. RayCore: A RayTracin Hardware Architecture for Mobile Devices. ACM Transactions on Graphics, 33(5):162:1-162:15, 2014.
[25] J. Pantaleoni and D. Luebke. HLBVH: Hierarchical LBVH Construction for Real-Time Ray Tracing of Dynamic Geometry. In High-Performance Graphics, pages 87-95, 2010.
[26] Stefan Popov, Iliyan Georgiev, Rossen Dimov, and Philipp Slusallek. Object partitioning considered harmful: space subdivision for bvhs. In HPG '09: Proceedings of the 1st ACM conference on High Performance Graphics, pages 15-22, New York, NY, USA, 2009. ACM.
[27] Jim Rasmusson. Lossy and Lossless Compression Techniques for Graphics Processors. 2012.
[28] Martin Stich, Heiko Friedrich, and Andreas Dietrich. Spatial Splits in Bounding Volume Hierarchies. In High-Performance Graphics, pages 7-13, 2009.
[29] K. Vaidyanathan, T. Akenine-Moeller, and M. Salvi. Watertight ray traversal with reduced precision. In Proceedings of High Performance Graphics, HPG '16, pages 33-40, Aire-la-Ville, Switzerland, Switzerland, 2016. Eurographics Association.
[30] T. Viitanen, M. Koskela, P. Ja¨a¨skela¨inen, K. Immonen, and J. Takala. Fast hardware construction and refitting of quantized bounding volume hierarchies. Computer Graphics Forum, 36(4):167-178, 2017.
[31] Timo Viitanen, Matias Koskela, Pekka J¨a¨askel¨ainen, Heikki Kultala, and Jarmo Takala. Mergetree: A fast hardware hlbvh constructor for animated ray tracing. ACM Trans. Graph., 36(5):169:1-169:14, October 2017.
[32] Timo Viitanen, Matias Koskela, Pekka J¨a¨askel¨ainen, Aleksi Tervo, and Jarmo Takala. Ploctree: A fast, high-quality hardware bvh builder. Proc. ACM Comput. Graph. Interact. Tech., 1(2):35:1-35:19, August 2018.
[33] Ingo Wald. Fast Construction of SAH BVHs on the Intel Many Integrated Core (MIC) Architecture. IEEE Transactions on Visualization and Computer Graphics, 18(1):47-57, January 2012.
[34] Ingo Wald, Sven Woop, Carsten Benthin, Gregory S. Johnson, and Manfred Ernst. Embree: A Kernel Framework for Efficient CPU Ray Tracing. ACM Transactions on Graphics, 33(4):143:1-143:8, 2014.

[35] Sven Woop. DRPU: A Programmable Hardware Architecture for Real-time Ray Tracing of Coherent Dynamic Scenes. PhD thesis, Saarland University, 2006.

[36] Henri Ylitie, Tero Karras, and Samuli Laine. Efficient incoherent ray traversal on gpus through compressed wide bvhs. In Proceedings of High Performance Graphics, HPG '17, pages 4:1-4:13, New York, NY, USA, 2017. ACM.

In embodiments described herein, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1. An apparatus comprising: a memory to store graphics data for a scene including a plurality of primitives in a scene at a first precision; a geometry quantizer to read vertices of the primitives at the first precision and to adaptively quantize the vertices of the primitives to a second precision associated with a first local coordinate grid of a first BVH node positioned within a global coordinate grid, the second precision lower than the first precision; a BVH builder to determine coordinates of child nodes of the first BVH node by performing non-spatial-split binning or spatial-split binning for the first BVH node using primitives associated with the first BVH node, the BVH builder to determine final coordinates for the child nodes based, at least in part, on an evaluation of surface areas of different bounding boxes generated for each of the child node.

Example 2. The apparatus of example 1 wherein the first precision comprises 32-bit single-precision floating-point precision.

Example 3. The apparatus of example 1 wherein the second precision comprises 8-bit or 16-bit unsigned integer precision.

Example 4. The apparatus of example 1 wherein the BVH builder is to construct the global coordinate grid by conservatively aligning MIN and MAX coordinates of a bounding box for the scene to the first precision.

Example 5. The apparatus of example 1 wherein the child nodes include a first child node and a second child node and wherein the geometry quantizer is to construct a second local coordinate grid and a third local coordinate grid for the first child node and the second child node, respectively, by identifying one or more planes from the first child node and/or the second child node which will be shared with the first BVH node.

Example 6. The apparatus of example 5 wherein constructing the second local coordinate grid further comprises replacing values of one or more of the planes from the first child node and/or the second child node with corresponding values associated with corresponding planes in the first BVH node.

Example 7. The apparatus of example 1 wherein the BVH builder is to select between non-spatial-split binning or spatial-split binning based on a comparison of results generated by the non-spatial-split binning and spatial-split binning.

Example 8. The apparatus of example 7 wherein the non-spatial-split binning comprises object split binning, wherein to perform the object split binning, the geometry quantizer is to determine a centroid box bounding a plurality of centroids of the primitives and to create one or more bins using the centroid box.

Example 9. The apparatus of example 8 wherein the centroid box is stored and propagated from the first BVH node to the child nodes to be used for binning operations within the child nodes.

Example 10. The apparatus of example 1 further comprising: lossless memory compression circuitry coupled to the memory to perform lossless compression on uncompressed graphics data to generate the graphics data stored in the memory and to perform lossless decompression on the graphics data to generate uncompressed graphics data in response to a memory request for the graphics data.

Example 11. The apparatus of example 10 further comprising: a first cache to store vertices of the primitives at the first precision, the geometry quantizer to read the vertices from the first cache to perform the adaptive quantization of the vertices to the second precision; and a second cache to store the vertices at the second precision, wherein the BVH builder is to read the vertices from the second cache to determine coordinates of child nodes of the first BVH node.

Example 12. A method comprising: receiving graphics data for a scene including a plurality of primitives in a scene at a first precision; reading vertices of the primitives at the first precision; adaptively quantizing the vertices of the primitives to a second precision associated with a first local coordinate grid of a first BVH node positioned within a global coordinate grid, the second precision lower than the first precision; determining coordinates of child nodes of the first BVH node by performing non-spatial-split binning or spatial-split binning for the first BVH node using primitives associated with the first BVH node, wherein final coordinates are determined for the child nodes based, at least in part, on an evaluation of surface areas of different bounding boxes generated for each of the child node.

Example 13. The method of example 12 wherein the first precision comprises 32-bit single-precision floating-point precision.

Example 14. The method of example 12 wherein the second precision comprises 8-bit or 16-bit unsigned integer precision.

Example 15. The method of example 12 further comprising: constructing the global coordinate grid by conservatively aligning MIN and MAX coordinates of a bounding box for the scene to the first precision.

Example 16. The method of example 12 wherein the child nodes include a first child node and a second child node and wherein adaptively quantizing further comprises: constructing a second local coordinate grid and a third local coordinate grid for the first child node and the second child node, respectively, by identifying one or more planes from the first child node and/or the second child node which will be shared with the first BVH node.

Example 17. The method of example 16 wherein constructing the second local coordinate grid further comprises: replacing values of one or more of the planes from the first child node and/or the second child node with corresponding values associated with corresponding planes in the first BVH node.

Example 18. The method of example 12 further comprising: selecting between non-spatial-split binning or spatial-split binning based on a comparison of results generated by the non-spatial-split binning and spatial-split binning.

Example 19. The method of example 18 wherein the non-spatial-split binning comprises object split binning, wherein to perform the object split binning, the geometry quantizer is to determine a centroid box bounding a plurality of centroids of the primitives and to create one or more bins using the centroid box.

Example 20. The method of example 19 wherein the centroid box is stored and propagated from the first BVH node to the child nodes to be used for binning operations within the child nodes.

Example 21. A machine-readable medium having program code stored thereon which, when executed by a machine, causes the machine to perform the operations of: receiving graphics data for a scene including a plurality of primitives in a scene positioned within a global coordinate grid at a first precision; reading vertices of the primitives at the first precision; adaptively quantizing the vertices of the primitives to a second precision associated with a first local coordinate grid of a first BVH node, the second precision lower than the first precision, wherein the local coordinate grid is associated with a location within the global coordinate grid at the first precision; determining coordinates of child nodes of the first BVH node by performing non-spatial-split binning or spatial-split binning for the first BVH node using primitives associated with the first BVH node, wherein final coordinates are determined for the child nodes based, at least in part, on an evaluation of surface areas of different bounding boxes generated for each of the child node.

Example 22. The machine-readable medium of example 21 wherein the first precision comprises 32-bit single-precision floating-point precision.

Example 23. The machine-readable medium of example 21 wherein the second precision comprises 8-bit or 16-bit unsigned integer precision.

Example 24. The machine-readable medium of example 21 further comprising program code to cause the machine to perform the operations of: constructing the global coordinate grid by conservatively aligning MIN and MAX coordinates of a bounding box for the scene to the first precision.

Example 25. The machine-readable medium of example 21 wherein the child nodes include a first child node and a second child node and wherein adaptively quantizing further comprises: constructing a second local coordinate grid and a third local coordinate grid for the first child node and the second child node, respectively, by identifying one or more planes from the first child node and/or the second child node which will be shared with the first BVH node.

Example 26. The machine-readable medium of example 25 wherein constructing the second local coordinate grid further comprises: replacing values of one or more of the planes from the first child node and/or the second child node with corresponding values associated with corresponding planes in the first BVH node.

Example 27. The machine-readable medium of example 21 further comprising program code to cause the machine to perform the operations of: selecting between non-spatial-split binning or spatial-split binning based on a comparison of results generated by the non-spatial-split binning and spatial-split binning.

Example 28. The machine-readable medium of example 27 wherein the non-spatial-split binning comprises object split binning, wherein to perform the object split binning, the geometry quantizer is to determine a centroid box bounding a plurality of centroids of the primitives and to create one or more bins using the centroid box.

Example 29. The machine-readable medium of example 28 wherein the centroid box is stored and propagated from the first BVH node to the child nodes to be used for binning operations within the child nodes.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a memory to store graphics data for a scene including a plurality of primitives in a scene at a first precision;
a geometry quantizer to read vertices of the plurality of primitives at the first precision and to adaptively quantize the vertices of the plurality of primitives to a second precision associated with a first local coordinate grid of a first bounding volume hierarchy (BVH) node positioned within a global coordinate grid, the second precision lower than the first precision; and
lossless memory compression circuitry coupled to the memory to perform lossless compression on uncompressed graphics data to generate the graphics data stored in the memory and to perform lossless decompression on the graphics data to generate the uncompressed graphics data in response to a memory request for the graphics data.

2. The apparatus of claim 1, further comprising:
a first cache to store the vertices of the plurality of primitives at the first precision; and
a second cache to store the vertices at the second precision.

3. The apparatus of claim 1, wherein coordinates of child nodes of the first BVH node is to be determined by performing non-spatial-split binning or spatial-split binning for the first BVH node using primitives associated with the first BVH node, and final coordinates for the child nodes is to be determined based, at least in part, on an evaluation of surface areas of different bounding boxes generated for each of the child node.

4. The apparatus of claim 3, wherein the child nodes include a first child node and a second child node and wherein the geometry quantizer is to construct a second local coordinate grid and a third local coordinate grid for the first child node and the second child node, respectively, by identifying one or more planes from the first child node and/or the second child node which will be shared with the first BVH node.

5. The apparatus of claim 4, wherein constructing the second local coordinate grid further comprises replacing values of one or more of the planes from the first child node and/or the second child node with corresponding values associated with corresponding planes in the first BVH node.

6. The apparatus of claim 3, wherein the non-spatial-split binning comprises object split binning, wherein to perform the object split binning, the geometry quantizer is to determine a centroid box bounding a plurality of centroids of the plurality of primitives and to create one or more bins using the centroid box.

7. The apparatus of claim 6, wherein the centroid box is stored and propagated from the first BVH node to the child nodes to be used for binning operations within the child nodes.

8. The apparatus of claim 1, wherein the global coordinate grid is constructed by conservatively aligning MIN and MAX coordinates of a bounding box for the scene to the first precision.

9. The apparatus of claim 1, wherein the first precision comprises 32-bit single-precision floating-point precision.

10. The apparatus of claim 1, wherein the second precision comprises 8-bit or 16-bit unsigned integer precision.

11. A method comprising:
receiving graphics data for a scene including a plurality of primitives in a scene at a first precision;
reading vertices of the plurality of primitives at the first precision;
adaptively quantizing the vertices of the plurality of primitives to a second precision associated with a first local coordinate grid of a first bounding volume hierarchy (BVH) node positioned within a global coordinate grid, the second precision lower than the first precision;
performing lossless compression on uncompressed graphics data to generate the graphics data; and
performing lossless decompression on the graphics data to generate the uncompressed graphics data in response to a memory request for the graphics data.

12. The method of claim 11, further comprising:
storing the vertices of the plurality of primitives in a first cache at the first precision; and
storing the vertices in a second cache at the second precision.

13. The method of claim 11, wherein coordinates of child nodes of the first BVH node is to be determined by performing non-spatial-split binning or spatial-split binning for the first BVH node using primitives associated with the first BVH node, and final coordinates for the child nodes is to be determined based, at least in part, on an evaluation of surface areas of different bounding boxes generated for each of the child node.

14. The method of claim 11, wherein the global coordinate grid is constructed by conservatively aligning MIN and MAX coordinates of a bounding box for the scene to the first precision.

15. The method of claim 11, wherein the first precision comprises 32-bit single-precision floating-point precision.

16. A non-transitory machine-readable medium having program code stored thereon which, when executed by a machine, causes the machine to perform:
receiving graphics data for a scene including a plurality of primitives in a scene at a first precision;
reading vertices of the plurality of primitives at the first precision;
adaptively quantizing the vertices of the plurality of primitives to a second precision associated with a first local coordinate grid of a first bounding volume hierarchy (BVH) node positioned within a global coordinate grid, the second precision lower than the first precision;
performing lossless compression on uncompressed graphics data to generate the graphics data; and
performing lossless decompression on the graphics data to generate the uncompressed graphics data in response to a memory request for the graphics data.

17. The non-transitory machine-readable medium of claim 16, wherein coordinates of child nodes of the first BVH node is to be determined by performing non-spatial-split binning or spatial-split binning for the first BVH node using primitives associated with the first BVH node, and final coordinates for the child nodes is to be determined based, at least in part, on an evaluation of surface areas of different bounding boxes generated for each of the child node.

18. The non-transitory machine-readable medium of claim 17, wherein the child nodes include a first child node and a second child node and wherein a second local coordinate grid and a third local coordinate grid are constructed for the first child node and the second child node, respectively, by identifying one or more planes from the first child node and/or the second child node which will be shared with the first BVH node.

19. The non-transitory machine-readable medium of claim 17, wherein the non-spatial-split binning comprises object split binning, wherein performing the object split binning, comprises determining a centroid box bounding a plurality of centroids of the plurality of primitives and to create one or more bins using the centroid box.

20. The non-transitory machine-readable medium of claim 16, wherein the global coordinate grid is constructed by conservatively aligning MIN and MAX coordinates of a bounding box for the scene to the first precision.

* * * * *